United States Patent
Sunaoshi et al.

(10) Patent No.: US 12,371,583 B2
(45) Date of Patent: Jul. 29, 2025

(54) PRETREATMENT LIQUID, INK SET, AND PRINTED MATTER

(71) Applicants: artience Co., Ltd., Tokyo (JP); TOYOCOLOR CO., LTD., Tokyo (JP)

(72) Inventors: Kazushi Sunaoshi, Tokyo (JP); Takanori Nomura, Tokyo (JP); Riho Morita, Tokyo (JP); Norio Suzuki, Tokyo (JP)

(73) Assignees: artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 0 days.

(21) Appl. No.: 18/694,590

(22) PCT Filed: May 27, 2022

(86) PCT No.: PCT/JP2022/021798
§ 371 (c)(1),
(2) Date: Mar. 22, 2024

(87) PCT Pub. No.: WO2023/047707
PCT Pub. Date: Mar. 30, 2023

(65) Prior Publication Data
US 2025/0122396 A1   Apr. 17, 2025

(30) Foreign Application Priority Data

Sep. 27, 2021 (JP) .................. 2021-156303
Sep. 27, 2021 (JP) .................. 2021-156304
Oct. 25, 2021 (JP) .................. 2021-173692

(51) Int. Cl.
| | |
|---|---|
| B32B 3/00 | (2006.01) |
| C09D 11/102 | (2014.01) |
| C09D 11/107 | (2014.01) |
| C09D 11/322 | (2014.01) |
| C09D 11/40 | (2014.01) |
| C09D 11/54 | (2014.01) |

(52) U.S. Cl.
CPC .......... C09D 11/54 (2013.01); C09D 11/102 (2013.01); C09D 11/107 (2013.01); C09D 11/322 (2013.01); C09D 11/40 (2013.01)

(58) Field of Classification Search
CPC ....... C09D 11/40; C09D 11/54; C09D 11/107; C09D 11/322
See application file for complete search history.

(56) References Cited

U.S. PATENT DOCUMENTS

| | | |
|---|---|---|
| 2020/0391533 A1 | 12/2020 | Gotou |
| 2021/0130639 A1 | 5/2021 | Sugihara et al. |
| 2021/0348011 A1 | 11/2021 | Sato et al. |
| 2023/0030249 A1 | 2/2023 | Sugihara et al. |

FOREIGN PATENT DOCUMENTS

| | | |
|---|---|---|
| JP | 2008-266853 A | 11/2008 |
| JP | 2016-168782 A | 9/2016 |
| JP | 2017-24397 A | 2/2017 |
| JP | 2017-88646 A | 5/2017 |
| JP | 2017-226093 A | 12/2017 |
| JP | 2019-94377 A | 6/2019 |
| JP | 2019-104136 A | 6/2019 |
| JP | 2019-108443 A | 7/2019 |
| JP | 2019-111687 A | 7/2019 |
| JP | 2019-111763 A | 7/2019 |
| JP | 2020-75436 A | 5/2020 |
| JP | 2020-75954 A | 5/2020 |
| JP | 2020-199717 A | 12/2020 |
| JP | 2021-91765 A | 6/2021 |

OTHER PUBLICATIONS

International Search Report issued Jul. 26, 2022 in International Application No. PCT/JP2022/021798.
Extended European Search Report dated Mar. 10, 2025 from the European Patent Office in Application No. 22872465.4.

*Primary Examiner* — Elizabeth E Mulvaney
(74) *Attorney, Agent, or Firm* — Sughrue Mion, PLLC

(57) ABSTRACT

Provided is a pretreatment liquid comprising resin particles (A), calcium ions, plural types of carboxylate ions including at least a hydroxycarboxylate ion, and water. The resin particles A include resin particles (A1) selected from the group consisting of (meth)acrylic resin particles, urethane (urea) resin particles, and urethane-(meth)acrylic resin particles and having a solubility parameter (SP) value of from 9.0 to 13.5 $(cal/cm^3)^{1/2}$, and a ratio of the amount of the resin particles (A) to an amount of the calcium ions in millimoles is specified. Also provided are an ink set containing the pretreatment liquid and a water-based inkjet ink, and a printed matter produced using the ink set.

9 Claims, No Drawings

PRETREATMENT LIQUID, INK SET, AND PRINTED MATTER

CROSS-REFERENCE TO RELATED APPLICATIONS

This is a National Stage of International Application No. PCT/JP2022/021798 filed May 27, 2022, claiming priority based on Japanese Patent Application No. 2021-156303 filed Sep. 27, 2021, Japanese Patent Application No. 2021-156304 filed Sep. 27, 2021, and Japanese Patent Application No. 2021-173692 filed Oct. 25, 2021 the entire disclosures of which are incorporated by reference herein.

TECHNICAL FIELD

Embodiments of the present invention relate to a pretreatment liquid, an ink set including the pretreatment liquid, and a printed matter produced using the ink set.

BACKGROUND ART

Unlike known plate printing, digital printing does not require a plate-making film or plate making, and therefore cost reduction and an increase in speed can be realized.

Inkjet printing is a type of digital printing. In inkjet printing, droplets of the inkjet ink are directly discharged from a very fine nozzle onto a recording medium and attached thereto to produce characters and images (hereinafter, also collectively referred to as "printed matter"). Inkjet printing provides advantages such as reduction of noise caused by the device used, good operability, and easy colorization. Therefore, output devices using inkjet printing are widely used in offices and homes. In addition, as a result of improvements in inkjet technology, inkjet printing is also used in industrial applications.

Conventionally, in industrial applications, inks used for inkjet printing were solvent inks or ultraviolet (UV) curable inks. However, in recent years, there has been an increase in demand for water-based inks from the view of safety, health, and environmental considerations.

Water-based inks used in inkjet printing (hereinafter, also simply referred to as "inkjet inks") are conventionally designed for use on plain paper or special paper (for example, glossy photo paper). The water-based ink contains water as the main component and a water-soluble organic solvent such as glycerin is added to the water-based ink to control the wettability and drying properties of the ink on the recording medium. When a pattern, such as a character or an image, is printed (applied) onto the recording medium using the water-based ink for inkjet applications (hereinafter, also referred to as a "water-based inkjet ink", a "water-based ink", or simply an "ink"), which is composed of these liquid components, the liquid components penetrate the recording medium and dries and thus becomes fixed.

Examples of recording media for inkjet printing include not only highly permeable recording media such as plain paper, special paper, high quality paper, and recycled paper, but also recording media having low permeability, such as coated paper, art paper, and lightly coated paper, as well as non-permeable recording media, such as film substrates, exist. So far, printing image quality acceptable for practical use is achieved by using water-based inkjet inks on recording mediums with high permeability and that with low permeability. On the other hand, when an ink is printed onto a non-permeable recording medium, such as a film substrate, ink droplets that have landed on the recording medium do not permeate whatsoever into the recording medium. Therefore, drying due to permeation hardly occurs, and as a result, droplets coalesce and cause mixed color bleeding or color unevenness (a state in which the color is non-uniform in a portion having the same color), and image quality is impaired.

Further, since the ink does not penetrate whatsoever into the non-permeable recording medium, the printed layer (ink coating film) hardly achieves sufficient adhesion to the medium. Insufficient adhesion leads to the occurrence of problems such as delamination of the printed matter due to rubbing or the like, or the occurrence of blocking when the printed matter is stored in a wound state or a stacked state and pressure is applied to the printed surface. Here, blocking is a phenomenon where some of the ink is removed by a substrate or the like when the substrate or the like adhered to the printed surface is peeled off. Furthermore, when the printed matter is bonded (laminated) to another film via an adhesive (laminating adhesive), delamination may occur between layers due to insufficient adhesion. In particular, a printed matter on a non-permeable recording medium is often subjected to post-processing for use as a packaging material. Therefore, improving blocking resistance and lamination suitability is an essential issue.

As a measure to address the above problem, a process of applying a pretreatment liquid to a non-permeable recording medium is known. Specifically, by intentionally inducing aggregation of a solid component (pigment and/or resin) present in the water-based inkjet ink or thickening of the water-based inkjet ink, thereby prevents color mixing, bleeding, and color unevenness between ink droplets of the water-based inkjet ink to improve image quality.

In the present application, the term "applying a pretreatment liquid" collectively refers to: printing the pretreatment liquid in a non-contact manner; and coating the pretreatment liquid by bringing it into contact with the substrate.

As an example of a pretreatment liquid, Patent Document 1 describes a pretreatment liquid containing a coloring material flocculant, such as an organic acid, polyolefin particles, and an aqueous organic solvent, and by using this pretreatment liquid, a printed matter having excellent thin line reproducibility is obtained. In addition, Patent Document 2 describes a pretreatment liquid that can be suitably used on a non-permeable medium, such as a film, which contains a water-soluble polyvalent metal salt and a polyester-based polyurethane emulsion, and it indicates that a printed matter having a high level of adhesion and a high image quality with suppressed color mixing, bleeding, and color unevenness, can be formed by using this pretreatment liquid.

However, when the present inventors of this patent application actually used the pretreatment liquids described in Patent Documents 1 and 2 on OPP films and PET films, compatibility between color mixing, bleeding, and solid filling (the solid portion is filled with ink without the occurrence of voids) was insufficient. Further, the present inventors found that the printed matters produced using these pretreatment liquids are inferior in adhesion to a film and in blocking resistance.

Meanwhile, the applicant of the present invention previously proposed pretreatment liquids to achieve both image quality and blocking resistance of printed matter on non-permeable recording media. For example, Patent Document 3 pertains to a pretreatment liquid containing resin particles having a specific 50% diameter (D50), a flocculant having a specific hygroscopic property, a hydrophobically-modified water-soluble urethane resin (thickener), and a surfactant having a specific HLB value. In the pretreatment liquid containing all the components described above, the viscoelasticity of the pretreatment liquid is optimized by the hydrophobically-modified water-soluble urethane resin, the resin particles and the flocculant are made homogeneous, and the resin particles are chemically stabilized. Thus, a printed matter having excellent image quality and adhesion can be obtained. On the other hand, it was found that the pretreatment liquid described in Patent Document 3 does not necessarily sufficiently solve the issues of color mixing, bleeding, and color unevenness of the printed matter, depending on the printing speed or the coverage rate of the water-based inkjet ink. Further, it is found that the blocking resistance and lamination suitability was not sufficient depending on the type of recording medium. That is to say, it was found that further examinations are necessary to obtain a printed matter excelling in all characteristics, such as image quality, blocking resistance, and lamination suitability, regardless of the usage and printing conditions.

CITATION LIST

Patent Literature

Patent Document 1: JP 2016-168782 A
Patent Document 2: JP 2020-75954 A
Patent Document 3: JP 2020-75436 A

DISCLOSURE OF THE INVENTION

Technical Problem

The present invention is developed to solve the above-described problems, and the object thereof is to provide a pretreatment liquid that can be used to form a printed matter free from mixed color bleeding, exhibiting good solid filling, and excelling in blocking resistance and lamination suitability on a non-permeable recording medium, such as a film substrate. Another object of the present invention is to provide an ink set including a pretreatment liquid and a water-based inkjet ink, and a printed matter produced using the ink set.

Solution to Problem

That is, embodiments of the present invention pertain to the following. However, embodiments of the present invention are not limited to those described below.

One embodiment relates to a pretreatment liquid that is used together with a water-based inkjet ink comprising a pigment, a water-soluble organic solvent, and water, wherein
the pretreatment liquid comprise resin particles (A), calcium ions, plural types of carboxylate ions, and water,
the resin particles (A) include resin particles (A1), the resin particles (A1) being selected from the group consisting of (meth)acrylic resin particles, urethane (urea) resin particles, and urethane-(meth)acrylic resin particles and having an SP value of from 9.0 to 13.5 $(cal/cm^3)^{1/2}$
one or more of the plural types of carboxylate ions are hydroxycarboxylate ions, and
a ratio (R/C) of R to C is from 0.11 to 0.50, where R (g) is an amount of the resin particles (A) contained in 100 g of the pretreatment liquid, and C (mmol) is a millimolar amount of the calcium ions contained in 100 g of the pretreatment liquid.

One embodiment relates to the abovementioned pretreatment liquid, wherein the resin particles (A1) have an acid value of from 1 to 50 mgKOH/g.

One embodiment relates to the abovementioned pretreatment liquid, wherein the R (g) is from 3.5 to 15.0.

One embodiment relates to the abovementioned pretreatment liquid, wherein the resin particles (A1) comprise (meth)acrylic resin particles having a glass transition temperature (Tg) of from −20 to 60° C.

One embodiment relates to the abovementioned pretreatment liquid, wherein the resin particles (A1) comprise ester-based urethane urea resin particles and/or carbonate-based urethane urea resin particles.

One embodiment relates to the abovementioned pretreatment liquid, wherein a value represented by C×2/A is from 0.8 to 1.1, where A (millimolar equivalents) is the total sum of millimolar equivalents of the plural types of —carboxylate ions contained in 100 g of the pretreatment liquid.

One embodiment relates to the abovementioned pretreatment liquid, wherein the pretreatment liquid contains two or more types of resin particles (A).

Moreover, another embodiment of the invention relates to an ink set comprising: the pretreatment liquid of the embodiment described above; and a water-based inkjet ink comprising a pigment, a water-soluble organic solvent, and water.

In addition, still another embodiment of the invention relates to a printed matter produced by printing a water-based inkjet ink, comprising a pigment, a water-soluble organic solvent, and water, onto a recording medium, to which the pretreatment liquid of the embodiment described above has been applied.

The disclosure of the present application is related to the subject matter described in Japanese Patent Application No. 2021-156303 and No. 2021-156304 filed on Sep. 27, 2021, and Japanese Patent Application No. 2021-173692 filed on Oct. 25, 2021, the disclosures of which are all incorporated herein by reference.

Advantageous Effects of Invention

According to the present invention, a pretreatment liquid can be provided that can be used to produce a printed matter free from mixed color bleeding, exhibiting good solid filling, and excelling blocking resistance and lamination suitability on a non-permeable recording medium, such as a film substrate. In addition, according to the present invention, an ink set that includes the abovementioned pretreatment liquid and a water-based inkjet ink can be provided, and by which a printed matter having excellent properties described above can be obtained. Further, according to the present invention, a printed matter produced using the ink set can be provided.

DESCRIPTION OF EMBODIMENTS

Hereinafter, examples of preferred embodiments of the present invention will be described. It should be noted that the present invention is not limited to the following embodiments and includes various modified examples that can be carried out within a scope that does not depart from the gist of the invention.

In general, when a water-based inkjet ink lands on a layer of a pretreatment liquid (pretreatment liquid layer) containing an flocculant component, the flocculant component (hereinafter also referred to as an "aggregating/thickening component") presented in the pretreatment liquid which aggregates and/or thickens a solid component contained in the water-based inkjet ink is released and diffused into the water-based inkjet ink. The diffused aggregating/thickening component then acts on the solid component in the water-based inkjet ink to cause aggregation and/or thickening of the solid component, and thereby suppress mixed color bleeding. On the other hand, to improve solid filling when a pretreatment liquid containing an aggregating component is used, the droplets of the water-based inkjet ink need to be sufficiently spread before aggregation and/or thickening of the solid component occurs after the water-based inkjet ink lands. Thus, to achieve both suppression of mixed color bleeding and an improvement in solid filling in a printed matter in this manner, it is important that the release rate of the aggregating component and the spreading rate of the droplets of the water-based inkjet ink are simultaneously controlled.

As an example method for controlling the release rate of the aggregating/thickening component is a method to adjust the type and amount of the aggregating/thickening component. For example, a highly-soluble material and/or a material having a small molecular size is thought to have a higher release rate. In a case in which such an aggregating/thickening component having a high release rate is used, a conceivable method for improving solid filling is, for example, reducing the amount of the aggregating/thickening component to delay aggregation and/or thickening of the solid component in the water-based inkjet ink. However, in this method, the aggregating/thickening component required for aggregation and/or thickening of an image portion having a high coverage rate is not sufficient. Therefore, for example, when a plurality of water-based inkjet inks are superimposed, there is a concern that mixed color bleeding may not be completely suppressed. On the other hand, when an aggregating/thickening component having a low release rate is used, the aggregation and/or thickening of the droplets of the water-based inkjet ink becomes slow, and therefore mixed color bleeding are likely to occur.

In addition, in the droplets of the water-based inkjet ink on the recording medium, the composition of the components in the water-based inkjet ink, and particularly the composition of the liquid components changes as drying progresses. As a result, regardless of the magnitude of the release rate, the solubility of the aggregating/thickening component diffused in the droplets of the water-based inkjet ink decreases, and recrystallization is likely to occur. Thus, the spreading of the droplets becomes non-uniform and cause problems, such as the droplets (dots) not forming a perfect circular shape or the solid filling becomes worse.

As described above, it is difficult to address both mixed color bleeding and solid filling by merely adjusting the type or amount of the aggregating/thickening component.

In addition, the type or amount of the aggregating/thickening component also influences the blocking resistance and lamination suitability of the printed matter. Specifically, it is thought that the degree of blocking resistance and lamination suitability is also affected by the amount of crosslinking of the solid component in the water-based inkjet ink, the crosslinking occurring through the aggregating/thickening component. Therefore, for example, it is thought that when the amount of the aggregating/thickening component is small, crosslinking of the solid component becomes insufficient, and the blocking resistance is reduced. On the other hand, when an excessive amount of the aggregating/thickening component is added, crosslinking of the solid component in the water-based inkjet ink also becomes excessive, and therefore the viscosity of the printed matter layer (coating film) suitable for exhibiting good lamination suitability is lost, and the lamination strength becomes insufficient. As described above, when the mixed color bleeding and solid filling are controlled by the type or amount of the aggregating/thickening component, it is difficult to achieve both blocking resistance and lamination suitability.

On the other hand, as a conceivable measure for enhancing the blocking resistance and lamination suitability of the printed matter, adding a binder resin to the pretreatment liquid to utilize a chemical bonding force, such as hydrogen bonding or intermolecular interaction, may be contemplated. However, when a binder resin is used, the flocculant component is not easily released into the water-based inkjet ink. Therefore, the above-described effect of the aggregating/thickening component is less likely to be exhibited, and it may become more difficult to achieve a balance between mixed color bleeding and solid filling.

As a result of intensive studies conducted by the present inventors to solve the above-described problems, the present inventors discovered that desired characteristics can be easily obtained by a pretreatment liquid having a specific configuration including resin particles, an aggregating/thickening component, and a solvent. For example, as one embodiment, the pretreatment liquid may contain resin particles (A1) having an SP value in a specific range, calcium ions, and plural types of carboxylate ions including one or more types of hydroxy carboxylate ions, and by setting a ratio of the amount of the abovementioned resin particles (A) to a millimolar amount of the calcium ions within a specific range, a printed matter that is free from mixed color bleeding, exhibits good solid filling, and excels in blocking resistance and lamination suitability can be obtained on a non-permeable recording medium. Although the details of the mechanism by which the above-described problems can be suitably solved by the pretreatment liquid having the above-described composition are not clear, the present inventors presume the mechanism to be as follows.

First, a pretreatment liquid that is a preferred embodiment of the present invention (hereinafter, also simply referred to as a "pretreatment liquid of the present invention") contains resin particles (A). In general, there are two types of resin forms, that is, water-soluble resins and resin particles, and the appropriate resin form is used according to the properties required for the pretreatment liquid and the printed matter. In the case of the pretreatment liquid of the present invention, at least resin particles are used as a binder resin to improve the mixing stability with calcium ions and the blocking resistance. In addition, when resin particles are used, a larger amount of resin can be blended compared to when a water-soluble resin is used, and therefore the resin particles are also a suitable material in terms of enhancing the adhesion, scratch resistance, water resistance, and the like of the printed matter.

The pretreatment liquid of the present invention also contains calcium ions. The calcium ions function as an aggregating/thickening component. Calcium ions have a release rate suitable for achieving a balance between mixed color bleeding and solid filling, and have an aggregating/thickening action, therefore calcium ions are preferably used.

Further, the pretreatment liquid of the present invention also contains plural types of carboxylate ions. As described above, when only one type of carboxylate ion is used, the release rate greatly depends on the type and amount of the calcium salt of carboxylic acid formed after coating, and it becomes difficult to achieve a balance between mixed color bleeding and solid filling. On the other hand, the pretreatment liquid of the present invention uses plural types of carboxylate ions, and thereby plural types of calcium salts of carboxylic acid are formed after coating.

It is generally known that the solubility of a calcium salt of carboxylic acid in water is low. However, in the pretreatment liquid of the present invention, the plural types of calcium salts of carboxylic acid exhibits water solubility equal to or greater than that exhibited by each calcium salt of carboxylic acid alone. As a result, for example, even in a case in which the water-based inkjet ink is printed after the pretreatment liquid layer is dried, the release rate of calcium ions can be controlled in a suitable range, and a good balance between mixed color bleeding and solid filling can be achieved. Note that the above-described improvement in water solubility through the combined use of calcium salts of carboxylic acid is considered to be due to an effect similar to the uncommon-ion effect.

Further, in the pretreatment liquid of the present invention, one or more of the plural types of carboxylate ions are hydroxycarboxylate ions. Although the details are unclear, it is conceivable that the hydroxycarboxylate ions released and diffused in the water-based inkjet ink form salts (salts of hydroxycarboxylic acid) with the calcium ions which are also diffused in the water-based inkjet ink. However, it is thought that these calcium salts of hydroxycarboxylic acid are likely to maintain solubility and are unlikely to be recrystallized, even when the liquid components undergo changes in their compositions in association with drying. As a result, non-uniformity in spreading of the droplets is suppressed, and the solid filling of the printed matter is further improved.

Furthermore, as a result of continued intensive studies, the present inventors discovered that the abovementioned effects are particularly improved when the resin particles (A) include resin particles (A1), where the resin particles (A1) are selected from the group consisting of (meth)acrylic resin particles, urethane (urea) resin particles, and urethane-(meth)acrylic resin particles and have an SP value of from 9.0 to 13.5 $(cal/cm^3)^{1/2}$ Although the details are not clear, it is thought that since the resin particles (A1) have a moderately high affinity for water and can improve the spreading rate of droplets of the water-based inkjet ink, thus the solid filling of the printed matter is improved. In addition, it is thought that since the water-based inkjet ink containing water is easily miscible with the pretreatment liquid layer, calcium ions serving as an aggregating/thickening component are easily released and diffused, and mixed color bleeding also improve. Resins having an SP value of greater than 13.5 are also known. However, a large amount of such a resin is not used in the pretreatment liquid of the present invention, and thereby the printed matter can be suppressed from easily absorbing moisture, which results in a decrease in the blocking property and lamination suitability.

In addition, a laminating adhesive easily permeates into the pretreatment liquid layer containing resin particles having the above-described SP value, and as a result, a strong composite film is formed, and the lamination strength is improved.

The present inventors also discovered that when a ratio expressed by R/C is within a range of 0.11 to 0.50, where R (g) is an amount of the resin particles (A) contained in 100 g of the pretreatment liquid, and C (mmol) is an amount of the calcium ions in millimolar contained in 100 g of the pretreatment liquid, the abovementioned effects are further improved.

As described above, merely including a binder resin in the pretreatment liquid results in a decrease in the dissolution rate of the aggregating/thickening component, and may make it difficult to achieve a balance between mixed color bleeding and solid filling. However, when the components are mixed at the above-described ratio, the release rate of the aggregating/thickening component and the spreading rate of the droplets of the water-based inkjet ink can be optimized, and therefore, a printed matter in which a balance is achieved between mixed color bleeding and solid filling can be obtained. In addition, when calcium ions are added at an amount required for improving blocking resistance, the calcium ions and the solid components in the water-based inkjet ink are crosslinked to each other, and thereby a printed matter that exhibits an elastic behavior and excellent lamination suitability can be obtained.

As described above, in one embodiment, the pretreatment liquid having the above-described composition can be used to obtain a printed matter on a non-permeable recording medium with the printed matter being free from mixed color bleeding, exhibiting good solid filling, and excelling in blocking resistance and lamination suitability.

Next, constituent materials and the like of the pretreatment liquid of the present invention will be described in detail below.

Resin Particles (A)

The pretreatment liquid of the present invention contains resin particles (A). Any resin can be used as the resin particles (A). Specific examples of the resin that can be used include a urethane (urea) resin, a urethane-(meth)acrylic resin, a (meth)acrylic resin, a styrene-maleic acid (anhydride) resin, an olefin-maleic acid (anhydride) resin, a rosin ester resin, a rosin phenol resin, a terpene phenol resin, an amine resin, an amide resin, an amine-amide resin, an amine-epihalohydrin resin, an amine-amide-epihalohydrin resin, a polyolefin resin, and a polyester resin.

As the resin particles (A), one type of resin selected from the group of resins exemplified above may be used alone, or two or more types of resins may be used in combination. In one embodiment, the resin particles (A) may be at least one type selected from the group consisting of a (meth)acrylic resin, a urethane (urea) resin, and a urethane-(meth)acrylic resin. In particular, the pretreatment liquid preferably contains resin particles (A1) described below. Note that in the present invention, the term "resin particles" refers to resin particles having a 50% diameter of from 5 to 1000 nm as measured by a method described below.

As described above, the resin particles (A1) contribute to achieving a balance between mixed color bleeding and solid filling of the printed matter and further improves blocking resistance and lamination suitability. Additionally, by using a hydroxycarboxylate ion in combination, particularly excellent levels of mixed color bleeding, solid filling, and lamination suitability can be maintained, and an improvement in the storage stability of the pretreatment liquid can be realized.

The resin particles (A1) have an SP value of from 9.0 to 13.5 $(cal/cm^3)^{1/2}$ and are at least one type selected from the group consisting of a (meth)acrylic resin, a urethane (urea) resin, and a urethane-(meth)acrylic resin. Among these, the urethane (urea) resin and/or the (meth)acrylic resin are/is preferably used for the resin particles (A1) from the viewpoint of blocking resistance and lamination suitability for a non-permeable recording medium.

Note that the term "SP value" is an abbreviation for the solubility parameter, and in the present invention, the SP value is calculated by the Fedors estimation method expressed by the following Equation 1 (provided that the unit is $(cal/cm^3)^{1/2}$)

$$(SP\ \text{value}) = \left(\sum Ecoh/\sum V\right)^{1/2} \quad \text{Equation 1}$$

In Equation 1 above, Ecoh represents the cohesive energy determined for each functional group, and V represents the molar molecular volume determined for each functional group. These Ecoh and V values are described by R. F. Fedors in "Polymer Engineering & Science" (Vol. 14, No. 2, 1974, pp. 147 to 154).

In addition, the SP value of the resin particles (A1) in the present invention is a value obtained by weighting the SP values of the raw materials constituting the resin particle by the blending molar ratio. For example, when styrene having an SP value of 9.2 and methacrylic acid having an SP value of 10.7 are reacted at a molar ratio of 3:1, the SP value of the resulting styrene-methacrylic acid resin is 9.2×3÷(1+3)+ 10.7×1÷(1+3)≈9.6.

When the resin particles (A1) contain an anionic functional group, such as a carboxylic acid (carboxyl) group, a sulfonic acid group, or a phosphonic acid group, an acid value of the resin particles (A1) containing the anionic functional group is preferably from 1 to 50 mgKOH/g from the viewpoint of improving blocking resistance and lamination suitability. From the viewpoint of achieving storage stability of the pretreatment liquid, blocking resistance, and lamination strength, the acid value is more preferably from 2 to 45 mgKOH/g, even more preferably from 3 to 35 mgKOH/g, and particularly preferably from 5 to 25 mgKOH/g.

The acid value of the resin particles is a value in milligrams of potassium hydroxide (KOH) required to neutralize the anionic functional groups contained in 1 g of the resin particles, and in the present specification, a theoretical value calculated by the following method is used as the acid value thereof. For example, when the resin particles contain, among polymerizable monomers constituting the resin particles, Wa mass % of a polymerizable monomer having a molecular weight of Ma and having a va-valent acid group of a quantity of na per molecule, the acid value (mgKOH/g) is determined by the following Equation 2.

$$(\text{Acid value}) = \{(va \times na \times Wa) \div (100 \times Ma)\} \times 56.11 \times 1000 \quad \text{Equation 2}$$

In Equation 2 above, the numerical value "56.11" is the molecular weight of potassium hydroxide.

On the other hand, by causing the resin particles to function as an aggregating/thickening component, and from the viewpoints of remarkably improving image quality and obtaining a printed matter with excellent adhesion, the resin particles (A1) may have a cationic functional group, such as an amino group, an ammonium group, an amide groups, or a ureido group. In this case, the base value of the resin particles (A1) is preferably from 0.5 to 40 mgKOH/g. In addition, from the viewpoint of achieving storage stability of the pretreatment liquid, adhesion, and image quality, the base value is more preferably from 1 to 30 mgKOH/g, still more preferably from 2 to 25 mgKOH/g, and particularly preferably from 4 to 20 mgKOH/g, The base value of the resin particles is a value in milligrams of KOH equivalent to the amount of hydrochloric acid required to neutralize the cationic functional groups contained in 1 g of the resin particles, and can be calculated by the same method as the acid value described above. For example, when the resin particles contain, among polymerizable monomers constituting the resin particles, Wc mass % of a polymerizable monomer having a molecular weight of Mc and having a vc-valent cationic functional group of a quantity of nc per molecule, the base value (mgKOH/g) is determined by the following Equation 3.

$$(\text{Base value}) = \{(vc \times nc \times Wc) \div (100 \times Mc)\} \times 56.11 \times 1000 \quad \text{Equation 3}$$

The 50% diameter (D50) of the resin particles (A1) is preferably from 20 to 350 nm. The 50% diameter thereof is more preferably from 30 to 300 nm, and is particularly preferably from 50 to 250 nm. In this case, the blocking resistance and lamination strength of the printed matter, and the storage stability of the pretreatment liquid are particularly excellent. Furthermore, a printed matter with excellent image quality can be obtained by forming a film quickly and uniformly to thereby prevent the shape of dots of the inkjet ink that is printed later from becoming non-uniform. Here, the "50% diameter" is a volume-based cumulative 50% diameter (median diameter) measured by a dynamic light scattering method using the Nanotrac UPA-EX150 available from MicrotracBEL Corporation.

As a result of intensive studies, the present inventors also discovered that a value expressed by RD50/C, where RD50 is the 50% diameter of the resin particles (A1) and C is an amount of calcium ions in millimolar contained in 100 g of the pretreatment liquid, is preferably from 2 to 10, more preferably from 3 to 8, and particularly preferably from 3.5 to 7. Although the detailed reason is unknown, resin particles (A1) satisfying the above conditions can sufficiently cover the surface of the pretreatment liquid layer even in the presence of calcium ions. It is thought that as a result, a printed matter of which image quality, blocking resistance, and lamination suitability are all achieved can be obtained.

Note that when the pretreatment liquid contains two or more types of resin particles (A1), the 50% diameter measured using an aqueous solution in which two or more types of resin particles (A1) are present is used as the RD50 in the calculation of RD50/C described above. Here, the aqueous solution is a solution containing an aqueous solvent and a component dispersed and/or dissolved in the aqueous solvent.

When the resin particles (A1) include (meth)acrylic resin particles, the glass transition temperature (Tg) of the (meth) acrylic resin particles is preferably from −20° C. to 60° C., more preferably from 0° C. to 50° C., and particularly preferably from 15° C. to 40° C., from the viewpoint of easily achieving an improvement in both blocking resistance and lamination suitability. When the resin particles (A1) include (meth)acrylic resin particles and urethane (urea) resin particles and/or urethane-(meth)acrylic resin particles, the glass transition temperature (Tg) of the (meth)acrylic resin particles is preferably from −20° C. to 100° C., more preferably from 0° C. to 80° C., and particularly preferably from 15° C. to 60° C., from the viewpoint of easily achieving an improvement in both blocking resistance and lamination suitability.

On the other hand, in another preferred embodiment of the present invention, when two types of (meth)acrylic resins are used as the resin particles (A1), the glass transition temperature (Tg) of one of the types of resin particles is preferably 25° C. or lower, and the glass transition temperature (Tg) of the other type of resin particles is preferably 25° C. or higher. Furthermore, the difference between the glass transition temperatures of the two types of (meth)acrylic resin particles is preferably 20° C. or greater, and particularly preferably 40° C. or greater.

In the present specification, a theoretical value calculated by the following method is used as the glass transition temperature of the (meth)acrylic resin particles. For example, the glass transition temperature (° C.) of the resin particles can be determined by the following Equation 4, where the content of each of i types of polymerizable monomers constituting the resin particles relative to the total amount of the polymerizable monomers constituting the resin particles is Wi mass %, and the glass transition temperature of a homopolymer of the polymerizable monomer is Tgi (° C.).

$$\text{(Glass transition temperature)} = 1 \div \left[\sum \{Wi \div (Tgi + 273.2)\}\right] - 273.2 \quad \text{Equation 4}$$

As described above, the pretreatment liquid of the present invention may contain only one type of resin particles (A1) or may contain two or more types of resin particles (A1) in combination. In addition, the resin particles (A1) and other resin particles (hereinafter, also referred to as "resin particles (A2)") besides the resin particles (A1) may be used in combination. Examples of resins that can be used as the resin particles (A2) include: at least one type of resin not having an SP value of from 9.0 to 13.5 $(\text{cal/cm}^3)^{1/2}$ and selected from the group consisting of a (meth)acrylic resin, a urethane (urea) resin, and a urethane-(meth)acrylic resin; and a styrene-maleic acid (anhydride) resin; an olefin-maleic acid (anhydride) resin; an amine resin; an amide resin; an amine-amide resin; an amine-epihalohydrin resin; an amine-amide-epihalohydrin resin; a polyolefin resin; and a polyester resin. In one embodiment, the pretreatment liquid suitably contains, as the resin particles (A2), a polyolefin resin and/or a polyester resin.

In particular, by using resin particles of different characteristics or different types in combination in the pretreatment liquid of the present invention, a printed matter can be obtained that not only suitably achieves excellent properties in terms of adhesion, image quality (mixed color bleeding and solid filling), and lamination suitability, but also excels in properties such as blocking resistance and scratch resistance. From such a viewpoint, the pretreatment liquid preferably contains, as the resin particles (A), a combination of one or more types of resin particles selected from the group consisting of: two types of (meth)acrylic resin particles (provided that the SP value of at least one of the resin types is from 9.0 to 13.5 $(\text{cal/cm}^3)^{1/2}$); (meth)acrylic resin particles and urethane (urea) resin particles (provided that the SP value of at least one of the resin types is from 9.0 to 13.5 $(\text{cal/cm}^3)^{1/2}$); (meth)acrylic resin particles having an SP value of from 9.0 to 13.5 $(\text{cal/cm}^3)/2$, and polyolefin resin particles; urethane (urea) resin particles having an SP value of from 9.0 to 13.5 $(\text{cal/cm}^3)^{1/2}$ and polyolefin resin particles; and urethane-(meth)acrylic resin particles having an SP value of from 9.0 to 13.5 $(\text{cal/cm}^3)^{1/2}$ and polyolefin resin particles.

From the viewpoint of further improving coating stability of the treatment liquid and lamination strength, and from the viewpoints of blocking resistance, scratch resistance, and the like, the total amount (R) of the resin particles (A) contained in the pretreatment liquid of the present invention is preferably from 3.5 to 15 mass %, and particularly preferably from 5 to 10 mass % in terms of solid content in relation to the total amount of the pretreatment liquid.

(Meth)acrylic Resin Particles

When the (meth)acrylic resin particles are used as the resin particles (A), those synthesized according to a known method can be used. In the present invention, "(meth)acrylic" means acrylic or methacrylic. However, as described below, the (meth)acrylic resin may contain, as a constituent unit, a structure derived from a styrene-based monomer, such as styrene, methoxystyrene, vinyltoluene, or divinylbenzene.

Examples of the method of producing the (meth)acrylic resin particles include a method in which an ethylenically unsaturated monomer is subjected to emulsion polymerization using a surfactant or a polymer dispersant as an emulsifier. Among these, (meth)acrylic resin particles containing a surfactant as an emulsifier are preferably used as the resin particles (A1) from the viewpoint of storage stability of the pretreatment liquid.

Hereinafter, an example of a method of producing the (meth)acrylic resin particles containing a surfactant as an emulsifier will be described in further detail. First, an aqueous medium (a medium containing at least water), an ethylenically unsaturated monomer, and a surfactant are mixed and stirred to obtain an emulsion. Next, an aqueous medium and a portion of the emulsion are charged into a reaction vessel, and then heated. After heating, the gas in the reaction vessel is replaced with nitrogen gas, a radical polymerization initiator is added, and the remainder of the emulsion is gradually added dropwise. After completion of the dropwise addition, the reaction is further carried out for several hours to obtain the desired (meth)acrylic resin particles.

As the ethylenically unsaturated monomer, an acid group-containing ethylenically unsaturated monomer, an aromatic ethylenically unsaturated monomer, and other ethylenically unsaturated monomers can be used. Among these, an acid group-containing ethylenically unsaturated monomer is preferably contained.

Examples of the "acid group" of the acid group-containing ethylenically unsaturated monomer include a carboxylic acid (carboxyl) group, a sulfonic acid group, and a phosphonic acid group. Any one of these acid groups may be selected, or a compound in which two or more of these acid groups are present may be used. Among these, from the viewpoint of improving blocking resistance and lamination suitability, a carboxyl group is preferably selected.

As the acid group-containing ethylenically unsaturated monomer, a known compound having the acid group can be used. Specific examples thereof include acrylic acid, methacrylic acid, carboxymethyl(meth)acrylate, carboxyethyl (meth)acrylate, acryloyloxyethyl succinate, methacryloyloxyethyl succinate, acryloyloxyethyl phthalate, methacryloyloxyethyl phthalate, acryloyloxy isobutyrate, methacryloyloxy isobutyrate, 2-sulfoethyl(meth)acrylate, acryloyloxyethyl phosphonate, methacryloyloxyethyl phosphonate, 2-(phosphonooxy)ethyl(meth)acrylate, vinylsulfonic acid, styrene carboxylic acid, styrene sulfonic acid, and styrene phosphonic acid. These ethylenically unsaturated monomers containing an acid group can be used alone or in a combination with one or more monomers. Note that the term "(meth)acrylate" means at least one selected from an"acrylate" and/or a "methacrylate". Among the above-mentioned compounds, vinylsulfonic acid, styrene carboxylic acid, styrene sulfonic acid, styrene phosphonic acid and the like are compounds corresponding to also an aromatic ethylenically unsaturated monomer described below.

When an acid group-containing ethylenically unsaturated monomer is used, a basic compound may be used as a neutralizing agent for the purpose of enhancing the hydrophilicity of the resulting resin particles (A). Examples of the basic compound include ammonia, amines such as trimethylamine, triethylamine, butylamine, dimethylaminoethanol, diethylaminoethanol, diethanolamine, triethanolamine, aminomethylpropanol, and morpholine; and hydroxide salts such as potassium hydroxide and sodium hydroxide.

A known compound can be used as the aromatic ethylenically unsaturated monomer. Specific examples thereof include styrene, α-methylstyrene, o-methylstyrene, p-methylstyrene, m-methylstyrene, vinylnaphthalene, benzyl acrylate, benzyl methacrylate, phenoxyethyl acrylate, phenoxyethyl methacrylate, phenoxydiethylene glycol acrylate, phenoxydiethylene glycol methacrylate, phenoxytetraethylene glycol acrylate, phenoxytetraethylene glycol methacrylate, phenoxyhexaethylene glycol acrylate, phenoxyhexaethylene glycol methacrylate, phenyl acrylate, and phenyl methacrylate.

Known compounds can also be used as other ethylenically unsaturated monomers. Examples include linear or branched alkyl group-containing ethylenically unsaturated monomers such as methyl methacrylate, ethyl methacrylate, propyl methacrylate, n-butyl methacrylate, t-butyl methacrylate, pentyl(meth)acrylate, heptyl(meth)acrylate, hexyl(meth)acrylate, 2-ethylhexyl(meth)acrylate, octyl(meth)acrylate, nonyl(meth)acrylate, decyl(meth)acrylate, undecyl(meth)acrylate, lauryl(meth)acrylate, and stearyl(meth)acrylate;

alicyclic alkyl group-containing ethylenically unsaturated monomers such as cyclohexyl(meth)acrylate and isobornyl(meth)acrylate;

fluorinated alkyl group-containing ethylenically unsaturated monomers such as trifluoroethyl(meth)acrylate and heptadecafluorodecyl(meth)acrylate;

amide group-containing ethylenically unsaturated monomers such as (meth)acrylamide, N-methoxymethyl-(meth)acrylamide, N-ethoxymethyl-(meth)acrylamide, N-propoxymethyl-(meth)acrylamide, N-butoxymethyl-(meth)acrylamide, N-pentoxymethyl-(meth)acrylamide, N,N-di(methoxymethyl)acrylamide, N-ethoxyethyl-N-methoxymethyl methacrylamide, N,N-di(ethoxymethyl)acrylamide, N-ethoxymethyl-N-propoxymethyl methacrylamide, N,N-di(propoxymethyl)acrylamide, N-butoxymethyl-N-(propoxymethyl)methacrylamide, N,N-di(butoxymethyl)acrylamide, N-butoxymethyl-N-(methoxymethyl)methacrylamide, N,N-di(pentoxymethyl)acrylamide, N-methoxymethyl-N-(pentoxymethyl)methacrylamide, N,N-dimethylaminopropyl acrylamide, N,N-diethylaminopropyl acrylamide, N,N-dimethylacrylamide, and N,N-diethylacrylamide;

hydroxyl group-containing ethylenically unsaturated monomers such as 2-hydroxyethyl(meth)acrylate, 2-hydroxypropyl(meth)acrylate, 4-hydroxybutyl(meth)acrylate, glycerol mono(meth)acrylate, 4-hydroxyvinylbenzene, 1-ethynyl-1-cyclohexanol, and allyl alcohol; and keto group-containing ethylenically unsaturated monomers such as diacetone(meth)acrylamide and acetoacetoxy(meth)acrylate. In particular, from the viewpoint of improving blocking resistance on a non-permeable recording medium, the content of a structural unit derived from a (meth)acrylate having 6 or more carbons in the monomer is preferably from 30 to 98 mol % and more preferably from 40 to 98 mol % in relation to the total molar amount of the ethylenically unsaturated monomers constituting the (meth)acrylic resin particles.

On the other hand, a radical polymerization initiator used in the synthesis of the (meth)acrylic resin is not particularly limited as long as it has the ability to initiate radical polymerization, and known oil-soluble polymerization initiators and water-soluble polymerization initiators can be used.

Examples of the oil-soluble polymerization initiator include organic peroxides such as benzoyl peroxide, tert-butyl peroxybenzoate, tert-butyl hydroperoxide, tert-butylperoxy (2-ethylhexanoate), tert-butylperoxy-3,5,5-trimethylhexanoate, and di-tert-butyl peroxide; and azobis compounds such as 2,2'-azobisisobutyronitrile, 2,2'-azobis-2,4-dimethylvaleronitrile, 2,2'-azobis(4-methoxy-2,4-dimethylvaleronitrile), and 1,1'-azobis-cyclohexane-1-carbonitrile. A type of these oil-soluble polymerization initiators may be used alone, or two or more types thereof can be mixed and used.

However, in the present invention, it is preferable to use a water-soluble polymerization initiator, and for example, ammonium persulfate (APS), potassium persulfate (KPS), hydrogen peroxide, and 2,2'-azobis(2-methylpropionamidine)dihydrochloride can be suitably used.

The radical polymerization initiator is preferably used at an amount of from 0.05 to 5.0 parts by mass relative to 100 parts by mass of the ethylenically unsaturated monomer.

Moreover, when a radical polymerization initiator is used, the polymerization temperature may be set to a temperature equal to or higher than the polymerization initiation temperature of the radical polymerization initiator. For example, when an organic peroxide is used as the radical polymerization initiator, the temperature may usually be set to around 80° C. In addition, the polymerization time is not particularly limited, but is usually from 2 to 24 hours.

Note that when emulsion polymerization is carried out, as desired, a reducing agent may be used together with the radical polymerization initiator. Using a reducing agent in combination facilitates adjustment of the emulsion polymerization rate as well as initiation of emulsion polymerization even at a low temperature.

Examples of such reducing agents include reductive organic compounds such as ascorbic acid, erythorbic acid, tartaric acid, citric acid, glucose, and metal salts of formaldehyde sulfoxylate; reductive inorganic compounds such as sodium thiosulfate, sodium sulfite, sodium bisulfite, and sodium metabisulfite; and iron(II) chloride, rongalite, and thiourea dioxide. These reducing agents are preferably used at an amount of from 0.05 to 5.0 parts by mass relative to 100 parts by mass of the ethylenically unsaturated monomer.

Note that the polymerization reaction can be caused by a photochemical reaction, irradiation with radiation, or the like, regardless of the radical polymerization initiator described above.

Also, if necessary, a buffer such as sodium acetate, sodium citrate, or sodium bicarbonate, and/or a chain transfer agent such as octyl mercaptan, 2-ethylhexyl thioglycolate, octyl thioglycolate, stearyl mercaptan, lauryl mercaptan, or t-dodecyl mercaptan may be used.

When the (meth)acrylic resin particles are produced by emulsion polymerization, as described above, a surfactant or a polymer dispersant can be used as an emulsifier. As an example of the polymer dispersant, a water-soluble (meth)acrylic resin can be used. One type of these materials may be used alone, or two or more types may be used in combination.

As the surfactant, a known compound can be used. Examples thereof include anionic reactive emulsifiers, such as alkyl ether-based emulsifiers (examples of commercially available products include Aqualon KH-05, KH-10, and KH-20 available from DKS Co., Ltd., Adeka Reasoap SR-10N and SR-20N available from Adeka Corporation, and Latemul PD-104 available from Kao Corporation); sulfosuccinate-based emulsifiers (examples of commercially available products include Latemul 5-120, S-120A, S-180P, and S-180A available from Kao Corporation, and Eleminol JS-2 available from Sanyo Chemical Industries, Ltd.); alkyl phenyl ether-based emulsifiers or alkyl phenyl ester-based emulsifiers (examples of commercially available products include Aqualon H-2885A, H-3855B, H-3855C, H-3856, HS-05, HS-10, HS-20, and HS-30 available from DKS Co., Ltd., and Adeka Reasoap SDX-222, SDX-223, SDX-232, SDX-233, SDX-259, SE-10N, and SE-20N available from Adeka Corporation); (meth)acrylate sulfate-based emulsifiers (examples of commercially available products include Antox MS-60 and MS-2N available from Nippon Nyukazai Co., Ltd., and Eleminol RS-30 available from Sanyo Chemical Industries, Ltd.); and phosphate-based emulsifiers (examples of commercially available products include H-3330PL available from DKS Co., Ltd., and Adeka Reasoap PP-70 available from Adeka Corporation);

anionic non-reactive emulsifiers, such as higher fatty acid salts such as sodium oleate, alkyl aryl sulfonate salts such as sodium dodecylbenzene sulfonate, alkyl sulfate salts such as sodium lauryl sulfate, polyoxyethylene alkyl ether sulfate salts such as sodium polyoxyethylene lauryl ether sulfate, polyoxyethylene alkylaryl ether sulfate salts such as sodium polyoxyethylene nonylphenyl ether sulfate, alkyl sulfosuccinate salts and derivatives thereof such as sodium monooctyl sulfosuccinate, sodium dioctyl sulfosuccinate, and sodium polyoxyethylene lauryl sulfosuccinate, and polyoxyethylene distyrenated phenyl ether sulfate salts; and nonionic non-reactive emulsifiers, such as polyoxyethylene alkyl ethers such as polyoxyethylene lauryl ether and polyoxyethylene stearyl ether; polyoxyethylene alkylphenyl ethers such as polyoxyethylene octylphenyl ether and polyoxyethylene nonylphenyl ether; sorbitan higher fatty acid esters such as sorbitan monolaurate, sorbitan monostearate, and sorbitan trioleate, polyoxyethylene sorbitan higher fatty acid esters such as polyoxyethylene sorbitan monolaurate; polyoxyethylene higher fatty acid esters such as polyoxyethylene monolaurate and polyoxyethylene monostearate; glycerin higher fatty acid esters such as glycerol monooleate and glycerol monostearate; and polyoxyethylene-polyoxypropylene block copolymers, and polyoxyethylene distyrenated phenyl ethers.

The emulsifiers listed above are preferably used at an amount from 0.05 to 5.0 parts by mass relative to 100 parts by mass of the ethylenically unsaturated monomer.

Urethane (Urea) Resin Particles

Next, urethane (urea) resin particles that can be used as the resin particles (A) will be described. Herein, the term "urethane (urea) resin particles" means urethane resin particles or urethane urea resin particles. In the present invention, urethane urea resin particles are preferably used as the resin particles (A1) from the viewpoint of providing a printed matter with suitable viscoelasticity.

The urethane urea resin particles are produced in accordance with a known method. For example, the urethane urea resin particles can be obtained by a method in which a polyol (u1) and a polyisocyanate (u2) are subjected to a polyaddition reaction, after which a chain extender (u3) is added to carry out a chain extension reaction.

Polyol (u1)

Examples of the polyol (u1) that can be used as a raw material in the urethane urea resin particles include polymer polyols such as polyester polyols, polycarbonate polyols, and polyether polyols.

Examples of the polyester polyol include polyester polyols obtained by a condensation reaction between a polyol component and a dibasic acid component. Among the polyol components, examples of the diol include ethylene glycol, diethylene glycol, triethylene glycol, propylene glycol, dipropylene glycol, tripropylene glycol, butylene glycol, 1,6-hexanediol, 2-methylpropanediol, 3-methyl-1,5-pentanediol, 3,3'-dimethylolheptane, polyoxyethylene glycol (having four or more oxyethylene groups), polyoxypropylene glycol (having four or more oxypropylene groups), 1,3-butanediol, 1,4-butanediol, neopentyl glycol, octanediol, butylethylpentanediol, 2-ethyl-1,3-hexanediol, cyclohexanediol, and bisphenol A. Examples of polyols having three or more hydroxyl groups include glycerin, trimethylolpropane, and pentaerythritol. On the other hand, examples of the dibasic acid component include aliphatic or aromatic dibasic acids such as terephthalic acid, adipic acid, azelaic acid, sebacic acid, dimer acid, hydrogenated dimer acid, phthalic anhydride, isophthalic acid and trimellitic acid, and anhydrides thereof. In addition, polyester polyols obtained by ring-opening polymerization of cyclic ester compounds may be used, such as, for example, polycaprolactone, poly(β-methyl-γ-valerolactone), and polyvalerolactone.

Examples of polyether polyols that can be used include homopolymers or copolymers of tetrahydrofuran, ethylene oxide, propylene oxide, butylene oxide, and the like; and condensates of hexanediol, methyl hexanediol, heptanediol, octanediol and the like.

As the polycarbonate polyol, for example, a reaction product of a polyol and a carbonate compound can be used. Specific examples of the carbonate compound include dialkyl carbonate, alkylene carbonate, and diaryl carbonate. Examples of the dialkyl carbonate include dimethyl carbonate and diethyl carbonate, examples of the alkylene carbonate include ethylene carbonate, and examples of the diaryl carbonate include diphenyl carbonate. Note that as the polyol constituting the polycarbonate polyol, a polyol described above as a constituent component of the polyester polyol can be used, and in addition thereto, polybutadiene polyol, acrylic polyol, polysiloxane polyol, castor oil polyol, and the like can also be used.

The above-described polymer polyols may be used alone or in combination of one or more types thereof. Among these, from the viewpoint of improving blocking resistance and lamination suitability of the printed matter, a polyester polyol and/or a polycarbonate polyol is preferably used as the polymer polyol.

As described above, when urethane (urea) resin particles are used as the resin particles (A), it is preferable to use urethane urea resin particles from the viewpoint of providing a printed matter with suitable viscoelasticity. Accordingly, from the viewpoint of providing a printed matter with exceptionally excellent blocking resistance and lamination suitability, in a case in which urethane (urea) resin particles are used as the resin particles (A), it is particularly preferable to use urethane urea resin particles (also referred to as "ester-based urethane urea resin particles" in the present invention) in which a polyester polyol is used as the polyol (u1), and/or urethane urea resin particles (also referred to as "carbonate-based urethane urea resin particles" in the present invention) in which a polycarbonate polyol is used as the polyol (u1).

As a method of dispersing the urethane (urea) resin in an aqueous medium, similar to the case of the (meth)acrylic resin particles, a method of using a surfactant or a polymer dispersant as an emulsifier may be employed. However, in the present invention, from the viewpoint of suitably exhibiting the above-described effect of the present invention, a suitable method of dispersing the urethane (urea) resin in the aqueous medium is to introduce a hydrophilic group into the resin skeleton, without using such an emulsifier. From this viewpoint, in one embodiment, using, as the polyol (u1), a polyol having an ethylene oxide group is effective. In another embodiment, from the viewpoint of improving water friction resistance and lamination suitability of the printed matter, it is particularly preferable to use a polyol having an anionic functional group. Among the polyols having an anionic functional group, a polyol having a carboxyl group is preferably used from the viewpoint of providing a printed matter that exhibits excellent scratch resistance and lamination suitability after drying.

Examples of the polyol having a carboxyl group include dimethylolalkanoic acids such as dimethylolacetic acid, dimethylolpropionic acid, dimethylolbutanoic acid, 2,2-dimethylolbutyric acid, and 2,2-dimethylolpentanoic acid; and dihydroxysuccinic acid, dihydroxypropionic acid, and dihydroxybenzoic acid. These carboxyl group-containing polyols may be used alone or in combination of two or more thereof.

Note that the above-described anionic functional group may be neutralized. Examples of the neutralizing agent used for neutralization include basic compounds. For example, an above-described basic compound that can be used when neutralizing the acid group-containing ethylenically unsaturated monomer constituting the (meth)acrylic resin particles can be used.

On the other hand, a low molecular weight polyol can be used as the polyol (u1) for purposes such as increasing the concentration of urethane bonds in the urethane (urea) resin skeleton and introducing a branched structure or tertiary amino group into the urethane (urea) resin.

Examples of the low molecular weight polyol include ethylene glycol, 1,2-propanediol, 1,3-propanediol, 1,3-butanediol, 1,4-butanediol, neopentyl glycol, 1,5-pentanediol, 1,6-hexanediol, 1,8-octanediol, 2-butyl-2-ethyl-1,3-propanediol, 1,4-butylenediol, dipropylene glycol, glycerin, trimethylolpropane, trimethylolethane, 1,2,6-butanetriol, pentaerythritol, and sorbitol N,N-bis(2-hydroxypropyl)aniline.

Further, an ethylenically unsaturated group can be introduced into the urethane (urea) resin skeleton by using, in combination, an ethylenically unsaturated monomer having at least two hydroxyl groups and one unsaturated group in one molecule as the polyol (u1).

Examples of the ethylenically unsaturated monomer having at least two hydroxyl groups and one unsaturated group in one molecule include a reaction product of glycidol and acrylic acid, and a reaction product of a triol, diisocyanate and 2-hydroxymethacrylate.

Polyisocyanate (u2)

Examples of the polyisocyanate (u2) to be reacted with the polyol (u1) include aromatic, aliphatic, or alicyclic polyisocyanates.

Examples of the aromatic polyisocyanate include 2,4-tolylene diisocyanate, 2,6-tolylene diisocyanate, m-phenylene diisocyanate, p-phenylene diisocyanate, 4,4'-diphenylmethane diisocyanate, xylylene diisocyanate, lysine diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, and m-tetramethylxylylene diisocyanate.

Examples of the aliphatic polyisocyanate include tetramethylene diisocyanate, hexamethylene diisocyanate, and trimethylhexamethylene diisocyanate.

Examples of the alicyclic polyisocyanate include isophorone diisocyanate, 1,4-cyclohexylene diisocyanate, and 4,4'-dicyclohexylmethane diisocyanate.

The above-listed polyisocyanates may be used alone or in combination with two or more thereof.

Moreover, examples of a catalyst used in the polyaddition reaction between the polyol (u1) and the polyisocyanate (u2) include dibutyltin dilaurate, tin octoate, dibutyltin di(2-ethylhexoate), lead 2-ethylhexoate, 2-ethylhexyl titanate, titanium ethyl acetate, iron 2-ethylhexoate, cobalt 2-ethylhexoate, zinc naphthenate, cobalt naphthenate, tetra-n-butyltin, tin (II) chloride, tin (IV) chloride, and iron chloride.

Chain Extender (u3)

When a urethane urea resin is used as the resin particles (A), a chain extension reaction is carried out during production. Through the chain extension reaction, the molecular weight of the polyurethane resin can be further increased, and urea bonds are introduced, and thereby an excellent effect of the resin particles (A) can be anticipated. The chain extension reaction is carried out by producing a urethane prepolymer having isocyanate groups in excess and then adding, as the chain extender (u3), a polyfunctional active hydrogen-containing compound that is reactive with the isocyanate groups. From the viewpoint of suppressing a significant increase in the viscosity of the resin solution, the chain extension reaction is preferably carried out after the urethane prepolymer has been neutralized.

Examples of the chain extender (u3) that can be used include hydrazine, ethylene diamine, propylene diamine, hexamethylene diamine, nonamethylene diamine, xylylene diamine, isophorone diamine, piperazine, and derivatives thereof;

diamines such as phenylene diamine, tolylenediamine, m-tetramethyl xylylene diamine, N-(2-aminoethyl) ethanolamine, adipic dihydrazide, and isophthalic dihydrazide;

triamines such as diethylene triamine;

diols such as ethylene glycol, propylene glycol, 1,4-butanediol, 1,6-hexanediol, 1,4-bis(p-hydroxyethoxy) benzene, 1,4-cyclohexane diol, bis(p-hydroxyethyl) terephthalate, and xylylene glycol; and triols such as trimethylolpropane;

pentaols such as pentaerythritol; and amino alcohols such as aminoethyl alcohol and aminopropyl alcohol.

In addition, with the use of the above-listed compounds in combination with a monoamine and/or a monool, the molecular weight can be adjusted by controlling the chain extension reaction.

Organic Solvent Used in Polyaddition Reaction and Chain Extension Reaction

The polyaddition reaction and the chain extension reaction can be carried out even in solvent-free conditions, but in consideration of the viscosity of the solution after the reaction, the reactions are preferably carried out in the presence of an organic solvent. In particular, the organic solvent is preferably one that is inert to isocyanate groups in the polyisocyanate (u2) used as a raw material and that can dissolve the hydrophilic raw material and the product.

Preferable examples of the organic solvents include ethers such as tetrahydrofuran and dioxane; esters such as ethyl acetate; ketones such as acetone, methyl ethyl ketone, and cyclohexanone; and amides such as dimethylformamide and N-methyl pyrrolidone. In particular, an organic solvent having a boiling point lower than that of water is preferably used in consideration of the fact that the drying rate of the pretreatment liquid can be increased when the solvent is removed by distillation under reduced pressure after the completion of the reaction or when the solvent is not removed.

Urethane-(Meth)Acrylic Resin Particles

The urethane-(meth)acrylic resin particles used as the resin particles (A) can be produced by, for example, a method in which a (meth)acrylic resin having a diol terminal is used as the polyol (u1) in the production of urethane (urea) resin particles; or a method in which an ethylenically unsaturated monomer is subjected to emulsion polymerization using a water-soluble urethane (urea) resin as an emulsifier.

The (meth)acrylic resin having a diol terminal can be obtained, for example, by polymerizing an ethylenically unsaturated monomer in a solution using thioglycerol as a chain transfer agent. Moreover, as the ethylenically unsaturated monomer, the same compounds as the ethylenically unsaturated monomers that can be used in the production of the (meth)acrylic resin described above can be used.

In one embodiment, emulsion-type resin particles containing a surfactant or a polymer dispersant as an emulsifier may be used as the resin particles (A). In another embodiment, dispersion-type resin particles dispersed in a liquid by a functional group such as an acid group present in the resin molecule without using an emulsifier may be used. For example, when (meth)acrylic resin particles or styrene-(meth)acrylic resin particles are to be used as the resin particles (A), emulsion-type resin particles are preferably used from the viewpoint of the storage stability of the pretreatment liquid.

As the resin particles (A), resin particles synthesized by a known synthesis method may be used, or a commercially available product may be used. When the resin particles (A) are selected from commercially available products, examples of products that can be used include products of the Parasol series (available from Ohara Paragium Chemical Co., Ltd.); products of the Ucoat series and Permarin series (available from Sanyo Chemical Industries, Ltd.); products of the Superflex series and Superflex E series (available from DKS Co., Ltd.); products of the WEM series and WBR series (available from Taisei Fine Chemical Co., Ltd.); products of the Hydran series (available from DIC Corporation); products of the HYTEC series (available from Toho Chemical Industry Co., Ltd.); products of the Superchlon series and the Auroren series (available from Nippon Paper Industries Co., Ltd.); products of the Nichigo-Polyester series (available from Nippon Synthetic Chemical Industry Co., Ltd.); products of the AQUACER series and the Hordamer series (available from BYK-Chemie GmbH); products of the Takelac series (available from Mitsui Chemicals, Inc.); products of the Pascol series (available from Meisei Chemical Works, Ltd.); products of the Arrowbase series (available from Unitika Ltd.); products of the NeoCryl series and NeoRez series (available from DSM Coating Resins Ltd.); products of the Adeka Bontighter HUX series (available from Adeka Corporation); products of the Urearno series (available from Arakawa Chemical Industries, Ltd.); and products of the Plas Coat series (available from Goo Chemical Co., Ltd.).

Aggregating/Thickening Component

Calcium Ions

The pretreatment liquid of the present invention contains calcium ions. The calcium ions function as an aggregating/thickening component. Note that the term "calcium ions" in the present invention includes the calcium portion that is miscible with the pretreatment liquid, but does not include the calcium portion contained in a precipitate from the pretreatment liquid.

The calcium ions are added to the pretreatment liquid in the form of a salt, for example. At this time, as a counter anion to be combined with the calcium salt, a carboxylate ion described below may be used, or other ions (for example, an organic acid ion, an inorganic ion, and the like) may be used. Furthermore, from the viewpoints of providing a printed matter having excellent blocking resistance over time, image quality, and lamination suitability, and providing a pretreatment liquid having excellent storage stability without the generation of precipitates, a counter anion capable of forming a calcium salt having a solubility of from 1 to 70 g in 100 g of water at 20° C. is preferably selected. It should be noted that as the abovementioned solubility, a solubility value in the case of a calcium salt anhydride, is used. Specific examples of the counter anion that can be suitably used in the present invention are as described below.

In the pretreatment liquid of the present invention, when an amount of the calcium ions in millimoles contained in 100 g of the pretreatment liquid is denoted by C, C is preferably from 10 to 60 mmol, more preferably from 15 to 50 mmol, and particularly preferably from 20 to 40 mmol. When the amount of the calcium ions in millimoles is within this range, the aggregating/thickening action can be sufficiently exhibited, and a printed matter having excellent image quality can be obtained. In addition, since the action of the resin particles (A) present in the pretreatment liquid is not inhibited, the blocking resistance and lamination suitability of the printed matter are also good.

Also, as described above, from the viewpoint of improving the blocking resistance, image quality, and lamination suitability altogether in cases where the calcium ions serve as the aggregating/thickening component and the resin particles (A) contribute to the blocking resistance and lamination suitability coexist in the treatment liquid, a value expressed by R/C is from 0.11 to 0.50, preferably from 0.20 to 0.50, and particularly preferably from 0.25 to 0.40, where R(g) is the amount of the resin particles (A) in terms of solid content contained in 100 g of the pretreatment liquid.

Carboxylate Ions

The pretreatment liquid of the present invention contains plural types of carboxylate ions and one or more of the plural types of carboxylate ions is a hydroxycarboxylate ion.

As described above, by using two or more types of carboxylate ions including at least one type of hydroxycarboxylate ion, the water solubility of the calcium salt of carboxylic acid is improved by an effect similar to the uncommon-ion effect, and a balance between mixed color bleeding and solid filling can be achieved. In addition, the solubility of the salt formed by the hydroxycarboxylate ion and the calcium ion is easily maintained even when the composition of the liquid component changes in association with drying. Therefore, in an inkjet ink in which the salt is present, the non-uniform spreading of droplets is suppressed, and the solid filling of the printed matter is further improved.

The carboxylate ions are added to the pretreatment liquid in the form of, for example, carboxylic acid or salt. When the carboxylate ions are added in the form of a salt, the counter cation may be a calcium ion or another cation. Examples of the other cations include an alkali metal ion, an alkaline earth metal ion (excluding calcium ions), a trivalent metal ion, and a quaternary ammonium ion.

The carboxylate ion coexists with the calcium ion in the pretreatment liquid. Therefore, from the above-described viewpoints, a carboxylate ion that forms a calcium salt having a solubility of from 1 to 70 g in 100 g of water at 20° C. is preferably selected, regardless of the form in which the carboxylate ions are added to the pretreatment liquid. Specific examples thereof include a formate ion (17 g), an acetate ion (28 g), a propionate ion (38 g), a butyrate ion (17 g), a benzoate ion (2 g), a lactate ion (3 g), a gluconate ion (3 g), and a pantothenate ion (35 g). The values shown in parentheses are the solubilities of the calcium salts in 100 g of water at 20° C.

In the pretreatment liquid of the present invention, when the total millimolar equivalent of carboxylate ions contained in 100 g of the pretreatment liquid is denoted by A, A is preferably from 10 to 60 millimolar equivalents, more preferably from 15 to 50 millimolar equivalents, and particularly preferably from 20 to 40 millimolar equivalents. Within this range, both the storage stability of the pretreatment liquid and the image quality described above can be easily achieved.

In addition, from the viewpoint of providing a recording liquid set that remarkably excels in storage stability of the pretreatment liquid and image quality, a value expressed by C×2/A as a relationship between the total millimolar equivalent A of the carboxylate ions and the millimolar amount C of the calcium ions is preferably from 0.8 to 1.1. This value is more preferably from 0.9 to 1.1.

Non-Carboxylate Ions

As counter anions to the calcium ions, counter anions to other polyvalent metal ions (described later in detail), a pH adjuster, or the like, the pretreatment liquid of the present invention may contain ions (non-carboxylate ions) besides the carboxylate ions.

Examples of the non-carboxylate ions include organic acid ions such as phosphonate ions, phosphate ions, phosphite ions, and phosphinate ions; and inorganic ions such as fluoride ions, chloride ions, bromide ions, iodide ions, sulfate ions, nitrate ions, carbonate ions, and hydrogen carbonate ions. Among these, from the above-described viewpoints, a non-carboxylate ion that forms a calcium salt having a solubility of from 1 to 70 g in 100 g of water at 20° C. is preferably selected. Specific examples thereof include a dihydrogen phosphate ion (2 g), a glycerophosphate ion (5 g), a hydrogen carbonate ion (17 g), and an iodide ion (67 g).

In the pretreatment liquid of the present invention, from the viewpoint of suitably exhibiting the effect of the carboxylate ions described above, when the millimolar equivalent of the non-carboxylate ions contained in 100 g of the pretreatment liquid is denoted by B, a value expressed by B/(A+B) is preferably from 0 to 0.5, more preferably from 0 to 0.3, and particularly preferably from 0 to 0.1.

Calcium Salt of Carboxylic Acid

In one embodiment, the pretreatment liquid of the present invention can suitably use a calcium salt of carboxylic acid as a flocculant component (here, meaning a compound that can supply an aggregating/thickening component, that is, a flocculant). The pretreatment liquid may contain plural types of calcium salts of carboxylic acids. In comparison to other polyvalent metal ions, calcium salts have a greater ionization tendency and more easily generate cations. In addition, calcium salts have a greater aggregation effect, a smaller ionic radius, and more easily diffuse in ink droplets, and therefore calcium salts are suitably used from the viewpoint of suppressing mixed color bleeding. Moreover, since the solubility of a carboxylic acid metal salt in water is low, and excessive dissolution in an ink is suppressed, color mixing, bleeding and color unevenness during overlap printing or printing at a high coverage rate can be suppressed. In addition, a sufficient amount of the flocculant component can be added to the pretreatment liquid due to an effect similar to the uncommon-ion effect, and therefore blocking resistance and lamination strength can be improved without reducing image quality.

In a case in which a calcium salt of hydroxycarboxylic acid is used among the calcium salt of carboxylic acid, recrystallization after drying is suppressed, and thereby the flocculant component is easily dissolved instantaneously even when overlap printing or printing after the pretreatment liquid is completely dried, and thus a printed matter having excellent image and character reproducibility can be obtained. In addition, blocking resistance and lamination suitability can be further improved.

To suppress excessive dissolution of the flocculant component and thereby obtain a printed matter with improved image quality in a printed portion and an overlap printed portion printed at a high coverage rate and excelling properties, such as adhesion, the solubility of the calcium salt of carboxylic acid in 100 g of water at 20° C. is preferably from 1 to 35 g/100 g $H_2O$, and is particularly preferably from 3 to 30 g/100 g $H_2O$.

Note that the calcium salt of carboxylic acid used in the pretreatment liquid of the present invention may be either an anhydride or a hydrate. However, it should be noted that the abovementioned solubility is a value obtained with regard to the anhydride.

Examples of the calcium salts of carboxylic acid that can be used in the pretreatment liquid of the present invention include calcium formate, calcium acetate, calcium propionate, calcium butyrate, calcium benzoate, calcium lactate, calcium gluconate, calcium pantothenate, and calcium malate. For the reasons described above, among these, calcium salts of carboxylic acid having a solubility of from 3 to 30 g/100 g $H_2O$ at 20° C. are more preferable. As specific examples, one or more selected from the group consisting of calcium formate, calcium acetate, calcium propionate, calcium lactate, and calcium gluconate can be preferably used. Furthermore, for the same reason, all of the plural types of calcium salts of carboxylic acid present in the pretreatment liquid is preferably selected from the abovementioned calcium salts of carboxylic acid that can be suitably used.

In addition, as described above, the hydrogen bond formed by the calcium salts of carboxylic acid optimizes the viscoelasticity of the entire printed matter and improves the blocking resistance and lamination suitability. Therefore, the abovementioned properties may vary depending on the amount of the hydroxy group contained in the salts of hydroxycarboxylic acid. From this viewpoint, in the pretreatment liquid of the present invention, when the molar amount of the hydroxy group derived from the calcium salt of hydroxycarboxylic acid contained in 100 g of the pretreatment liquid is denoted by HB1 (mmol), the value of HB1 is preferably from 5 to 48 (mmol), more preferably from 7 to 38 (mmol), and particularly preferably from 9 to 28 (mmol).

As an example, a method for calculating the HB1 will be described for a pretreatment liquid containing 3 mass % of calcium lactate. The molecular weight of calcium lactate is 218.2, and the number of hydroxy groups present in one molecule of calcium lactate is two (because two lactate ions are present in one molecule of calcium lactate). In this case, the value of HB1 is $\{(3\div218.2)\times2\}\times1000\approx27.5$ (mmol).

Other Aggregating/Thickening Component

The pretreatment liquid of the present invention may contain an aggregating/thickening component besides the calcium ions (hereinafter, also referred to as "other aggregating/thickening component"). Specific examples of the other aggregating/thickening components include polyvalent metal ions other than calcium ions (hereinafter also referred to as "other polyvalent metal ions") and water-soluble cationic polymers.

Other Polyvalent Metal Ions

In a case in which the pretreatment liquid contains other polyvalent metal ions, the other polyvalent metal ions are preferably divalent. The divalent metal ions are rapidly released upon contact with the inkjet ink and exhibit an excellent aggregating/thickening action. In addition, in comparison with metal ions having a valence of 3 or higher, the rate of aggregation and/or thickening is not excessively high, and wet spreading of the inkjet ink on a recording medium can be appropriately suppressed, and a printed matter having excellent image quality is obtained.

Examples of the divalent metal ions that can be suitably used in the pretreatment liquid of the present invention include magnesium ions, zinc (II) ions, and iron (II) ions. Among these, magnesium ions are rapidly released in an inkjet ink upon contact, and the rate of aggregation and/or thickening is not excessively high. Therefore from the viewpoint of providing a printed matter with particularly excellent image quality, magnesium ions can be particularly preferably used.

Note that when other polyvalent metal ions are used, one type may be used alone, or two or more types may be used in combination. However, from the viewpoint of sufficiently exhibiting the above-described functions of the resin particles (A1), the calcium ions, and the carboxylate ions, when the total amount of the other polyvalent metal ions in millimoles contained in 100 g of the pretreatment liquid is denoted by C2 (mmol), the relationship between C and C2 is preferably $C\geq C2$, more preferably $C\geq C2\times2$, even more preferably $C\geq C2\times5$, and particularly preferably $C\geq C2\times10$.

The other polyvalent metal ions are added to the pretreatment liquid in the form of, for example, a salt with the above-described carboxylic acid; a salt or complex salt with the above-described non-carboxylate ion and/or hydroxide ion; or a hydroxide.

Water-Soluble Cationic Polymer

When the pretreatment liquid contains a water-soluble cationic polymer, a polymer containing one or more types of structural units selected from the group consisting of a diallyl amine structural unit, a diallyl ammonium structural unit, and an epihalohydrin structural unit is preferably used. The adhesion and lamination suitability of the printed matter are improved by using a pretreatment liquid containing these polymers.

As in the case of the calcium ions described above, a water-soluble cationic polymer having a solubility of 5 g or more in 100 g of water at 20° C. is preferably selected from the viewpoint of providing a printed matter having excellent blocking resistance over time, image quality, and lamination suitability and providing a pretreatment liquid having good storage stability.

Whether the solubility of the water-soluble cationic polymer in 100 g of water at 20° C. is 5 g or more is determined by whether a 50% diameter is measurable with regard to a sample obtained by leaving a mixture of 5 g of the water-soluble cationic polymer and 100 g of water standing at 20° C. for 24 hours. At this time, when the water-soluble cationic polymer is available only in the form of an aqueous solution such as a commercially available product, a sample is obtained by adding water or removing water by volatilization, such that the solid content becomes 5 g per 100 g of water. Similar to the 50% diameter of the resin particles (A1), the 50% diameter is a volume-based median diameter measured by a dynamic light scattering method.

The type of the water-soluble cationic polymer is not particularly limited, and known cationic polymers can be optionally used. In addition, a water-soluble cationic polymer synthesized by a known synthesis method may be used, or a commercially available product may be used. Among these, a polymer containing a diallyl ammonium structural unit has a strong aggregating/thickening action and can be used to easily obtain a printed matter with excellent image quality, and is thus particularly suitably selected. From the viewpoint of availability and the like, a hydrochloride or ethyl sulfate salt of diallyl dimethyl ammonium and/or diallyl methyl ethyl ammonium is preferably selected as the diallyl ammonium structural unit.

Examples of commercially available products of the water-soluble cationic polymer containing a diallylammonium structural unit include PAS-H-1L, PAS-H-5L, PAS-24, PAS-J-81L, PAS-J-81, PAS-J-41, and PAS-880 (available from Nittobo Medical Co., Ltd.); and Unisence FPA1000L, FPA1001L, FPA1002L, FCA1000L, FCA1001L, and FCA5000L (available from Senka Corporation).

The water-soluble cationic polymer may be used alone, or two or more types may be used in combination. However, from the viewpoint of sufficiently exhibiting the above-described functions of the resin particles (A1), the calcium ions, and the carboxylate ions described above, when the total amount of the water-soluble cationic polymer contained in 100 g of the pretreatment liquid is denoted by PC (g), the relationship between R and PC is preferably $R\geq PC$, more preferably $R\geq PC\times2$, and particularly preferably $R\geq PC\times5$.

Organic Solvent

Preferably, the pretreatment liquid of the present invention contains at least water as a solvent and further contains an organic solvent. By using an organic solvent in combination, the solubility of the flocculant component and the surfactant, and the drying and the wet spreading properties of the pretreatment liquid can be suitably adjusted. In the pretreatment liquid of the present embodiment, one type of organic solvent may be used alone, or two or more types of organic solvents may be used in combination.

The organic solvent that can be used is not particularly limited, and the pretreatment liquid preferably contains a water-soluble organic solvent. In the present application, the term "water-soluble organic solvent" refers to a solvent that is liquid at 25° C. and has a solubility of 1 mass % or greater in water at 25° C.

When the pretreatment liquid of the present embodiment contains an organic solvent, from the viewpoints of high affinity with the resin particles (A), the flocculant component, and the surfactant, and an improvement in the storage stability of the pretreatment liquid, a water-soluble organic solvent (B) having one or more hydroxy groups in the molecular structure is preferably used. In one embodiment, a calcium salt of hydroxycarboxylic acid and the water-soluble organic solvent (B) are used in combination, thereby the affinity of the hydroxycarboxylate ions improves, and the hydroxycarboxylate ions can be uniformly present in the entire pretreatment liquid layer. Consequently, the dispersion state of the resin particles (A) can be stabilized, and the affinity with the inkjet ink can be improved, as a result, the storage stability of the pretreatment liquid and the image quality of the printed matter can be improved. Furthermore, such a configuration makes it possible to adjust the wet-spreading property and drying property of the pretreatment liquid, and therefore uniform application on a recording medium is achieved, and improvements in productivity, adhesion of the printed matter, and image quality are facilitated.

In the pretreatment liquid of the present invention, one type of water-soluble organic solvent (B) may be used alone, or two or more types may be used in combination. In addition, the type of water-soluble organic solvent (B) that can be used is not limited, and known water-soluble organic solvents can be optionally used. Among these, water-soluble organic solvents having a static surface tension of from 20 to 40 mN/m at 25° C. are preferably used from the viewpoints of optimizing the wet spreading property and drying property of the pretreatment liquid and improving the adhesion and image quality of the printed matter. The static surface tension of the water-soluble organic solvent is more preferably from 20 to 35 mN/m and is even more preferably from 20 to 30 mN/m. From the same viewpoints, a water-soluble organic solvent having a boiling point of from 75 to 200° C. under 1 atm is preferably used. The boiling point of the water-soluble organic solvent is more preferably from 75 to 180° C. and is even more preferably from 80 to 160° C.

The static surface tension of the water-soluble organic solvent (B) is a value measured by the Wilhelmy method in an environment at 25° C. Specifically, for example, the static surface tension can be measured using the "DY-300" available from Kyowa Interface Science Co., Ltd. and a platinum plate in a 25° C. environment.

In addition, from the viewpoint of improving the affinity of the hydroxycarboxylate ions to improve the storage stability of the pretreatment liquid and the image quality of the printed matter, a water-soluble organic solvent containing one or more hydroxyl groups in the molecular structure is preferably used. In this case, from the viewpoint of exhibiting the above-described effects more suitably, the content of the water-soluble organic solvent containing one or more hydroxyl groups in the molecular structure is preferably from 50 to 100 mass %, more preferably from 70 to 100 mass %, and particularly preferably from 90 to 100 mass %, in relation to the total amount of the water-soluble organic solvent (B), Examples of the water-soluble organic solvents containing one or more hydroxyl groups in the molecular structure include monohydric alcohol-based solvents such as methanol, ethanol, 1-propanol, 2-propanol, 1-butanol, and 2-butanol;

dihydric alcohol (glycol)-based solvents such as 1,2-ethanediol, 1,2-propanediol, 1,3-propanediol, 1,2-butanediol, 1,3-butanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl-2-propyl-1,3-propanediol, 2-methylpentane-2,4-diol, 2-ethyl-1,3-hexanediol, 1,2-octanediol, diethylene glycol, triethylene glycol, tetraethylene glycol, polyethylene glycol #200, polyethylene glycol #400, dipropylene glycol, tripropylene glycol, and dibutylene glycol;

glycol monoalkyl ether-based solvents such as ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monobutyl ether, dipropylene glycol monopropyl ether, tripropylene glycol monomethyl ether, tripropylene glycol monoethyl ether, 1,2-butylene glycol monomethyl ether, 3-methoxybutanol, and 3-methyl-3-methoxybutanol; and chain polyol-based solvents such as glycerin, trimethylolpropane, 1,2,4-butanetriol, 1,2,6-hexanetriol, diglycerin, and polyglycerin.

In addition to the solvents exemplified above, other solvents that can be used as the water-soluble organic solvent (B) include glycol dialkyl ether-based solvents such as diethylene glycol dimethyl ether, diethylene glycol methylethyl ether, diethylene glycol butylmethyl ether, diethylene glycol diethyl ether, triethylene glycol dimethyl ether, triethylene glycol methylethyl ether, triethylene glycol butylmethyl ether, triethylene glycol diethyl ether, tetraethylene glycol dimethyl ether, tetraethylene glycol methylethyl ether, tetraethylene glycol butylmethyl ether, and tetraethylene glycol diethyl ether;

nitrogen-containing solvents such as 2-pyrrolidone, N-methylpyrrolidone, N-ethylpyrrolidone, ε-caprolactam, 3-methyl-2-oxazolidinone, 3-ethyl-2-oxazolidinone, N,N-dimethyl-β-methoxypropionamide, N,N-dimethyl-β-ethoxypropionamide, N,N-dimethyl-β-butoxypropionamide, N,N-dimethyl-β-pentoxypropionamide, N,N-dimethyl-β-hexoxypropionamide, N,N-dimethyl-β-heptoxypropionamide, N,N-dimethyl-β-2-ethylhexoxypropionamide, N,N-dimethyl-β-octoxypropionamide, N,N-diethyl-β-butoxypropionamide, N,N-diethyl-3-pentoxypropionamide, N,N-diethyl-β-hexoxypropionamide, N,N-diethyl-β-heptoxypropionamide, and N,N-diethyl-β-octoxypropionamide; and heterocyclic compounds such as γ-butyrolactone, γ-valerolactone, δ-valerolactone, and F-caprolactone.

The total content of the water-soluble organic solvent (B) in the pretreatment liquid is preferably from 1 to 50 mass %, more preferably from 2 to 40 mass %, and particularly preferably from 3 to 30 mass %, in relation to the total amount of the pretreatment liquid. By setting the content of the water-soluble organic solvent (B) to within the above range, the affinity of the above-described hydroxycarboxylate ions can be improved, and as a result, the storage stability of the pretreatment liquid and the image quality of the printed matter are improved. In addition, the pretreatment liquid can be stably and uniformly applied over a long period of time without causing printing defects regardless of the method of applying the pretreatment liquid.

In the pretreatment liquid of the present invention, the content of the water-soluble organic solvent having a boiling point of 240° C. or higher at 1 atm is preferably 5 mass % or less (may be 0 mass %), more preferably 2 mass % or less (may be 0 mass %), and particularly preferably 1 mass % or less (may be 0 mass %) in relation to the total amount of the pretreatment liquid. When a water-soluble organic solvent having a boiling point of 240° C. or higher is not contained or is contained at a blending amount within the above range, a printed matter having excellent blocking resistance, image quality, and lamination suitability is obtained, and the drying property of the pretreatment liquid is sufficient.

Further, for the same reason as described above, in addition to the content of the water-soluble organic solvent having a boiling point of 240° C. or higher at 1 atm being less than 5 mass % relative to the total amount of the pretreatment liquid, the content of the water-soluble organic solvent having a boiling point of 220° C. or higher at 1 atm is preferably 10 mass % or less (or 0 mass %), more preferably 5 mass % or less (or 0 mass %), and particularly preferably 2 mass % or less (or 0 mass %) relative to the total amount of the pretreatment liquid.

Surfactant (C)

The pretreatment liquid of the present invention may further contain a surfactant (C) from the viewpoint of facilitating stable and uniform application onto a recording medium. The type of the surfactant (C) that can be used is not limited, and any known surfactant can be optionally used. Among these, an acetylenediol-based surfactant or a siloxane-based surfactant is more preferably used from the viewpoint of improving stable and uniform application onto a recording medium and providing a printed matter with excellent adhesion, image quality, and lamination suitability.

Examples of the acetylenediol-based surfactant include 2,4,7,9-tetramethyl-5-decyne-4,7-diol, 2,5,8,11-tetramethyl-6-dodecyne-5,8-diol, hexadec-8-yne-7,10-diol, 6,9-dimethyl-tetradec-7-yne-6,9-diol, 7,10-dimethylhexadec-8-yne-7,10-diol, and ethylene oxide and/or propylene oxide adducts thereof.

Examples of commercially available products of the acetylenediol-based surfactants include Surfynol 61, 104E, 104H, 104A, 104BC, 104DPM, 104PA, 104PG-50, 420, 440, 465, 485, SE, and SE-F, and Dynol 604 and 607 (available from Air Products Inc.), and Olfine E1004, E1010, E1020, PD-001, PD-002W, PD-004, PD-005, EXP. 4001, EXP. 4200, EXP. 4123, and EXP. 4300 (available from Nissin Chemical Co., Ltd.).

Examples of commercially available products of the siloxane-based surfactants include BY16-201, FZ-77, FZ-2104, FZ-2110, FZ-2162, F-2123, L-7001, L-7002, SF8427, SF8428, SH3749, SH8400, 8032 ADDITIVE, and SH3773M (available from Dow Corning Toray Co., Ltd.), TEGO Glide 410, TEGO Glide 432, TEGO Glide 435, TEGO Glide 440, TEGO Glide 450, TEGO Twin 4000, TEGO Twin 4100, TEGO Wet 250, TEGO Wet 260, TEGO Wet 270, and TEGO Wet 280 (available from Evonik Degussa Japan Co., Ltd.), SAG-002 and SAG-503A (available from Nissin Chemical Co., Ltd.), BYK-331, BYK-333, BYK-345, BYK-346, BYK-347, BYK-348, BYK-349, BYK-UV 3500, and BYK-UV 3510 (available from BYK-Chemie GmbH), and KF-351A, KF-352A, KF-353, KF-354L, KF-355A, KF-6004, KF-6011, KF-6012, KF-6013, KF-6015, KF-6016, KF-6017, KF-6043, KF-615A, KF-640, KF-642, and KF-643 (available from Shin-Etsu Chemical Co., Ltd.).

One compound of the surfactant (C) may be used alone, or two or more compounds may be used in combination. The content of the surfactant (C) in the pretreatment liquid of the present invention is preferably from 0.1 to 10 mass %, more preferably from 0.2 to 8 mass %, and particularly preferably from 0.5 to 5 mass % in relation to the total amount of the pretreatment liquid.

Water-Soluble Resin (D)

The pretreatment liquid of the present invention may further contain a water-soluble resin (D). The water-soluble resin (D) preferably includes a water-soluble resin (D-1) having a polyoxyethylene structure and having an acid value of from 1 to 30 mgKOH/g. As described above, the presence of the water-soluble resin (D-1) improves the affinity between the water-based inkjet ink to be printed later and the pretreatment liquid and a printed matter having excellent image quality is thereby obtained. In addition, the water-soluble resin (D-1) also functions as a dispersion stabilizer for the resin particles (A), and thereby the storage stability of the pretreatment liquid is improved. Furthermore, through the presence of the water-soluble resin (D-1), excellent properties can be obtained, which include adhesion to a substrate, blocking resistance and lamination strength of the printed matter. In this manner, the desired effects of the present invention can be easily obtained by using the water-soluble resin (D-1).

The water-soluble resin (D-1) has a polyoxyethylene (hereinafter, also simply referred to as "EO") structure. The average number of added moles of EO groups per EO structure present in the molecule of the water-soluble resin (D-1) is preferably within a range of 5 to 100, and more preferably within a range of 15 to 100. When the number of added moles of the EO groups is 5 or more, the resin particles (A) can maintain a good dispersion state in the pretreatment liquid, and long-term storage stability is improved. When the number of added moles of the EO groups is 100 or less, compatibility among the water-soluble resin (D-1), the resin particles (A), and the aggregating/thickening component improves, and a printed matter that is free from mixed color bleeding or color unevenness, good solid filling, excellent adhesion, and lamination suitability on a non-permeable substrate, can be obtained.

The content of the polyoxyethylene structure in the water-soluble resin (D-1) is preferably from 5 to 95 mass %, more preferably from 15 to 95 mass %, and particularly preferably from 30 to 95 mass %. When the content of the polyoxyethylene structure is 5 mass % or more, the polyoxyethylene structure can favorably interact with the resin particles (A) in the pretreatment liquid, and thus excellent storage stability can be exhibited. When the content is 95 mass % or less, compatibility among the water-soluble resin (D-1), the resin particles (A), and the aggregating/thickening component improves, and a printed matter that is free from mixed color bleeding or color unevenness, good solid filling, excellent adhesion, and lamination suitability on a non-permeable substrate, can be obtained.

The water-soluble resin (D-1) preferably further contains a polyoxypropylene (hereinafter, also simply referred to as "PO") structure in addition to the polyoxyethylene structure. When the water-soluble resin (D-1) has a PO structure, the average number of added moles of PO groups per PO structure present in the molecule of the water-soluble resin (D-1) is preferably within a range of 5 to 70, and more preferably within a range of 5 to 60. In comparison with the polyoxyethylene structure, the polyoxypropylene structure has a higher steric repulsion effect. Therefore, when the number of added moles of PO groups is 5 or more, the dispersion stability of the resin particles (A) in the pretreatment liquid can be significantly improved, and the long-term storage stability of the pretreatment liquid is further improved. When the number of added moles of the PO groups is 70 or less, compatibility among the water-soluble resin (D-1), the resin particles (A), and the aggregating/thickening component improves, and a printed matter that is free from mixed color bleeding and color unevenness, good solid filling, excellent adhesion, and lamination suitability on a non-permeable substrate can be obtained.

When the water-soluble resin (D-1) includes a polyoxypropylene structure, the content thereof is preferably from 1 to 80 mass %, and more preferably from 5 to 60 mass %.

Furthermore, when the water-soluble resin (D-1) contains a polyoxypropylene structure, a ratio of the content of the polyoxyethylene structure (EO group amount) and the content of the polyoxypropylene structure (PO group amount), that is, the ratio of (PO group amount)/(EO group amount) is preferably within a range of 0.1 to 2.0, and more preferably from 0.1 to 1.5. When the (PO group amount)/(EO group amount) ratio is 0.1 or greater, a certain amount of a polyoxypropylene structure having a high steric repulsion effect is present, and thus the dispersion stability of the resin particles (A) is improved, and the long-term storage stability of the pretreatment liquid is enhanced. In addition, when the (PO group amount)/(EO group amount) ratio is 2.0 or less, compatibility among the water-soluble resin (D-1), the resin particles (A), and the aggregating/thickening component improves, and a printed matter that is free from mixed color bleeding and color unevenness, good solid filling, excellent adhesion, and lamination suitability on a non-permeable substrate, can be obtained. In addition to these effects, the function obtained through the polyoxyethylene structure described above is suitably exhibited, and thus storage stability of the pretreatment liquid can also be improved.

In the present application, when the type and content percentage of the polymerizable monomer constituting the water-soluble resin (D-1) are known, a value calculated by the following Equation 5 is used as the content of the polyoxyethylene structure. Moreover, when the type and content percentage of the polymerizable monomer constituting the water-soluble resin (D-1) are unknown, the content percentage of the polymerizable monomer having a polyoxyethylene group and the number of added moles of the polyoxyethylene group are measured by nuclear magnetic resonance (NMR) measurements for example, and the content of the polyoxyethylene structure is calculated by the following Equation 5.

$$(\text{Content of } EO \text{ structure})(\text{mass \%}) = \sum [(ni \times MEO \div Mi) \times Wi] \quad \text{Equation 5}$$

In Equation 5, ni is the number of added moles of EO groups in the polymerizable monomer having a polyoxyethylene structure among the polymerizable monomers constituting the water-soluble resin (D-1), MEO is the molecular weight (44.05) of the EO group, Mi is the molecular weight of the polymerizable monomer having a polyoxyethylene structure, and Wi is the blending ratio (mass %) of the polymerizable monomer having a polyoxyethylene structure in relation to the total amount of the polymerizable monomers constituting the water-soluble resin (D-1).

The content of the above-described polyoxypropylene structure can be calculated in the same manner as in the case of the content of the polyoxyethylene structure described above. In this case, MPO, which is the molecular weight (58.08) of the PO group, is used instead of MEO.

In one embodiment, the water-soluble resin (D-1) contains preferably from 1 to 40 mass % and more preferably from 2 to 30 mass % of a structural unit derived from an ethylenically unsaturated monomer having an aromatic ring. When this content is 1 mass % or more, the adsorption efficiency of the water-soluble resin (D-1) onto the interface of the resin particles (A) is improved, and the dispersion stability of the resin particles (A) when mixed with the aggregating/thickening component is excellent. In addition, coatability onto the non-permeable substrate is excellent, and therefore adhesion and blocking resistance of the printed matter excel and also an excellent lamination strength is also exhibited when laminated. Furthermore, the compatibility between the water-soluble resin (D-1) and the resin particles (A) is improved, and the image quality of the printed matter is also enhanced. On the other hand, when the content is 40 mass % or less, the adhesion of the printed matter to a substrate and the lamination strength when laminated are improved.

As described above, from the viewpoint of achieving both stable dispersions of the resin particles (A) and suppressed interaction with the aggregating/thickening component, the acid value of the water-soluble resin (D-1) may be from 1 to 30 mgKOH/g and is more preferably from 5 to 25 mgKOH/g. When the acid value is from 1 to 30 mgKOH/g, in addition to the effects described above, adhesion to a substrate is also improved. This is because interaction is present between the water-soluble resin (D-1) and the resin particles (A) through the polyoxyethylene structure, even after the formation of the pretreatment liquid layer. Through this interaction, the printed matter exhibits an elastic behavior, and the coating film strength, blocking resistance, and lamination strength of the printed matter are also improved.

The weight average molecular weight of the water-soluble resin (D-1) is preferably from 2000 to 35000, and more preferably from 5000 to 25000. When the weight average molecular weight is within the above range, the dispersion stability of the resin particles (A) is improved, and a printed matter having excellent adhesion and lamination suitability is obtained. Further, the compatibility with the aggregating/thickening component and the resin component present in the water-based inkjet ink is improved, and thereby the image quality of the printed matter is also excellent.

The weight-average molecular weight of the water-soluble resin (D-1) is a value calibrated with polystyrene and can be measured using, for example, a gel permeation chromatography (GPC) ("HLC-8120 GPC" available from Tosoh Corporation) equipped with a TSKgel column (available from Tosoh Corporation) and a refractive index (RI) detector, and using tetrahydrofuran (THF) as a developing solution.

The type of water-soluble resin (D-1) that can be used in the pretreatment liquid of the present invention is not particularly limited. For example, a urethane (urea) resin, a urea resin, a (meth)acrylic resin, a urethane (urea)-(meth)acrylic resin, a styrene-maleic acid (anhydride) resin, a rosin-modified maleic acid resin, an α-olefin-maleic acid (anhydride) resin, a polyolefin resin, a polyester resin, a polyether resin, or a polycarbonate resin can be preferably used. More preferably, one type of resin selected from the group consisting of a (meth)acrylic resin, a styrene-maleic acid (anhydride) resin, and an α-olefin-maleic acid (anhydride) resin can be used, and particularly preferably, a (meth)acrylic resin and/or a styrene-maleic acid (anhydride) resin can be used.

These resins that can be preferably used are all polymers of ethylenically unsaturated monomers. That is, in the present invention, as the water-soluble resin (D-1), it is preferable to use a resin having, a polymer chain formed by polymerizing an ethylenically unsaturated monomer as the main chain, and having a polyoxyethylene structure (and a polyoxypropylene structure if present) as the side chain. In this case, the polyoxyethylene structure (and the polyoxypropylene structure, if present) may be introduced by polymerizing an EO (PO) structure-containing ethylenically unsaturated monomer together with the ethylenically unsaturated monomer constituting the main chain. As another method, the main chain may be polymerized in advance using only the ethylenically unsaturated monomer which does not have an EO (PO) structure, after which an ethylene oxide (propylene oxide) chain can be grafted thereto. Since the above-listed resins that can be preferably used have a structure having such a main chain and a side chain, these resins suitably interact with the resin particles (A) and can improve the storage stability of the pretreatment liquid.

As the water-soluble resin (D-1) listed above, a resin synthesized by a known method may be used, or a commercially available product may be used. In the case of selecting the resin from commercially available products, products such as DISPERBYK-190 and DISPERBYK-2015 available from BYK-Chemie GmbH; SMA1000, SMA2000, SMA EF30 and SMA EF60 available from Cray Valley SA; and TEGO Dispers 750W available from Evonik Industries AG can be suitably used, but the present invention is not limited thereto.

Water-Soluble (Meth)Acrylic Resin

In a case in which a synthesized product of a (meth) acrylic resin is to be used as the water-soluble resin (D-1), a product synthesized according to a known method can be used.

In a case in which a (meth)acrylic resin is to be used as the water-soluble resin (D-1), an acid group-containing ethylenically unsaturated monomer and an EO chain-containing ethylenically unsaturated monomer is used as the ethylenically unsaturated monomers serving as the raw materials of the (meth)acrylic resin, and a PO chain-containing ethylenically unsaturated monomer, an aromatic ethylenically unsaturated monomer, another ethylenically unsaturated monomer, or the like may be further used.

Examples of the "acid group" of the acid group-containing ethylenically unsaturated monomer include a carboxylic acid (carboxyl) group, a sulfonic acid group, and a phosphonic acid group, and any one type may be selected, or a compound in which two or more types coexist may be used. Among these, from the viewpoint of improving blocking resistance and lamination suitability, a carboxyl group is preferably selected. As the acid group-containing ethylenically unsaturated monomer, a known compound having the above-described acid group can be used.

Specific examples thereof include acrylic acid, methacrylic acid, carboxymethyl(meth)acrylate, carboxyethyl (meth)acrylate, acryloyloxyethyl succinate, methacryloyloxyethyl succinate, acryloyloxyethyl phthalate, methacryloyloxyethyl phthalate, acryloyloxy isobutyrate, methacryloyloxy isobutyrate, 2-sulfoethyl(meth)acrylate, acryloyloxyethyl phosphonate, methacryloyloxyethyl phosphonate, 2-(phosphonooxy)ethyl(meth)acrylate, vinyl sulfonic acid, styrene carboxylic acid, styrene sulfonic acid, and styrene phosphonic acid. These ethylenically unsaturated monomers containing an acid group may be used alone or in a combination of two or more thereof. Note that the term "(meth)acrylate" indicates "acrylate" and/or "methacrylate". Among the abovementioned compounds, vinylsulfonic acid, styrene carboxylic acid, styrene sulfonic acid, styrene phosphonic acid, and the like are compounds also corresponding to the below-described aromatic ethylenically unsaturated monomer.

When the acid group-containing ethylenically unsaturated monomer is used, a basic compound may be used as a neutralizing agent to enhance the hydrophilicity of the resulting water-soluble resin (D-1). Examples of the basic compounds include ammonia, amines such as trimethylamine, triethylamine, butylamine, dimethylaminoethanol, diethylaminoethanol, diethanolamine, triethanolamine, aminomethylpropanol, and morpholine; and hydroxides such as potassium hydroxide and sodium hydroxide.

On the other hand, examples of the EO chain-containing ethylenically unsaturated monomer include alkoxypolyethylene glycol(meth)acrylates such as butoxypolyethylene glycol(meth)acrylate, propoxypolyethylene glycol(meth) acrylate, ethoxypolyethylene glycol(meth)acrylate, and methoxypolyethylene glycol(meth)acrylate; and polyethylene glycol(meth)acrylate. These compounds may be used alone or in a combination of two or more thereof. Moreover, these EO chain-containing ethylenically unsaturated monomers may be synthesized in advance and used, or a commercially available product may be used.

Examples of commercially available EO chain-containing ethylenically unsaturated monomers include methoxypolyethylene glycol(meth)acrylates such as Blemmer AME-400 (9 added moles of EO groups), PME-400 (9 added moles of EO groups), PME-1000 (23 added moles of EO groups), and PME-4000 (90 added moles of EO groups) available from NOF Corporation, and Light Ester 130MA (9 added moles of EO groups) and Light Ester 041MA (30 added moles of EO groups) available from Kyoeisha Chemical Co., Ltd.; and polyethylene glycol(meth)acrylates such as Blemmer PE-350 (8 added moles of EO groups) and AE-400 (10 added moles of EO groups) available from NOF Corporation.

On the other hand, examples of the PO chain-containing ethylenically unsaturated monomer include methoxypolypropylene glycol(meth)acrylate and polypropylene glycol (meth)acrylate. These compounds may be used alone or in a combination of two or more thereof. Moreover, these PO chain-containing ethylenically unsaturated monomers may be synthesized in advance and used, or a commercially available product may be used.

Examples of commercially available PO chain-containing ethylenically unsaturated monomers include methoxypolypropylene glycol methacrylates such as M-30PG (3 added moles of PO groups) available from Shin-Nakamura Chemical Co., Ltd.; and polypropylene glycol(meth)methacrylates such as Blemmer PP-500 (9 added moles of PO groups) and PP-800 (13 added moles of EO groups) available from NOF Corporation.

Moreover, a known compound can be used as the aromatic ethylenically unsaturated monomer. Specific examples thereof include styrene, α-methylstyrene, o-methylstyrene, p-methylstyrene, m-methylstyrene, vinylnaphthalene, a styrene macromonomer, benzyl(meth)acrylate, phenoxyethyl(meth)acrylate, phenoxydiethylene glycol(meth) acrylate, phenoxytetraethylene glycol(meth)acrylate, phenoxyhexaethylene glycol(meth)acrylate, and phenyl (meth)acrylate.

A known compound can also be used as the other ethylenically unsaturated monomer. Examples include linear or branched alkyl group-containing ethylenically unsaturated monomers such as methyl(meth)acrylate, ethyl(meth)acrylate, propyl(meth)acrylate, n-butyl(meth)acrylate, t-butyl (meth)acrylate, pentyl(meth)acrylate, heptyl(meth)acrylate, hexyl(meth)acrylate, 2-ethylhexyl(meth)acrylate, octyl (meth)acrylate, nonyl(meth)acrylate, decyl(meth)acrylate, undecyl(meth)acrylate, lauryl(meth)acrylate, and stearyl (meth)acrylate;

alicyclic alkyl group-containing ethylenically unsaturated monomers such as cyclohexyl(meth)acrylate and isobornyl(meth)acrylate;

fluorinated alkyl group-containing ethylenically unsaturated monomers such as trifluoroethyl(meth)acrylate and heptadecafluorodecyl(meth)acrylate;

amide group-containing ethylenically unsaturated monomers such as (meth)acrylamide, N-methoxymethyl-(meth)acrylamide, N-ethoxymethyl-(meth)acrylamide, N-propoxymethyl-(meth)acrylamide, N-butoxymethyl-(meth)acrylamide, N-pentoxymethyl-(meth)acrylamide, N,N-di(methoxymethyl)(meth)acrylamide, N-ethoxymethyl-N-methoxymethyl(meth)acrylamide, N,N-di(ethoxymethyl)(meth)acrylamide, N-ethoxymethyl-N-propoxymethyl(meth)acrylamide, N,N-di(propoxymethyl)(meth)acrylamide, N-butoxymethyl-N-(propoxymethyl)(meth)acrylamide, N,N-di(butoxymethyl)(meth)acrylamide, N-butoxymethyl-N-(methoxymethyl)(meth)acrylamide, N,N-di(pentoxymethyl)(meth)acrylamide, N-methoxymethyl-N-(pentoxymethyl)(meth)acrylamide, N,N-dimethylaminopropyl(meth)acrylamide, N,N-diethylaminopropyl(meth)acrylamide, N,N-dimethyl(meth)acrylamide, and N,N-diethyl(meth)acrylamide;

hydroxyl group-containing ethylenically unsaturated monomers such as 2-hydroxyethyl(meth)acrylate, 2-hydroxypropyl(meth)acrylate, 4-hydroxybutyl(meth)acrylate, glycerol mono(meth)acrylate, 4-hydroxyvinylbenzene, 1-ethynyl-1-cyclohexanol, and allyl alcohol; and keto group-containing ethylenically unsaturated monomers such as diacetone(meth)acrylamide and acetoacetoxy(meth)acrylate. Note that the term "(meth)acrylamide" refers to "methacrylamide" and/or "acrylamide".

Water-Soluble Styrene-Maleic Acid (Anhydride) Resin and Water-Soluble α-Olefin-Maleic Acid (Anhydride) Resin In a case in which a synthesized product of a styrene-maleic acid (anhydride) resin and/or an α-olefin-maleic acid (anhydride) resin is used as the water-soluble resin (D-1), those synthesized according to a known method can be used. Examples of a method of production by synthesis include a method in which a radical polymerization initiator and, as necessary, a chain transfer agent and the like are added to a mixture containing an α-olefin or an ethylenically unsaturated monomer having an aromatic ring, and maleic acid (anhydride), and radical polymerization is carried out. In this case, an example of a method of introducing an EO structure is a method of carrying out the radical polymerization in a state in which an EO chain-containing ethylenically unsaturated monomer has been added. As another method, a styrene-maleic acid (anhydride) resin and/or an α-olefin-maleic acid (anhydride) resin is produced in advance, after which a structural unit derived from the maleic acid (anhydride) in these resins is reacted with an EO chain-containing alkyl ether. When a styrene-maleic acid (anhydride) resin and/or an α-olefin-maleic acid (anhydride) resin is to be used in the pretreatment liquid of the present invention, it is preferable to select the latter of the above-described methods of introducing the EO structure. This is because it is preferable that the styrene-maleic acid (anhydride) resin and/or the α-olefin-maleic acid (anhydride) resin used as the water-soluble resin (D-1) forms an ester bonding site, which will be described in detail later.

Also, note that the same compounds as in the case of the water-soluble (meth)acrylic resin described above can be used as the ethylenically unsaturated monomer having an aromatic ring and the EO-chain containing ethylenically unsaturated monomer.

As the α-olefin, an α-olefin having from 6 to 50 carbons is preferably used, and an α-olefin having from 8 to 30 carbons is more preferably used. Examples of the α-olefin include 1-hexene (6 carbons), 1-heptene (7 carbons), 1-octene (8 carbons), 1-nonene (9 carbons), 1-decene (10 carbons), 1-dodecene (12 carbons), 1-tetradecene (14 carbons), 1-hexadecene (16 carbons), 1-octadecene (18 carbons), 1-eicosene (20 carbons), 1-docosene (22 carbons), 1-tetracosene (24 carbons), 1-octacosene (28 carbons), 1-triacontene (30 carbons), 1-dotriacontene (32 carbons), 1-tetratriacontene (34 carbons), 1-hexatriacontene (36 carbons), and 1-octatriacontene (38 carbons).

As the maleic acid (anhydride), maleic acid and/or maleic anhydride is usually used. Among these, maleic anhydride is preferably used in view of the excellent polymerizability.

As described above, it is preferable to form one or more types of bonding sites for the structural unit derived from the maleic acid (anhydride), the bonding sites being selected from the group consisting of an ester bonding site, an amide bonding site, and an imide bonding site, and it is particularly preferable to form an ester bonding site. These bonding sites and the structure bonded by the bonding sites can further improve the dispersion stability of the resin particles (A). In particular, compatibility between the water-soluble resin (D-1) and the resin particles (A) is remarkably improved by esterification.

One or more types of bonding sites selected from the group consisting of an ester bonding site, an amide bonding site, and an imide bonding site are preferably formed at a ratio of from 50 to 100 mol % in the total molar amount of the acid anhydride group and/or the acid group generated by ring-opening of the acid anhydride group. By carrying out esterification or the like, an EO group or the like can be imparted to the carboxyl group moiety of the water-soluble resin (D-1), and an excellent electrostatic repulsion effect is obtained, and thereby the storage stability of the pretreatment liquid is particularly improved.

In a case in which the styrene-maleic acid (anhydride) resin and/or the α-olefin-maleic acid (anhydride) resin is synthesized as a water-soluble resin (D-1) by the above-described method, that is, by a method in which the styrene-maleic acid (anhydride) resin and/or the α-olefin-maleic acid (anhydride) resin is produced in advance, after which the structural unit derived from the maleic acid (anhydride) in these resins is reacted with an EO chain-containing alkyl ether, examples of the EO chain-containing alkyl ether that can be used include polyoxyethylene monomethyl ether, polyoxyethylene butyl ether, and polyoxyethylene propyl ether. These compounds may be synthesized in advance and used, or commercially available products thereof may be used.

Examples of the PO chain-containing alkyl ether used in a case in which a PO structure is introduced into the styrene-maleic acid (anhydride) resin and/or the α-olefin-maleic acid (anhydride) resin by the same method include polyoxypropylene monomethyl ether, polyoxypropylene butyl ether, and polyoxypropylene propyl ether. Furthermore, an alkyl ether containing an EO chain and a PO chain may be used, and examples of such a compound include polyoxyethylene polyoxypropylene monomethyl ether and polyoxyethylene polyoxypropylene butyl ether. These compounds may be synthesized in advance and used, or commercially available products thereof may be used.

Examples of commercially available products of the EO chain-containing alkyl ether or PO chain-containing alkyl ether include polyoxyethylene monomethyl ethers such as UNIOX M-400 (8 moles of EO groups added), M-550 (12 moles of EO groups added), M-1000 (22 moles of EO groups added), M-2000 (45 moles of EO groups added), and M-4000 (90 moles of EO groups added) available from NOF Corporation; polyoxypropylene butyl ethers such as NEWPOL LB-65 (6 moles of PO groups added), LB-285 (20 moles of PO groups added), LB-385 (24 moles of PO groups added), LB-625 (31 moles of PO groups added), LB-1715 (40 moles of PO groups added), LB-3000 (52 moles of PO groups added), LB-300X (20 moles of PO groups added), LB-650X (31 moles of PO groups added), and LB-1800X (40 moles of PO groups added) available from Sanyo Chemical Industries, Ltd.

Examples of commercially available products of alkyl ethers containing an EO chain and a PO chain include polyoxyethylene polyoxypropylene butyl ethers available from NOF Corporation such as UNILUBE 50 MB-11 (9 moles of EO groups added, 11 moles of PO groups added), 50 MB-26 (17 moles of EO groups added, 17 moles of PO groups added), 50 MB-72 (30 moles of EO groups added, 30 moles of PO groups added), and 50 MB-168 (37 moles of EO groups added, 38 moles of PO groups added).

Water-Soluble Resin (D-2)

The pretreatment liquid of the present invention may contain, as the water-soluble resin (D), a water-soluble resin that is not the water-soluble resin (D-1), that is, a water-soluble resin that does not have a polyoxyethylene structure and/or does not have an acid value from 1 to 30 mgKOH/g (the water-soluble resin is also referred to as the "water-soluble resin (D-2)" in the present application).

The weight-average molecular weight of the water-soluble resin (D-2) is preferably from 1500 to 50000, more preferably from 3000 to 40000, and particularly preferably from 5000 to 25000. Since the water-soluble resin (D-2) having a weight-average molecular weight within the above range does not inhibit the effect of the water-soluble resin (D-1) described above, a pretreatment liquid having excellent storage stability can be obtained. In addition, the water-soluble resin (D-2) having the above-described weight average molecular weight can also further improve the adhesion and blocking resistance of the printed matter, and from this viewpoint as well, the water-soluble resin (D-2) can be suitably used.

The method for measuring the weight average molecular weight of the water-soluble resin (D-2) is the same as in the case of the water-soluble resin (D-1) described above.

The types of resins that can be used as the water-soluble resin (D-2) are the same as in the case of the water-soluble resin (D-1) described above. Among these, it is preferable to use, as the water-soluble resin (D-2), the resin particles (A), or the same kind of resin as the water-soluble resin (D-1), because with such a resin, the effects of the present invention can be suitably exhibited without inhibiting the effects of the resin particles (A) and the water-soluble resin (D-1).

Water-Soluble Cationic Resin

On the other hand, a resin (water-soluble cationic resin) containing one or more types of structural units selected from the group consisting of a diallyl amine structural unit, a diallyl ammonium structural unit, and an epihalohydrin structural unit can also be used as the water-soluble resin (D-2). By using a pretreatment liquid containing these resins, the image quality, adhesion, and lamination suitability of the printed matter are remarkably improved.

For the same reason as in the case of the calcium ions described below, a water-soluble cationic resin having a solubility of 5 g or more in 100 g of water at 20° C. is preferably selected from the viewpoints of providing a printed matter with excelling blocking resistance over time, image quality, and lamination suitability, and providing a pretreatment liquid with excellent storage stability.

Whether the solubility of the water-soluble cationic resin in 100 g of water at 20° C. is 5 g or more is determined by whether a 50% diameter is measurable with regard to a sample obtained by leaving a mixture of 5 g of the water-soluble cationic resin and 100 g of water standing at 20° C. for 24 hours. At this time, when the water-soluble cationic resin is available only in the form of an aqueous solution such as a commercially available product, a sample is obtained by adding water or removing water by volatilization, such that the solid content becomes 5 g per 100 g of water. Also, similar to the 50% diameter of the resin particles (A1), the abovementioned 50% diameter is a volume-based median diameter measured by a dynamic light scattering method.

The type of the water-soluble cationic resin is not particularly limited, and a resin synthesized by a known synthesis method may be used, or a commercially available product may be used. Among these, a water-soluble resin containing a diallyl ammonium structural unit is particularly suitably selected because such a resin has a strong aggregation and/or thickening action, can be used to easily produce a printed matter having excellent image quality, and improves the adhesion and lamination suitability of the printed matter. From the viewpoint of availability and the like, a hydrochloride or ethyl sulfate of diallyl dimethyl ammonium and/or diallyl methylethyl ammonium is preferably selected as the diallyl ammonium structural unit.

Examples of commercially available products of the water-soluble cationic resin containing a diallyl ammonium structural unit include PAS-H-1L, PAS-H-5L, PAS-24, PAS-J-81L, PAS-J-81, PAS-J-41, and PAS-880 (available from Nittobo Medical Co., Ltd.); and Unisence FPA1000L, FPA1001L, FPA1002L, FCA1000L, FCA1001L, and FCA5000L (available from Senka Corporation).

From the viewpoint of enhancing the chemical stability of the resin particles (A) and improving the storage stability of the pretreatment liquid and from the viewpoint of providing a printed matter having excellent image quality with good solid filling and without mixed color bleeding, a total amount (DW) of the water-soluble resin (D) contained in the pretreatment liquid of the present invention is preferably from 0.5 to 3 mass %, and particularly preferably from 0.8 to 2.5 mass % in terms of solid content in relation to the total amount of the pretreatment liquid.

Also, from the viewpoint of improving the storage stability of the pretreatment liquid, when the amount of the resin particles (A) contained in 100 g of the pretreatment liquid is denoted by R (g), the ratio (R/DW) of the value of R to the value of DW is from 2.85 to 20, and is more preferably from 3 to 13. When R/DW is within the range of 2.85 to 20, a printed matter is produced with excellent image quality for which both a suppression of mixed color bleeding and an improvement in solid filling are achieved without adversely affecting storage stability, and furthermore, blocking resistance and lamination suitability of the printed matter are also excellent.

Note that when the pretreatment liquid does not contain the water-soluble resin (D-2), the "total amount (DW) of the water-soluble resin (B)" is the same as the content of the water-soluble resin (D-1). On the other hand, when the pretreatment liquid contains the water-soluble resin (D-2), the "total amount (DW) of the water-soluble resin (D)" represents the total sum of the content of the water-soluble resin (D-1) and the content of the water-soluble resin (D-2).

In addition, when the pretreatment liquid contains the water-soluble resin (D-2), the ratio of the content of the water-soluble resin (D-1) to the total amount (DW) of the water-soluble resin (D) is preferably from 50 to 99 mass %, and particularly preferably from 70 to 99 mass % from the viewpoint of suitably exhibiting the function of the water-soluble resin (D-1) described above.

Water

The content of water contained in the pretreatment liquid of the present invention is preferably from 50 to 95 mass %, more preferably from 60 to 90 mass %, and still more preferably from 70 to 85 mass %, in relation to the total amount of the pretreatment liquid. Water can increase the mutual solubility of materials contained in the pretreatment liquid of the present invention, such as the resin particles (A1), the calcium ions, and the carboxylate ions. In addition, the storage stability of the pretreatment liquid can be improved by using water.

Other Materials

In addition to the above-described materials, the pretreatment liquid of the present invention may further contain, as necessary, materials such as a pH adjuster, a colorant, a thickener, and a preservative.

pH Adjuster

For example, the pretreatment liquid of the present invention may contain a pH adjuster from the viewpoint of reducing damage to a member included in an apparatus (pretreatment liquid applying apparatus) used for applying the pretreatment liquid and improving the storage stability of the pretreatment liquid by suppressing a change in pH over time. Materials that can be used as the pH adjuster are not limited, and one type may be used alone, or two or more types may be used in combination.

Note that the above-described materials, such as carboxylic acid for example, are materials that exhibit the functions described above, and may also be a pH adjuster.

In addition, in a case in which the pretreatment liquid is to be made basic, alkanolamines such as dimethylethanolamine, diethanolamine, triethanolamine, and N-methyldiethanolamine; aqueous ammonia; alkali metal hydroxides such as lithium hydroxide, sodium hydroxide, and potassium hydroxide; and alkali metal carbonates such as lithium carbonate, sodium carbonate, sodium hydrogen carbonate, and potassium carbonate; and the like can be used. When the pretreatment liquid is to be made acidic, an inorganic acid such as hydrochloric acid, sulfuric acid, phosphoric acid, or boric acid can be used.

From the viewpoint of effectively exhibiting the above-described effects, the blending amount of the pH adjuster is preferably from 0.01 to 5 mass %, and more preferably from 0.05 to 3 mass %, in relation to the total amount of the pretreatment liquid.

Colorant

Preferably, the pretreatment liquid of the present invention is substantially free of a colorant such as a pigment or a dye. By using a substantially transparent pretreatment liquid that does not contain a colorant, a printed matter that makes use of the hue inherent to the recording medium and a transparent feel can be obtained. In the present invention, the term "substantially free" means that intentional adding of the material to the extent that the effects of the present invention are prevented from being exhibited is not allowed, and does not exclude, for example, contamination from impurities or by-products. Specifically, the term "substantially free" means that the material is not contained at an amount of 2.0 mass % or more, preferably not contained at an amount of 1.0 mass % or more, more preferably not contained at an amount of 0.5 mass % or more, and particularly preferably not contained at an amount of 0.1 mass % or more, in relation to the total amount of the pretreatment liquid.

On the other hand, in another preferred embodiment, the pretreatment liquid contains a white pigment as the colorant. By using a white pretreatment liquid on a colored and/or transparent recording medium, a printed matter having particularly excellent sharpness and visibility and good image quality can be obtained. When the pretreatment liquid contains a white pigment, a known material, such as titanium oxide, for example, can be used as the white pigment.

The pretreatment liquid of the present invention can be constituted by combining the various components described above. More specific examples of the composition of the pretreatment liquid include but are not limited to, the following aspects [1] to [3]. [1] A pretreatment liquid (I) that is used together with a water-based inkjet ink comprising a pigment, a water-soluble organic solvent, and water, wherein the pretreatment liquid comprise resin particles (A), calcium ions, plural types of carboxylate ions, and water, the resin particles (A) include resin particles (A1) having a solubility parameter (SP) value of from 9.0 to 13.5 (cal/cm$^3$)$^{1/2}$ and being selected from the group consisting of (meth)acrylic resin particles, urethane (urea) resin particles, and urethane-(meth)acrylic resin particles, one or more of the plural types of carboxylate ions being hydroxycarboxylate ions, and a ratio (R/C) of R to C is from 0.11 to 0.50, where R (g) is an amount of the resin particles (A) contained in 100 g of the pretreatment liquid, and C (mmol) is an amount of the calcium ions in millimoles contained in 100 g of the pretreatment liquid.

In the pretreatment liquid (I) of the above-described embodiment, the acid value of the resin particles (A1) is preferably from 1 to 50 mgKOH/g. Furthermore, the above-mentioned R (g) is preferably from 3.5 to 15.0.

The resin particles (A1) preferably include (meth)acrylic resin particles having a glass transition temperature (Tg) of −20° C. to 60° C. The resin particles (A1) preferably include at least one selected from the group consisting of ester-based urethane urea resin particles and carbonate-based urethane urea resin particles.

When a total sum of millimolar equivalents of the plural types of carboxylate ions contained in 100 g of the pretreatment liquid is denoted by A (millimolar equivalents), the value represented by C×2/A is from 0.8 to 1.1 is preferable.

The pretreatment liquid preferably contains two or more types of resin particles (A).

[2] A pretreatment liquid (II) that is used together with a water-based inkjet ink comprising a pigment, a water-soluble organic solvent, and water, wherein the pretreatment liquid comprise resin particles (A), plural types of calcium salts of carboxylic acid, and water, one or more of the plural types of calcium salts of carboxylic acid being calcium salts of hydroxycarboxylic acid, and C is from 10 to 60 mmol, and a ratio (R/C) of the value of R to the value of C is from 0.11 to 0.50, where R (g) is an amount of the resin particles (A) contained in 100 g of the pretreatment liquid, and C (mmol) is an amount of calcium ions in millimoles contained in 100 g of the pretreatment liquid.

In the pretreatment liquid (II) of the above embodiment, the solubilities of all the types of calcium salts of carboxylic acid constituting the plural types of calcium salts of carboxylic acid in 20° C. water are preferably from 3 to 30 g/100 g $H_2O$.

The pretreatment liquid (II) of the above embodiment preferably further contains a water-soluble organic solvent (B) having one hydroxy group in its molecular structure. In this case, the ratio of the molar content of the hydroxycarboxylate ions contained in the pretreatment liquid to the molar content of the water-soluble organic solvent (C) having one hydroxy group in its molecular structure is preferably from 0.08 to 0.4.

[3] A pretreatment liquid (III) that is used together with a water-based inkjet ink comprising a pigment, a water-soluble organic solvent, and water, wherein the pretreatment liquid comprise resin particles (A), a water-soluble resin (D), calcium ions, carboxylate ions, and water, the water-soluble resin (D) includes a water-soluble resin (D-1) having a polyoxyethylene structure and an acid value of from 1 to 30 mgKOH/g, and a ratio (R/DW) of the value of R to the value of DW is from 2.85 to 20, and a ratio (R/C) of the value of R to the value of C is from 0.11 to 0.50, where R (g) is an amount of the resin particles (A) contained in 100 g of the pretreatment liquid, DW (g) is an amount of the water-soluble resin (D) contained in 100 g of the pretreatment liquid, and C (mmol) is an amount of the calcium ions in millimoles contained in 100 g of the pretreatment liquid.

In the pretreatment liquid (III) of the above embodiment, the carboxylate ions preferably include plural types of carboxylate ions. The carboxylate ions preferably include a hydroxycarboxylate ion.

In addition, the resin particles (A) preferably include one or more types of resins selected from the group consisting of (meth)acrylic resins, urethane (urea) resins, and urethane (urea)-(meth)acrylic resins.

Moreover, the water-soluble resin (D) preferably includes one or more types of resins selected from the group consisting of (meth)acrylic resins, styrene-maleic acid (anhydride) resins, and α-olefin-maleic acid (anhydride) resins.

Physical Properties of Pretreatment Liquid The viscosity at 25° C. of the pretreatment liquid of the present invention is preferably from 5 to 200 mPa·s, more preferably from 5 to 180 mPa·s, even more preferably from 8 to 160 mPa·s, and particularly preferably from 8 to 140 mPa·s. The pretreatment liquid satisfying the above viscosity range can be applied to a non-permeable recording medium without unevenness, and therefore a printed matter having excellent image quality, blocking resistance, and lamination suitability can be obtained. The viscosity of the pretreatment liquid can be measured using, for example, an E-type viscometer (TVE25L type viscometer available from Toki Sangyo Co., Ltd.) or a B-type viscometer (TVB10 type viscometer available from Toki Sangyo Co., Ltd.), depending on the viscosity of the treatment liquid.

In addition, by using the pretreatment liquid of the present invention to impart suitable wettability on a non-permeable recording medium and form a uniform pretreatment liquid layer without unevenness, a printed matter having excellent image quality, blocking resistance, and lamination suitability can be obtained. From such a viewpoint, in one embodiment, the static surface tension of the pretreatment liquid of the present invention is preferably from 20 to 40 mN/m, more preferably from 21 to 37 mN/m, and particularly preferably from 22 to 35 mN/m. The static surface tension in the present specification can be measured in the same manner as the surface tension of the water-soluble organic solvent (B) described above.

Method of Producing Pretreatment Liquid

The pretreatment liquid of the present invention containing the abovementioned components can be produced, for example, by adding the resin particles (A1), the calcium salts of carboxylic acid, and, if necessary, the abovementioned materials such as the water-soluble organic solvent (B), the surfactant (C), the water-soluble resin (D), and the pH-adjuster, and stirring and mixing these components, and if necessary, filtering the mixture. However, the method of producing the pretreatment liquid is not limited to the method described above. For example, when a white pigment is used as a colorant, a white pigment dispersion containing the white pigment and water may be prepared in advance, and then mixed with the resin particles (A1), salts of hydroxycarboxylic acid, and the like. At the time of stirring and mixing, the mixture may be heated within a temperature range of 40° C. to 100° C. as necessary. At this time, heating is preferably implemented at a temperature equal to or lower than the minimum film-forming temperature (MFT) of the resin particles (A1).

Water-Based Inkjet Ink

The pretreatment liquid of the present embodiment can be combined with one or more types of water-based inkjet inks and used in the form of an ink set. Preferably, the water-based inkjet ink contains a pigment, a water-soluble organic solvent, and water. The water-based inkjet ink may further contain a binder resin, a surfactant, and the like.

As the pigment contained in the water-based inkjet ink, blue pigments such as C.I. Pigment Blue 15:3 and 15:4; red pigments such as C.I. Pigment Red 122, 150, 166, 185, 202, 209, 266, 269, 282, and C.I. Pigment Violet 19; yellow pigments such as C.I. Pigment Yellow 12, 13, 14, 74, 120, 180, 185, and 213; black pigments such as carbon black; white pigments such as titanium oxide; and the like can be preferably used from the viewpoint of providing a printed matter having excellent image quality and excelling in color development properties and light resistance.

In addition, the water-soluble organic solvent contained in the water-based inkjet ink preferably contains a glycol monoalkyl ether-based solvent and/or a divalent alcohol-based solvent from the viewpoint of being able to improve compatibility and affinity with the pretreatment liquid.

In this case, when the water-based inkjet ink is used in combination with the pretreatment liquid of the present invention, from the viewpoint of being able to provide a printed matter having excellent image quality even when printed at a high speed and the viewpoint of having excellent discharge stability, the average weighted boiling point at 1 atm of the water-soluble organic solvent contained in the water-based inkjet ink is preferably from 145° C. to 215° C., more preferably from 150° C. to 200° C., and particularly preferably from 155° C. to 190° C. In addition, when the water-based inkjet ink is used in combination with the pretreatment liquid, from the viewpoint of providing a printed matter with good blocking resistance and free from image quality defects such as mixed color bleeding, the amount of the water-soluble organic solvent having a boiling point of 220° C. or higher at 1 atm is preferably 5 mass % or less (may be 0 mass %), particularly preferably 2 mass % or less (may be 0 mass %), and more particularly preferably 1 mass % or less (may be 0 mass %), in relation to the total amount of the water-based ink.

In addition, when the water-based inkjet ink contains a surfactant, an acetylenediol-based surfactant is preferably used. In this case, the addition amount of the surfactant is preferably from 0.01 to 5.0 mass %, and more preferably from 0.05 to 3.0 mass %, in relation to the total amount of the water-based inkjet ink. Specific examples of commercially available products that can be used as the acetylenediol-based surfactants are the same as the above-listed commercially available products that can be used in the pretreatment liquid.

Non-Permeable Recording Medium

The pretreatment liquid of the present invention can be suitably used on a non-permeable recording medium. As the non-permeable recording medium, a known non-permeable recording medium can be optionally used, and for example, a thermoplastic resin substrate such as a polyvinyl chloride sheet, a polyethylene terephthalate (PET) film, a polypropylene film, a polyethylene film, a nylon film, a polystyrene film, and a polyvinyl alcohol film, a metal substrate such as an aluminum foil, and the like can be used. Any of the above-listed substrates may have a smooth surface or an uneven surface and may be transparent, translucent, or opaque. Two or more types of these substrates may be bonded to each other. Further, a peelable adhesive layer or the like may be provided on a side opposite the printed surface, or an adhesive layer or the like may be provided on the printed surface after printing. Moreover, the non-permeable recording medium may be in the form of a roll or a sheet.

Among these, to sufficiently express the function of the pretreatment liquid of the present invention, the non-permeable recording medium is preferably a thermoplastic resin substrate and is particularly preferably a PET film, a polypropylene film, a polyethylene film, or a nylon film.

In addition, from the viewpoint of uniformly applying the pretreatment liquid of the present invention without unevenness and remarkably improving the adhesion, the non-permeable recording medium exemplified above is preferably subjected to a surface modification treatment such as a corona treatment or a plasma treatment.

Method of Producing Printed Matter

The pretreatment liquid of the present invention is applied to, for example, the non-permeable recording medium described above, after which a water-based inkjet ink containing a pigment, a water-soluble organic solvent, and water is printed on a portion of the non-permeable recording medium to which the pretreatment liquid is applied, and thereby a printed matter is formed. Preferably, the printed matter is produced through a step of printing the water-based inkjet ink and subsequently a step of drying the non-permeable recording medium to which the pretreatment liquid and the water-based inkjet ink are applied.

As a method for applying the pretreatment liquid of the present invention onto a non-permeable recording medium, a method in which the pretreatment liquid is printed in a non-contact manner onto the recording medium, such as inkjet printing, or a method in which the pretreatment liquid is brought into contact with the recording medium and coated thereon may be employed. In addition, when the coating method in which the pretreatment liquid is brought into contact is selected as the method for applying the pretreatment liquid, an offset gravure coater, a gravure coater, a doctor coater, a bar coater, a blade coater, a flexo coater, a roll coater, or the like can be suitably used.

In one embodiment, the pretreatment liquid may be applied to the non-permeable recording medium, then the pretreatment liquid on the non-permeable recording medium may be dried, after which the water-based inkjet ink may be printed. In another embodiment, the water-based inkjet ink may be printed before the pretreatment liquid on the non-permeable recording medium is completely dried. In one embodiment, it is preferable that the pretreatment liquid be completely dried before the water-based inkjet ink is printed, that is, the liquid component of the pretreatment liquid is preferably substantially removed. This is because when the water-based inkjet ink is printed after the pretreatment liquid is completely dried, a printed matter having excellent scratch resistance and blocking resistance can be obtained without the subsequently-landing water-based inkjet ink to cause drying defects.

The drying method used in the production of a printed matter using the pretreatment liquid of the present invention is not particularly limited. Examples of the drying method include known methods such as a heating and drying method, a hot air drying method, an infrared drying method, a microwave drying method, and a drum drying method. A drying method described above may be used alone, or a combination of two or more drying methods may be used. However, it is preferable to use the hot air drying method in order to efficiently dry the non-permeable recording medium while reducing damage thereto. In addition, from the viewpoint of preventing damage to the recording medium and sudden boiling of the liquid component in the pretreatment liquid, the drying temperature when the heating and drying method is adopted is preferably from 35° C. to 100° C., and when the hot air drying method is adopted, the hot air temperature is preferably from 50° C. to 150° C.

Coating Treatment

The printed matter produced using the pretreatment liquid of the present invention and the water-based inkjet ink can be subjected to a coating treatment on the printed surface as necessary. Specific examples of the coating treatment include application (printing) of a coating composition, and lamination by a dry lamination method, a solventless lamination method, an extrusion lamination method, or the like. One of these methods may be selected, or a plurality of these methods may be combined.

When the printed matter is subjected to a coating treatment by applying (printing) a coating composition, a non-contact method or a contact method may be employed as the application (printing) method. More specifically, a method of printing on a recording medium in a non-contact manner such as inkjet printing, or a method of applying the coating composition to the recording medium by bringing the coating composition into contact with the recording medium may be employed.

When the printed matter is subjected to lamination, the adhesive used for laminating a sealant substrate is preferably composed of a mixture of a polyol component and a polyisocyanate component. In this case, the polyol component preferably contains a polyester polyol. The polyester polyol has good wettability for the printed layer (printed portion) and the pretreatment liquid layer (non-printed portion) and also exhibits excellent lamination strength with regard to the printed matter (laminate). For the same reason, the polyisocyanate component preferably contains a polyether-based urethane resin having an isocyanate group at a terminal. The blending amount of the polyisocyanate component is preferably from 50 to 80 mass % with respect to the amount of the polyol component.

Examples of a sealant substrate used for the abovementioned lamination include a cast polypropylene (CPP) film and a linear low-density polyethylene (LLDPE) film. Specific examples include a polypropylene film and a polyethylene film. As the sealant substrate, a film on which a metal (oxide) vapor-deposited layer such as aluminum oxide is formed may be used.

EXAMPLES

Hereinafter, a pretreatment liquid of the present invention and an ink set including the pretreatment liquid and a water-based inkjet ink will be more specifically described with reference to examples and comparative examples. Note that in the following description, "parts" and "%" represent "parts by mass" and "mass %", respectively, unless otherwise specified.

Example I

The following description relates to examples and comparative examples corresponding to the embodiments of the pretreatment liquid (I) described above.

<1> Production Examples of Resin Particles (A1)

Production Example 1: Production of (Meth)Acrylic Resin Particles 1 (Ac1)

A reaction vessel equipped with a gas inlet tube, a thermometer, a condenser, and a stirrer was charged with 124 parts of ion-exchanged water and 1.2 parts of sodium polyoxyethylene lauryl ether sulfate (Latemul E-150, available from Kao Corporation) as an emulsifier. Meanwhile, another mixing vessel equipped with a stirrer was prepared, and 0.2 parts of acrylic acid, 39.8 parts of n-butyl acrylate, 60 parts of methyl methacrylate, 64 parts of ion-exchanged water, and 0.8 part of sodium polyoxyethylene lauryl ether sulfate (Latemul E-150 available from Kao Corporation) as an emulsifier were sequentially added to the prepared mixing vessel, after which the contents were stirred and mixed, and an emulsion was obtained.

Subsequently, 8 parts of the above emulsion were taken and added to the above reaction vessel. After the addition, the internal temperature was increased to 80° C., and the inside of the vessel was sufficiently purged with nitrogen, after which 4 parts of a 5% aqueous solution of potassium persulfate and 8 parts of a 1% aqueous solution of anhydrous sodium bisulfite were added to initiate a polymerization reaction. After initiation of the polymerization reaction, the remainder of the emulsion prepared above, 1.2 parts of a 5% aqueous solution of potassium persulfate, and 2.5 parts of a 1% aqueous solution of anhydrous sodium bisulfite were added dropwise over 1.5 hours while maintaining the internal temperature at 80° C.

After completion of the dropwise addition, stirring was further continued for 2 hours, after which cooling was implemented until the internal temperature reached 30° C. or lower. Subsequently, dimethylaminoethanol was added to adjust the pH of the content to 8.5, after which ion-exchanged water was added to adjust the solid content to 30%. In this manner, an aqueous dispersion (solid content of 30%) of (meth)acrylic resin particles 1 (Ac1) having an acid value of 1.6 (mgKOH/g), a Tg of 19.9 (° C.), and an SP value of 9.3 $((cal/cm^3)^{1/2})$ was obtained.

Production Examples 2 to 29: Production of (Meth)Acrylic Resin Particles 2 to 29 (Ac2 to Ac29)

(Meth)acrylic resin particles 2 to 29 (Ac2 to 29) were produced in the same manner as that of the (meth)acrylic resin particles 1 with the exception that the type and amount of the ethylenically unsaturated monomer used for preparing the emulsion and the type of the emulsifier added to the reaction vessel and the mixing vessel were changed as indicated in Table 1.

TABLE I-1

Production Examples of (Meth)acrylic Resin Particles

| Resin Particles (A1) | | Production Example 1 Ac1 | Production Example 2 Ac2 | Production Example 3 Ac3 | Production Example 4 Ac4 | Production Example 5 Ac5 | Production Example 6 Ac6 | Production Example 7 Ac7 | Production Example 8 Ac8 |
|---|---|---|---|---|---|---|---|---|---|
| Acid group-containing monomer | AA | 0.2 | 1 | 2 | 4 | 5 | 6 | 7 | 2 |
| | MAA | | | | | | | | |
| Acrylate monomer | EA | | | | | | | | |
| | BA | 39.8 | 39 | 38 | 36 | 35 | 34 | 33 | 20 |
| | LA | | | | | | | | 20 |
| | STA | | | | | | | | |
| | 2-HEA | | | | | | | | |
| Methacrylate monomer | MMA | 60 | 60 | 60 | 60 | 60 | 60 | 60 | |
| | BMA | | | | | | | | |
| | StMA | | | | | | | | 58 |
| | GlyMA | | | | | | | | |
| Aromatic monomer | St | | | | | | | | |
| Other raw materials | PME-400 | | | | | | | | |
| | Total | 100 | 100 | 100 | 100 | 100 | 100 | 100 | 100 |
| | Used emulsifier | | | | | Latemul E-150 | | | |
| Parameters | SP Value[$(cal/cm^3)^{1/2}$] | 9.3 | 9.4 | 9.4 | 9.4 | 9.5 | 9.5 | 9.5 | 9.1 |
| | Acid value[mgKOH/g] | 1.6 | 7.8 | 15.6 | 31.1 | 38.9 | 46.7 | 54.5 | 15.6 |
| | Glass transition temperature [° C.] | 19.9 | 21.6 | 23.3 | 26.7 | 28.5 | 30.3 | 32 | 0.7 |

| Resin Particles (A1) | | Production Example 9 Ac9 | Production Example 10 Ac10 | Production Example 11 Ac11 | Production Example 12 Ac12 | Production Example 13 Ac13 | Production Example 14 Ac14 | Production Example 15 Ac15 |
|---|---|---|---|---|---|---|---|---|
| Acid group-containing monomer | AA | 2 | 2 | 2 | 2 | 2 | 2 | 2 |
| | MAA | | | | | | | |
| Acrylate monomer | EA | | | | | | | |

TABLE I-1-continued

Production Examples of (Meth)acrylic Resin Particles

|  |  |  |  |  |  |  |  |  |
|---|---|---|---|---|---|---|---|---|
| Methacrylate monomer | BA | 20 | 20 | 20 | | | | |
| | LA | | | | | | | |
| | STA | 20 | | | | | | |
| | 2-HEA | | | | 20 | 50 | 30 | 20 |
| | MMA | | | 30 | 30 | 30 | 28 | 8 |
| | BMA | | 78 | 48 | 48 | 18 | | |
| | StMA | 58 | | | | | | |
| | GlyMA | | | | | | 40 | 70 |
| Aromatic monomer | St | | | | | | | |
| Other raw materials | PME-400 | | | | | | | |
| | Total | 100 | 100 | 100 | 100 | 100 | 100 | 100 |
| | Used emulsifier | | | | Latemul E-150 | | | |
| Parameters | SP Value[(cal/cm$^3$)$^{1/2}$] | 9.1 | 9.2 | 9.3 | 10.1 | 11.1 | 12.1 | 13.4 |
| | Acid value[mgKOH/g] | 15.6 | 15.6 | 15.6 | 15.6 | 15.6 | 15.6 | 15.6 |
| | Glass transition temperature [° C.] | 13.5 | 2.6 | 21.3 | 33.8 | 21.2 | 21.9 | 36.1 |

| Resin Particles (A1) | | Production Example 16 Ac16 | Production Example 17 Ac17 | Production Example 18 Ac18 | Production Example 19 Ac19 | Production Example 20 Ac20 | Production Example 21 Ac21 | Production Example 22 Ac22 |
|---|---|---|---|---|---|---|---|---|
| Acid group-containing monomer | AA | 2 | 2 | 2 | 2 | 2 | 2 | |
| | MAA | | | | | | | 2 |
| Acrylate monomer | EA | | | | | | 20 | |
| | BA | 30 | 30 | 20 | 10 | | | 20 |
| | LA | | | | | | | |
| | STA | | | | | | | |
| | 2-HEA | | | | | | | |
| Methacrylate monomer | MMA | | 30 | 40 | 50 | 70 | 30 | 30 |
| | BMA | 68 | 38 | 38 | 38 | 28 | 48 | 48 |
| | StMA | | | | | | | |
| | GlyMA | | | | | | | |
| Aromatic monomer | St | | | | | | | |
| Other raw materials | PME-400 | | | | | | | |
| | Total | 100 | 100 | 100 | 100 | 100 | 100 | 100 |
| | Used emulsifier | | | | Latemul E-150 | | | |
| Parameters | SP Value[(cal/cm$^3$)$^{1/2}$] | 9.2 | 9.3 | 9.3 | 9.4 | 9.4 | 9.4 | 9.3 |
| | Acid value[mgKOH/g] | 15.6 | 15.6 | 15.6 | 15.6 | 15.6 | 15.6 | 13.0 |
| | Glass transition temperature [° C.] | −5.9 | 11.6 | 28.1 | 46.6 | 76.6 | 32.3 | 21.6 |

| Resin Particles (A1) | | Production Example 23 Ac23 | Production Example 24 Ac24 | Production Example 25 Ac25 | Production Example 26 Ac26 | Production Example 27 Ac27 | Production Example 28 Ac28 | Production Example 29 Ac29 |
|---|---|---|---|---|---|---|---|---|
| Acid group-containing monomer | AA | 2 | 2 | 2 | 2 | 1 | 1 | 2 |
| | MAA | | | | | | | |
| Acrylate monomer | EA | | | | | | | |
| | BA | 20 | 20 | 20 | 20 | | | |
| | LA | | | | | 30 | | |
| | STA | | | | | | 30 | |
| | 2-HEA | | | | | | | |
| Methacrylate monomer | MMA | 20 | 20 | 40 | 30 | | | 8 |
| | BMA | 38 | 28 | 28 | 48 | | | |
| | StMA | | | | | 69 | 69 | |
| | GlyMA | | | | | | | 90 |
| Aromatic monomer | St | 20 | 30 | | | | | |
| Other raw materials | PME-400 | | | 10 | | | | |
| | Total | 100 | 100 | 100 | 100 | 100 | 100 | 100 |
| | Used emulsifier | | Latemul E-150 | | Aqualon KH-10 | | Latemul E-150 | |
| Parameters | SP Value[(cal/cm$^3$)$^{1/2}$] | 9.3 | 9.3 | 9.4 | 9.3 | 8.9 | 8.9 | 13.7 |
| | Acid value[mgKOH/g] | 15.6 | 15.6 | 15.6 | 15.6 | 7.8 | 7.8 | 15.6 |
| | Glass transition temperature [° C.] | 27.5 | 34.2 | 18.4 | 21.9 | 20.5 | 36.1 | 52.8 |

Table I-1 also describes the SP values, the acid values, and the glass transition temperatures of the produced (meth)acrylic resin particles 1 to 29. The abbreviations described in Table I-1 represent the following materials.

AA: acrylic acid (SP value: 11.1 (cal/cm$^3$)$^{1/2}$)
MAA: methacrylic acid (SP value: 10.7 (cal/cm$^3$)$^{1/2}$)
EA: ethyl acrylate (SP value: 9.4 (cal/cm$^3$)$^{1/2}$)
BA: butyl acrylate (SP value: 9.2 (cal/cm$^3$)$^{1/2}$)
LA: lauryl acrylate (SP value: 8.9 (cal/cm$^3$)$^{1/2}$)
STA: stearyl acrylate (SP value: 8.8 (cal/cm$^3$)$^{1/2}$)
2-HEA: 2-hydroxyethyl acrylate (SP value: 12.9 (cal/cm$^3$)$^{1/2}$)
MMA: methyl methacrylate (SP value: 9.4 (cal/cm$^3$)$^{1/2}$)
BMA: butyl methacrylate (SP value: 9.2 (cal/cm$^3$)$^{1/2}$)

STMA: stearyl methacrylate (SP value: 8.8 $(cal/cm^3)^{1/2}$)
GlyMA: glycerin monomethacrylate (SP value: 14.5 $(cal/cm^3)^{1/2}$)
St: styrene (SP value: 9.2 $(cal/cm^3)^{1/2}$)
PME-400: methoxypolyethylene glycol acrylate (EO≈9 mol, SP value: 9.9 $(cal/cm^3)^{1/2}$)
Latemul E-150: sodium polyoxyethylene lauryl ether sulfate available from Kao Corporation
Aqualon KH-10: ether sulfate available from DKS Co., Ltd.

Production Example 30: Production of Urethane Urea Resin Particles 1 (Ur1)

A reaction vessel equipped with a gas inlet tube, a thermometer, a condenser, and a stirrer was charged with 72 parts of polyester polyol ("P-2010" available from Kuraray Co., Ltd., hydroxyl value: 56 (mgKOH/g)) dehydrated in advance under reduced pressure, 3.4 parts of dimethylolpropionic acid, 59.9 parts of methyl ethyl ketone, and 20 parts of isophorone diisocyanate. Next, the internal temperature was increased to 80° C., and the mixture was reacted for 4 hours to obtain a mixed solution containing a terminal isocyanate group-containing urethane prepolymer. The mixed solution was cooled to 40° C., after which 20 parts of methyl ethyl ketone were added thereto, and 2.2 parts of dimethylaminoethanol were further added thereto to neutralize acid groups.

Next, 209.4 parts of ion-exchanged water were gradually added to the mixed solution containing the terminal isocyanate group-containing urethane prepolymer while stirring, and the urethane prepolymer was thereby emulsified. Subsequently, an aqueous solution of isophoronediamine (prepared by dissolving 4.6 parts of isophoronediamine in a mixed solution of 16.4 parts of isopropyl alcohol and 16.4 parts of ion-exchanged water) was gradually added to the obtained emulsion to cause a chain extension reaction. Methyl ethyl ketone and isopropyl alcohol were then removed under reduced pressure, and ion-exchanged water was added to adjust the solid content to 30%, and thereby urethane urea resin particles 1 (Ur1) having an acid value of 14.2 (mgKOH/g) and an SP value of 11.1 $(cal/cm^3)^{1/2}$ were obtained.

Production Examples 31 to 40: Production of Urethane Urea Resin Particles 2 to 11 (Ur2 to Ur11)

Urethane urea resin particles 2 to 11 (Ur2 to Ur 1) were produced by the same operation as that of the urethane urea resin particles 1 (Ur1) with the exception that the polyols and the polyisocyanates added to the reaction vessel and the types and amounts of the chain extender added during the chain extension reaction were changed as described in Table I-2.

Production Example 41: Production Example of Urethane-(Meth)Acrylic Resin Particles 1 (UrAc1)

A reaction vessel equipped with a gas inlet tube, a thermometer, a condenser, and a stirrer was charged with 28.4 parts of methyl methacrylate, 66.4 parts of n-butyl methacrylate, and 26.4 parts of methyl ethyl ketone, after which the internal temperature was increased to 50° C. In addition, 5.2 parts of 1-thioglycerol were further added, and the mixture was heated to 90° C. Subsequently, a solution prepared by dissolving 0.1 parts of azoisobisbutyronitrile in 18.7 parts of methyl ethyl ketone was added dropwise into the reaction vessel over 5 hours, and after completion of the dropwise addition, the reaction was further carried out for 1 hour. The inside of the reaction vessel was then cooled until the internal temperature reached 30° C. or less, after which methyl ethyl ketone was added to adjust the solid content to 60%. In this manner, a solution of a diol-terminated methacrylic resin (diol-terminated methacrylic resin 1) having a number average molecular weight of approximately 2000 was obtained.

Next, another reaction vessel equipped with a gas inlet tube, a thermometer, a condenser, and a stirrer was charged with 65.1 parts of a polyester polyol ("HS 2H-201AP" available from Hokoku Corporation, hydroxyl value: 56 (mgKOH/g)) dehydrated in advance under reduced pressure, 12.05 parts (7.23 parts in terms of solid content) of the above-prepared diol-terminated methacrylic resin solution (diol-terminated methacrylic resin 1, solid content of 60%), 5.1 parts of dimethylolpropionic acid, 61.6 parts of methyl ethyl ketone, and 20.1 parts of isophorone diisocyanate. Subsequently, the internal temperature was increased to 80° C., after which the mixture was reacted for 4 hours, and a solution of terminal isocyanate group-containing urethane prepolymer was obtained. The solution was then cooled to 40° C. or lower, after which 20.5 parts of methyl ethyl ketone were added to dilute the solution, and 3.4 parts of dimethylaminoethanol were further added to neutralize the acid group in the prepolymer molecule.

Subsequently, 209.4 parts of ion-exchanged water were gradually added to the solution of the terminal isocyanate group-containing urethane prepolymer in a stirred state, and emulsification was carried out. An aqueous solution of isophoronediamine (prepared by dissolving 2.5 parts of isophoronediamine in a mixed solution of 15.3 parts of isopropyl alcohol and 15.3 parts of ion-exchanged water) was gradually added to the obtained emulsion to cause a chain extension reaction. Methyl ethyl ketone and isopropyl alcohol were then removed under reduced pressure, and the solid content was adjusted to 30% with ion-exchanged water, and thereby urethane-(meth)acrylic resin particles 1 (UrAc1) having an acid value of 21.3 (mgKOH/g) and an SP value of 11.7 $(cal/cm^3)^{1/2}$ were obtained.

TABLE I-2

Synthesis Examples of Urethane Urea Resin Particles and Urethane-(Meth)Acrylic Resin Particles

| | Resin Particles (A1) | Production Example 30 Ur1 | Production Example 31 Ur2 | Production Example 32 Ur3 | Production Example 33 Ur4 | Production Example 34 Ur5 | Production Example 35 Ur6 |
|---|---|---|---|---|---|---|---|
| Polyol | P2010 | 72 | | | | | |
| | HS2H-201AP | | 72 | | 67.0 | 72.0 | 72.3 |
| | UH200 | | | 72 | | | |
| | PEG2000 | | | | 5.0 | | |

TABLE I-2-continued

Synthesis Examples of Urethane Urea Resin Particles and Urethane-(Meth)Acrylic Resin Particles

|  |  |  |  |  |  |  |  |
|---|---|---|---|---|---|---|---|
| Low molecular weight polyol | Diol-terminated methacrylic resin 1 (Amount in terms of solid content) 1,4-butanediol 1,6-hexanediol |  |  |  |  | 1.5 |  |
| Polyols having a carboxyl group | DMPA | 3.4 | 3.4 | 3.4 | 3.4 | 1.2 | 5.1 |
| Organic isocyanate | IPDI m-TMXDI | 20 | 20 | 20 | 20 | 20 | 20.1 |
| Chain extender | IPDA m-TMXDA AEA | 4.6 | 4.6 | 4.6 | 4.6 | 4.6 | 2.5 |
| Parameters | Total | 100 | 100 | 100 | 100.0 | 99.3 | 100 |
|  | SP Value[(cal/cm³)^{1/2}] | 11.1 | 11.2 | 11.1 | 11.0 | 11.1 | 11.7 |
|  | Acid value[mgKOH/g] | 14.2 | 14.2 | 14.2 | 14.2 | 5.1 | 21.3 |

|  | Resin Particles (A1) | Production Example 36 Ur7 | Production Example 37 Ur8 | Production Example 38 Ur9 | Production Example 39 Ur10 | Production Example 40 Ur11 | Production Example 41 UrAc1 |
|---|---|---|---|---|---|---|---|
| Polyol | P2010 |  |  |  |  |  |  |
|  | HS2H-201AP | 64.2 | 60.7 | 70.2 | 55.7 | 73.3 | 65.1 |
|  | UH200 |  |  |  |  |  |  |
|  | PEG2000 |  |  |  |  |  |  |
|  | Diol-terminated methacrylic resin 1 (Amount in terms of solid content) |  |  |  |  |  | 7.23 |
| Low molecular weight polyol | 1,4-butanediol 1,6-hexanediol |  |  |  | 4.9 |  |  |
| Polyols having a carboxyl group | DMPA | 8.6 | 10.2 | 3.3 | 3.7 | 3.5 | 5.1 |
| Organic isocyanate | IPDI | 25.0 | 27.0 |  |  | 20.4 | 20.1 |
|  | m-TMXDI |  |  | 21.4 | 30.6 |  |  |
| Chain extender | IPDA | 2.2 | 2.1 |  |  |  | 2.5 |
|  | m-TMXDA |  |  | 5.1 | 5.0 |  |  |
|  | AEA |  |  |  |  | 2.9 |  |
| Parameters | Total | 100 | 100 | 100 | 100 | 100 | 100 |
|  | SP Value[(cal/cm³)^{1/2}] | 12.2 | 12.4 | 11.3 | 11.7 | 11.8 | 11.7 |
|  | Acid value[mgKOH/g] | 36.0 | 42.6 | 13.8 | 15.6 | 14.5 | 21.3 |

In Table I-2, the SP values and acid values of the produced urethane urea resin particles 1 to 11 and urethane-(meth)acrylic resin particles 1 are also described. Also, in Production Example 41, the blending amount of the diol-terminated methacrylic resin 1 is in terms of solid content. Moreover, the details of the product names and abbreviations described in Table I-2 are as follows.

- P-2010: polyester polyol (3-methyl-1,5-pentanediol/adipic acid; number of functional groups: 2, hydroxyl value: 56 mgKOH/g, SP value: 10.9 $(cal/cm^3)^{1/2}$), available from Kuraray Co., Ltd.
- HS2H-201AP: polyester polyol (1,6-hexanediol/adipic acid; number of functional groups: 2, hydroxyl value: 56 mgKOH/g, SP value: 10.9 $(cal/cm^3)^{1/2}$), available from Hokoku Corporation
- UH200: polycarbonate polyol (1,6-hexanediol carbonate; number of functional groups: 2, hydroxyl value: 56 mgKOH/g, SP value: 10.8 $(cal/cm^3)^{1/2}$), available from Ube Industries, Ltd.
- PEG2000: polyethylene glycol available from NOF Corporation (number of functional groups: 2, hydroxyl value: 56 mgKOH/g, SP value: 10.8)
- DMPA: dimethylolpropionic acid (SP value: 16.1 $cal/cm^3)^{1/2}$)
- IPDI: isophorone diisocyanate (SP value: 10.9 $(cal/cm^3)^{1/2}$)
- m-TMXDI: m-tetramethylxylylene diisocyanate (SP value: 11.0 $(cal/cm^3)^{1/2}$)
- IPDA: isophoronediamine (SP value: 7.7 $(cal/cm^3)^{1/2}$)
- m-TMXDA: m-tetramethylxylylenediamine (SP value: 8.3 $(cal/cm^3)^{1/2}$)
- AEA: N-(2-aminoethyl)ethanolamine (SP value: 11.9 $(cal/cm^3)^{1/2}$)

<2> Production Examples of Pretreatment Liquid

Production Example 42: Production Example of Pretreatment Liquid I-1

A mixing vessel equipped with a stirrer was charged with the following materials, and the materials were mixed at room temperature (25° C.) for 1 hour, and then heated to 50° C., and further mixed for 1 hour. Subsequently, the mixture was cooled to room temperature and then filtered through a nylon mesh having a pore size of 100 μm, and thereby a pretreatment liquid I-1 was produced. The materials used below will be described in detail later.

| Resin Particles 15 (Ac16) | 12.5 parts |
|---|---|
| Resin particles 19 (Ac20) | 12.5 parts |
| HYTEC E-6400 | 2.85 parts |

-continued

| | |
|---|---|
| Calcium formate | 3.0 parts |
| Calcium lactate | 2.0 parts |
| 2-propanol | 5.0 parts |
| Surfynol 440 | 1.0 parts |
| Proxel GXL | 0.05 parts |
| Ion-exchanged water | 61.1 parts |

Production Examples 43 to 129: Production Examples of Pretreatment Liquids I-2 to I-88

Pretreatment liquids I-2 to I-83 were produced in the same manner as the pretreatment liquid I-1 with the exception of using the materials described in Table I-3.

TABLE I-3

Production Examples of Pretreatment Liquids

| | | | Production Example No. | | | | | | | |
|---|---|---|---|---|---|---|---|---|---|---|
| | | | Production Example 42 | Production Example 43 | Production Example 44 | Production Example 45 | Production Example 46 | Production Example 47 | Production Example 48 | Production Example 49 |
| | | | Pretreatment Liquid No. | | | | | | | |
| | | | I-1 | I-2 | I-3 | I-4 | I-5 | I-6 | I-7 | I-8 |
| Resin Particles (A1) | (Meth)acrylic resin particles | Used resin particle dispersion (A1)-1 | Ac16 | Ac16 | Ac16 | Ac16 | Ac16 | Ac16 | Ac16 | Ac16 |
| | | SP Value[(cal/cm$^3$)$^{1/2}$] | 9.2 | 9.2 | 9.2 | 9.2 | 9.2 | 9.2 | 9.2 | 9.2 |
| | | Addition amount (dispersion amount) | 12.5 | 12.5 | 12.5 | 12.5 | 12.5 | 12.5 | 12.5 | 12.5 |
| | | Used resin particle dispersion (A1)-2 | Ac20 | Ac20 | Ac20 | Ac20 | Ac20 | Ac20 | Ac20 | Ac20 |
| | | SP Value[(cal/cm$^3$)$^{1/2}$] | 9.4 | 9.4 | 9.4 | 9.4 | 9.4 | 9.4 | 9.4 | 9.4 |
| | | Addition amount (dispersion amount) | 12.5 | 12.5 | 12.5 | 12.5 | 12.5 | 12.5 | 12.5 | 12.5 |
| Resin Particles (A2) | HYTEC E-6400 (solid content of 35%) | | 2.85 | 2.85 | 2.85 | 2.85 | 2.85 | 2.85 | 2.85 | 2.85 |
| Calcium salt of carboxylic acid | Calcium formate | | 3.0 | | | 3.0 | 1.0 | | 1.6 | 5.0 |
| | Calcium acetate | | | 3.0 | | | | | | |
| | Calcium propionate | | | | 3.0 | | | | | |
| | Calcium gluconate | | | | | | 2.0 | | 1.0 | |
| | Calcium lactate | | 2.0 | 2.0 | 2.0 | | 1.0 | 1.0 | 1.1 | 5.0 |
| Calcium salt of non-carboxylic acid | Calcium glycerophosphate | | | | | | | | | |
| Carboxylic acid | Formic acid | | | | | | | | | |
| | Gluconic acid | | | | | | | | | |
| | Lactic acid | | | | | | | | | |
| Water-soluble organic solvent (B) | IPA | | 5.0 | 5.0 | 5.0 | 5.0 | 5.0 | 5.0 | 5.0 | 5.0 |
| Surfactant (C) | Acetylene-based | Surfynol 440 | 1.0 | 1.0 | 1.0 | 1.0 | 1.0 | 1.0 | 1.0 | 1.0 |
| Preservative | Proxel GXL | | 0.05 | 0.05 | 0.05 | 0.05 | 0.05 | 0.05 | 0.05 | 0.05 |
| Ion-exchanged water | | | 61.1 | 61.1 | 61.1 | 61.1 | 61.1 | 58.1 | 63.4 | 56.1 |
| Total | | | 100 | 100 | 100 | 100 | 100 | 100 | 100 | 100 |
| Blending amount | Amount of resin particles (A); R [g] | | 8.5 | 8.5 | 8.5 | 8.5 | 8.5 | 8.5 | 8.5 | 8.5 |
| | Amount of calcium ions in millimoles; C [mmol] | | 32.2 | 28.1 | 25.3 | 27.7 | 35.3 | 27.6 | 17.3 | 61.3 |
| | R/C | | 0.26 | 0.30 | 0.34 | 0.31 | 0.24 | 0.31 | 0.49 | 0.14 |
| | C × 2/A | | 1.0 | 1.0 | 1.0 | 1.0 | 1.0 | 1.0 | 1.0 | 1.0 |

| | | | Production Example No. | | | | | | |
|---|---|---|---|---|---|---|---|---|---|
| | | | Production Example 50 | Production Example 51 | Production Example 52 | Production Example 53 | Production Example 54 | Production Example 55 | Production Example 56 |
| | | | Pretreatment Liquid No. | | | | | | |
| | | | I-9 | I-10 | I-11 | I-12 | I-13 | I-14 | I-15 |
| Resin Particles (A1) | (Meth)acrylic resin particles | Used resin particle dispersion (A1)-1 | Ac16 | Ac16 | Ac16 | Ac16 | Ac16 | Ac16 | Ac16 |
| | | SP Value[(cal/cm$^3$)$^{1/2}$] | 9.2 | 9.2 | 9.2 | 9.2 | 9.2 | 9.2 | 9.2 |
| | | Addition amount (dispersion amount) | 4.5 | 16 | 22.5 | 22.5 | 26 | 12.5 | 12.5 |
| | | Used resin particle dispersion (A1)-2 | Ac20 | Ac20 | Ac20 | Ac20 | Ac20 | Ac20 | Ac20 |
| | | SP Value[(cal/cm$^3$)$^{1/2}$] | 9.4 | 9.4 | 9.4 | 9.4 | 9.4 | 9.4 | 9.4 |
| | | Addition amount (dispersion amount) | 4.5 | 16 | 22.5 | 22.5 | 26 | 12.5 | 12.5 |

TABLE I-3-continued

| Production Examples of Pretreatment Liquids | | | | | | | | | |
|---|---|---|---|---|---|---|---|---|---|
| Resin Particles (A2) | HYTEC E-6400 (solid content of 35%) | 2.55 | 2.85 | 2.85 | 2.85 | 2.85 | 2.85 | 2.85 | |
| Calcium salt of carboxylic acid | Calcium formate | 3.0 | 3.0 | 3.0 | 5.4 | 5.4 | 4.0 | 4.0 | |
| | Calcium acetate | | | | | | | | |
| | Calcium propionate | | | | | | | | |
| | Calcium gluconate | | | | | | | | |
| | Calcium lactate | 2.0 | 2.0 | 2.0 | 3.6 | 3.6 | | | |
| Calcium salt of non-carboxylic acid | Calcium glycerophosphate | | | | | | | | |
| Carboxylic acid | Formic acid | | | | | | | | |
| | Gluconic acid | | | | | | | | |
| | Lactic acid | | | | | | 2.0 | 1.2 | |
| Water-soluble organic solvent (B) | IPA | 5.0 | 5.0 | 5.0 | 5.0 | 5.0 | 5.0 | 5.0 | |
| Surfactant (C) | Acetylene-based Surfynol 440 | 1.0 | 1.0 | 1.0 | 1.0 | 1.0 | 1.0 | 1.0 | |
| Preservative | Proxel GXL | 0.05 | 0.05 | 0.05 | 0.05 | 0.05 | 0.05 | 0.05 | |
| Ion-exchanged water | | 77.4 | 54.1 | 41.1 | 37.1 | 30.1 | 60.1 | 60.9 | |
| Total | | 100 | 100 | 100 | 100 | 100 | 100 | 100 | |
| Blending amount | Amount of resin particles (A); R [g] | 3.6 | 10.6 | 14.5 | 14.5 | 16.6 | 8.5 | 8.5 | |
| | Amount of calcium ions in millimoles; C [mmol] | 32.2 | 32.2 | 32.2 | 58.0 | 58.0 | 30.7 | 30.7 | |
| | R/C | 0.111 | 0.33 | 0.45 | 0.25 | 0.29 | 0.28 | 0.28 | |
| | C × 2/A | 1.0 | 1.0 | 1.0 | 1.0 | 1.0 | 0.7 | 0.8 | |

| | | | Production Example No. | | | | | | |
|---|---|---|---|---|---|---|---|---|---|
| | | | Production Example 57 | Production Example 58 | Production Example 59 | Production Example 60 | Production Example 61 | Production Exam ple 62 | Production Exam ple 63 |
| | | | Pretreatment Liquid No. | | | | | | |
| | | | I-16 | I-17 | I-18 | I-19 | I-20 | I-21 | I-22 |
| Resin Particles (A1) | (Meth)acrylic resin particles | Used resin particle dispersion (A1)-1 | Ac16 | Ac16 | Ac16 | Ac16 | Ac16 | Ac16 | Ac16 |
| | | SP Value[(cal/cm$^3$)$^{1/2}$] | 9.2 | 9.2 | 9.2 | 9.2 | 9.2 | 9.2 | 9.2 |
| | | Addition amount (dispersion amount) | 12.5 | 12.5 | 12.5 | 12.5 | 12.5 | 12.5 | 12.5 |
| | | Used resin particle dispersion (A1)-2 | Ac20 | Ac20 | Ac20 | Ac20 | Ac20 | Ac20 | Ac20 |
| | | SP Value[(cal/cm$^3$)$^{1/2}$] | 9.4 | 9.4 | 9.4 | 9.4 | 9.4 | 9.4 | 9.4 |
| | | Addition amount (dispersion amount) | 12.5 | 12.5 | 12.5 | 12.5 | 12.5 | 12.5 | 12.5 |
| Resin Particles (A2) | HYTEC E-6400 (solid content of 35%) | | 2.85 | 2.85 | 2.85 | 2.85 | 2.85 | 2.85 | 2.85 |
| Calcium salt of carboxylic acid | Calcium formate | | 4.0 | 4.0 | | 3.0 | 3.0 | 1.2 | 7.0 |
| | Calcium acetate | | | | | | | | |
| | Calcium propionate | | | | | | | | |
| | Calcium gluconate | | | | | | | | |
| | Calcium lactate | | | | 6.0 | 2.0 | 2.0 | 0.8 | 7.0 |
| Calcium salt of non-carboxylic acid | Calcium glycerophosphate | | | | | | 0.6 | 1.5 | |
| Carboxylic acid | Formic acid | | | | | 1.0 | | | |
| | Gluconic acid | | | 1.0 | | | | | |
| | Lactic acid | | 0.5 | | | | | | |
| Water-soluble organic solvent (B) | IPA | | 5.0 | 5.0 | 5.0 | 5.0 | 5.0 | 5.0 | 5.0 |
| Surfactant (C) | Acetylene-based Surfynol 440 | | 1.0 | 1.0 | 1.0 | 1.0 | 1.0 | 1.0 | 1.0 |
| Preservative | Proxel GXL | | 0.05 | 0.05 | 0.05 | 0.05 | 0.05 | 0.05 | 0.05 |
| Ion-exchanged water | | | 61.6 | 61.1 | 59.1 | 77.4 | 77.4 | 64.1 | 52.1 |
| Total | | | 100 | 100 | 100 | 100 | 100 | 100 | 100 |
| Blending amount | Amount of resin particles (A); R [g] | | 8.5 | 8.5 | 8.5 | 8.5 | 8.5 | 8.5 | 8.5 |
| | Amount of calcium ions in millimoles; C [mmol] | | 30.7 | 30.7 | 27.5 | 35.1 | 39.4 | 12.9 | 85.9 |
| | R/C | | 0.28 | 0.28 | 0.31 | 0.24 | 0.22 | 0.66 | 0.099 |
| | C × 2/A | | 0.9 | 0.9 | 0.7 | 1.1 | 1.2 | 1.0 | 1.0 |

TABLE I-3-continued

Production Examples of Pretreatment Liquids

| | | | Production Example No. | | | | | | |
|---|---|---|---|---|---|---|---|---|---|
| | | | Production Example 64 | Production Example 65 | Production Example 66 | Production Example 67 | Production Example 68 | Production Example 69 | Production Example 70 |
| | | | Pretreatment Liquid No. | | | | | | |
| | | | I-23 | I-24 | I-25 | I-26 | I-27 | I-28 | I-29 |
| Resin Particles (A1) | (Meth)acrylic resin particles | Used resin particle dispersion (A1)-1 | Ac16 | Ac16 | Ac16 | Ac16 | Ac16 | Ac16 | Ac16 |
| | | SP Value[$(cal/cm^3)^{1/2}$] | 9.2 | 9.2 | 9.2 | 9.2 | 9.2 | 9.2 | 9.2 |
| | | Addition amount (dispersion amount) | 5 | 12.5 | 12.5 | 12.5 | 12.5 | 12.5 | 12.5 |
| | | Used resin particle dispersion (A1)-2 | Ac20 | Ac20 | Ac20 | Ac20 | Ac20 | Ac20 | Ac20 |
| | | SP Value[$(cal/cm^3)^{1/2}$] | 9.4 | 9.4 | 9.4 | 9.4 | 9.4 | 9.4 | 9.4 |
| | | Addition amount (dispersion amount) | 5 | 12.5 | 12.5 | 12.5 | 12.5 | 12.5 | 12.5 |
| Resin Particles (A2) | HYTEC E-6400 (solid content of 35%) | | 2.85 | 2.85 | 2.85 | 2.85 | 2.85 | 2.85 | 2.85 |
| Calcium salt of carboxylic acid | Calcium formate | | 3.6 | 2.0 | 4.0 | 10.0 | 3.0 | 3.0 | |
| | Calcium acetate | | | | | | | 2.0 | 3.0 |
| | Calcium propionate | | | | | | | | |
| | Calcium gluconate | | | | | | 2.0 | | 2.0 |
| | Calcium lactate | | 2.3 | | | | | | |
| Calcium salt of non-carboxylic acid | Calcium glycerophosphate | | | | | | | | |
| Carboxylic acid | Formic acid | | | | | | | | |
| | Gluconic acid | | | | | | | | |
| | Lactic acid | | | | | | | | |
| Water-soluble organic solvent (B) | IPA | | 5.0 | 5.0 | 5.0 | 5.0 | 5.0 | 5.0 | 5.0 |
| Surfactant (C) | Acetylene-based | Surfynol 440 | 1.0 | 1.0 | 1.0 | 1.0 | 1.0 | 1.0 | 1.0 |
| Preservative | Proxel GXL | | 0.05 | 0.05 | 0.05 | 0.05 | 0.05 | 0.05 | 0.05 |
| Ion-exchanged water | | | 75.2 | 64.1 | 62.1 | 56.1 | 61.1 | 61.1 | 61.1 |
| Total | | | 100 | 100 | 100 | 100 | 100 | 100 | 100 |
| Blending amount | Amount of resin particles (A); R [g] | | 4.0 | 8.5 | 8.5 | 8.5 | 8.5 | 8.5 | 8.5 |
| | Amount of calcium ions in millimoles; C [mmol] | | 38.2 | 15.4 | 30.7 | 76.9 | 33.8 | 35.7 | 29.7 |
| | R/C | | 0.104 | 0.55 | 0.28 | 0.110 | 0.25 | 0.24 | 0.29 |
| | C × 2/A | | 1.0 | 1.0 | 1.0 | 1.0 | 1.0 | 1.0 | 1.0 |

| | | | Production Example No. | | | | | | |
|---|---|---|---|---|---|---|---|---|---|
| | | | Production Example 71 | Production Example 72 | Production Example 73 | Production Example 74 | Production Example 75 | Production Example 76 | Production Example 77 |
| | | | Pretreatment Liquid No. | | | | | | |
| | | | I-30 | I-31 | I-32 | I-33 | I-34 | I-35 | I-36 |
| Resin Particles (A1) | (Meth)acrylic resin particles | Used resin particle dispersion (A1)-1 | Ac1 | Ac2 | Ac3 | Ac4 | Ac5 | Ac6 | Ac7 |
| | | SP Value[$(cal/cm^3)^{1/2}$] | 9.3 | 9.4 | 9.4 | 9.4 | 9.5 | 9.5 | 9.5 |
| | | Addition amount (dispersion amount) | 25 | 25 | 25 | 25 | 25 | 25 | 25 |
| | | Used resin particle dispersion (A1)-2 | | | | | | | |
| | | SP Value[$(cal/cm^3)^{1/2}$] | | | | | | | |
| | | Addition amount (dispersion amount) | | | | | | | |
| Resin Particles (A2) | | Used resin particle dispersion (A2) | | | | | | | |
| | | SP Value[$(cal/cm^3)^{1/2}$] | | | | | | | |
| | | Addition amount (dispersion amount) | | | | | | | |
| | HYTEC E-6400 (solid content of 35%) | | 2.9 | 2.9 | 2.9 | 2.9 | 2.9 | 2.9 | 2.9 |
| | Arrowbase SB-1200 (solid content of 25%) | | | | | | | | |
| Calcium salt of carboxylic acid | Calcium formate | | 3 | 3 | 3 | 3 | 3 | 3 | 3 |
| | Calcium lactate | | 2 | 2 | 2 | 2 | 2 | 2 | 2 |
| Water-soluble organic solvent (B) | IPA | | 5 | 5 | 5 | 5 | 5 | 5 | 5 |
| Surfactant (C) | Acetylene-based | Surfynol 440 | 1 | 1 | 1 | 1 | 1 | 1 | 1 |
| Thickener | Adeka Nol UH540 | | | | | | | | |
| Preservative | Proxel GXL | | 0.05 | 0.05 | 0.05 | 0.05 | 0.05 | 0.05 | 0.05 |
| Ion-exchanged water | | | 61.1 | 61.1 | 61.1 | 61.1 | 61.1 | 61.1 | 61.1 |
| Total | | | 100 | 100 | 100 | 100 | 100 | 100 | 100 |
| Blending amount | Amount of resin particles (A); R [g] | | 8.5 | 8.5 | 8.5 | 8.5 | 8.5 | 8.5 | 8.5 |
| | Amount of calcium ions in millimoles; C [mmol] | | 32.2 | 32.2 | 32.2 | 32.2 | 32.2 | 32.2 | 32.2 |

TABLE I-3-continued

Production Examples of Pretreatment Liquids

| | | | | | | | | | |
|---|---|---|---|---|---|---|---|---|---|
| | R/C | | 0.26 | 0.26 | 0.26 | 0.26 | 0.26 | 0.26 | 0.26 |
| | C × 2/A | | 1.0 | 1.0 | 1.0 | 1.0 | 1.0 | 1.0 | 1.0 |

| | | | Production Example No. | | | | | | |
|---|---|---|---|---|---|---|---|---|---|
| | | | Production Example 78 | Production Example 79 | Production Example 80 | Production Example 81 | Production Example 82 | Production Example 83 | Production Example 84 |
| | | | Pretreatment Liquid No. | | | | | | |
| | | | I-37 | I-38 | I-39 | I-40 | I-41 | I-42 | I-43 |
| Resin Particles (A1) | (Meth)acrylic resin particles | Used resin particle dispersion (A1)-1 | Ac8 | Ac9 | Ac10 | Ac11 | Ac12 | Ac13 | Ac14 |
| | | SP Value[(cal/cm$^3$)$^{1/2}$] | 9.1 | 9.1 | 9.2 | 9.3 | 10.1 | 11.1 | 12.1 |
| | | Addition amount (dispersion amount) | 25 | 25 | 25 | 25 | 25 | 25 | 25 |
| | | Used resin particle dispersion (A1)-2 | | | | | | | |
| | | SP Value[(cal/cm$^3$)$^{1/2}$] | | | | | | | |
| | | Addition amount (dispersion amount) | | | | | | | |
| Resin Particles (A2) | | Used resin particle dispersion (A2) | | | | | | | |
| | | SP Value[(cal/cm$^3$)$^{1/2}$] | | | | | | | |
| | | Addition amount (dispersion amount) | | | | | | | |
| | | HYTEC E-6400 (solid content of 35%) | 2.9 | 2.9 | 2.9 | 2.9 | 2.9 | 2.9 | 2.9 |
| | | Arrowbase SB-1200 (solid content of 25%) | | | | | | | |
| Calcium salt of carboxylic acid | Calcium formate | | 3 | 3 | 3 | 3 | 3 | 3 | 3 |
| | Calcium lactate | | 2 | 2 | 2 | 2 | 2 | 2 | 2 |
| Water-soluble organic solvent (B) | IPA | | 5 | 5 | 5 | 5 | 5 | 5 | 5 |
| Surfactant (C) | Acetylene-based | Surfynol 440 | 1 | 1 | 1 | 1 | 1 | 1 | 1 |
| Thickener | Adeka Nol UH540 | | | | | | | | |
| Preservative | Proxel GXL | | 0.05 | 0.05 | 0.05 | 0.05 | 0.05 | 0.05 | 0.05 |
| Ion-exchanged water | | | 61.1 | 61.1 | 61.1 | 61.1 | 61.1 | 61.1 | 61.1 |
| Total | | | 100 | 100 | 100 | 100 | 100 | 100 | 100 |
| Blending amount | Amount of resin particles (A); R [g] | | 8.5 | 8.5 | 8.5 | 8.5 | 8.5 | 8.5 | 8.5 |
| | Amount of calcium ions in millimoles; C [mmol] | | 32.2 | 32.2 | 32.2 | 32.2 | 32.2 | 32.2 | 32.2 |
| | R/C | | 0.26 | 0.26 | 0.26 | 0.26 | 0.26 | 0.26 | 0.26 |
| | C × 2/A | | 1.0 | 1.0 | 1.0 | 1.0 | 1.0 | 1.0 | 1.0 |

| | | | Production Example No. | | | | | | |
|---|---|---|---|---|---|---|---|---|---|
| | | | Production Example 85 | Production Example 86 | Production Example 87 | Production Example 88 | Production Example 89 | Production Example 90 | Production Example 91 |
| | | | Pretreatment Liquid No. | | | | | | |
| | | | I-44 | I-45 | I-46 | I-47 | I-48 | I-49 | I-50 |
| Resin Particles (A1) | (Meth)acrylic resin particles | Used resin particle dispersion (A1)-1 | Ac15 | Ac16 | Ac17 | Ac18 | Ac19 | Ac20 | Ac21 |
| | | SP Value[(cal/cm$^3$)$^{1/2}$] | 13.4 | 9.2 | 9.3 | 9.3 | 9.4 | 9.4 | 9.4 |
| | | Addition amount (dispersion amount) | 25 | 25 | 25 | 25 | 25 | 25 | 25 |
| | | Used resin particle dispersion (A1)-2 | | | | | | | |
| | | SP Value[(cal/cm$^3$)$^{1/2}$] | | | | | | | |
| | | Addition amount (dispersion amount) | | | | | | | |
| Resin Particles (A2) | | Used resin particle dispersion (A2) | | | | | | | |
| | | SP Value[(cal/cm$^3$)$^{1/2}$] | | | | | | | |
| | | Addition amount (dispersion amount) | | | | | | | |
| | | HYTEC E-6400 (solid content of 35%) | 2.9 | 2.9 | 2.9 | 2.9 | 2.9 | 2.9 | 2.9 |
| | | Arrowbase SB-1200 (solid content of 25%) | | | | | | | |
| Calcium salt of carboxylic acid | Calcium formate | | 3 | 3 | 3 | 3 | 3 | 3 | 3 |
| | Calcium lactate | | 2 | 2 | 2 | 2 | 2 | 2 | 2 |
| Water-soluble organic solvent (B) | IPA | | 5 | 5 | 5 | 5 | 5 | 5 | 5 |
| Surfactant (C) | Acetylene-based | Surfynol 440 | 1 | 1 | 1 | 1 | 1 | 1 | 1 |
| Thickener | Adeka Nol UH540 | | | | | | | | |
| Preservative | Proxel GXL | | 0.05 | 0.05 | 0.05 | 0.05 | 0.05 | 0.05 | 0.05 |
| Ion-exchanged water | | | 61.1 | 61.1 | 61.1 | 61.1 | 61.1 | 61.1 | 61.1 |
| Total | | | 100 | 100 | 100 | 100 | 100 | 100 | 100 |
| Blending amount | Amount of resin particles (A); R [g] | | 8.5 | 8.5 | 8.5 | 8.5 | 8.5 | 8.5 | 8.5 |
| | Amount of calcium ions in millimoles; C [mmol] | | 32.2 | 32.2 | 32.2 | 32.2 | 32.2 | 32.2 | 32.2 |
| | R/C | | 0.26 | 0.26 | 0.26 | 0.26 | 0.26 | 0.26 | 0.26 |
| | C × 2/A | | 1.0 | 1.0 | 1.0 | 1.0 | 1.0 | 1.0 | 1.0 |

TABLE I-3-continued

Production Examples of Pretreatment Liquids

| | | | Production Example No. | | | | | | |
|---|---|---|---|---|---|---|---|---|---|
| | | | Production Example 92 | Production Example 93 | Production Example 94 | Production Example 95 | Production Example 96 | Production Example 97 | Production Example 98 |
| | | | Pretreatment Liquid No. | | | | | | |
| | | | I-51 | I-52 | I-53 | I-54 | I-55 | I-56 | I-57 |
| Resin Particles (A1) | (Meth)acrylic resin particles | Used resin particle dispersion (A1)-1 | Ac22 | Ac23 | Ac24 | Ac25 | Ac26 | Ac10 | Ac10 |
| | | SP Value[(cal/cm$^3$)$^{1/2}$] | 9.3 | 9.3 | 9.3 | 9.4 | 9.3 | 9.3 | 9.3 |
| | | Addition amount (dispersion amount) | 25 | 25 | 25 | 25 | 25 | 25 | 25 |
| | | Used resin particle dispersion (A1)-2 | | | | | | | |
| | | SP Value[(cal/cm$^3$)$^{1/2}$] | | | | | | | |
| | | Addition amount (dispersion amount) | | | | | | | |
| Resin Particles (A2) | | Used resin particle dispersion (A2) | | | | | | | |
| | | SP Value[(cal/cm$^3$)$^{1/2}$] | | | | | | | |
| | | Addition amount (dispersion amount) | | | | | | | |
| | | HYTEC E-6400 (solid content of 35%) | 2.9 | 2.9 | 2.9 | 2.9 | 2.9 | | |
| | | Arrowbase SB-1200 (solid content of 25%) | | | | | | | 4 |
| Calcium salt of carboxylic acid | Calcium formate | | 3 | 3 | 3 | 3 | 3 | 3 | 3 |
| | Calcium lactate | | 2 | 2 | 2 | 2 | 2 | 2 | 2 |
| Water-soluble organic solvent (B) | IPA | | 5 | 5 | 5 | 5 | 5 | 5 | 5 |
| Surfactant (C) | Acetylene-based | Surfynol 440 | 1 | 1 | 1 | 1 | 1 | 1 | 1 |
| Thickener | Adeka Nol UH540 | | | | | | | | |
| Preservative | Proxel GXL | | 0.05 | 0.05 | 0.05 | 0.05 | 0.05 | 0.05 | 0.05 |
| Ion-exchanged water | | | 61.1 | 61.1 | 61.1 | 61.1 | 61.1 | 63.95 | 59.95 |
| Total | | | 100 | 100 | 100 | 100 | 100 | 100 | 100 |
| Blending amount | Amount of resin particles (A); R [g] | | 8.5 | 8.5 | 8.5 | 8.5 | 8.5 | 7.5 | 8.5 |
| | Amount of calcium ions in millimoles; C [mmol] | | 32.2 | 32.2 | 32.2 | 32.2 | 32.2 | 32.2 | 32.2 |
| | R/C | | 0.26 | 0.26 | 0.26 | 0.26 | 0.26 | 0.23 | 0.26 |
| | C × 2/A | | 1.0 | 1.0 | 1.0 | 1.0 | 1.0 | 1.0 | 1.0 |

| | | | Production Example No. | | | | | | |
|---|---|---|---|---|---|---|---|---|---|
| | | | Production Example 99 | Production Example 100 | Production Example 101 | Production Example 102 | Production Example 103 | Production Example 104 | Production Example 105 |
| | | | Pretreatment Liquid No. | | | | | | |
| | | | I-58 | I-59 | I-60 | I-61 | I-62 | I-63 | I-64 |
| Resin Particles (A1) | (Meth)acrylic resin particles | Used resin particle dispersion (A1)-1 | Ac10 | Ac10 | Ac7 | Ac8 | Ac9 | Ac15 | Ac15 |
| | | SP Value[(cal/cm$^3$)$^{1/2}$] | 9.3 | 9.3 | 9.1 | 9.1 | 9.2 | 9.2 | 9.2 |
| | | Addition amount (dispersion amount) | 12.5 | 3.3 | 12.5 | 12.5 | 12.5 | 12.5 | 12.5 |
| | | Used resin particle dispersion (A1)-2 | | | | Ac12 | Ac11 | Ac10 | Ac16 | Ac17 |
| | | SP Value[(cal/cm$^3$)$^{1/2}$] | | | | 11.1 | 10.1 | 9.3 | 9.3 | 9.3 |
| | | Addition amount (dispersion amount) | | | | 12.5 | 12.5 | 12.5 | 12.5 | 12.5 |
| Resin Particles (A2) | | Used resin particle dispersion (A2) | | | | | | | |
| | | SP Value[(cal/cm$^3$)$^{1/2}$] | | | | | | | |
| | | Addition amount (dispersion amount) | | | | | | | |
| | | HYTEC E-6400 (solid content of 35%) | | | 2.9 | 2.9 | 2.9 | 2.9 | 2.9 |
| | | Arrowbase SB-1200 (solid content of 25%) | 19 | 30 | | | | | |
| Calcium salt of carboxylic acid | Calcium formate | | 3 | 3 | 3 | 3 | 3 | 3 | 3 |
| | Calcium lactate | | 2 | 2 | 2 | 2 | 2 | 2 | 2 |
| Water-soluble organic solvent (B) | IPA | | 5 | 5 | 5 | 5 | 5 | 5 | 5 |
| Surfactant (C) | Acetylene-based | Surfynol 440 | 1 | 1 | 1 | 1 | 1 | 1 | 1 |
| Thickener | Adeka Nol UH540 | | | | | | | | |
| Preservative | Proxel GXL | | 0.05 | 0.05 | 0.05 | 0.05 | 0.05 | 0.05 | 0.05 |
| Ion-exchanged water | | | 57.45 | 55.65 | 61.1 | 61.1 | 61.1 | 61.1 | 61.1 |
| Total | | | 100 | 100 | 100 | 100 | 100 | 100 | 100 |
| Blending amount | Amount of resin particles (A); R [g] | | 7.5 | 8.5 | 8.5 | 8.5 | 8.5 | 8.5 | 8.5 |
| | Amount of calcium ions in millimoles; C [mmol] | | 32.2 | 32.2 | 32.2 | 32.2 | 32.2 | 32.2 | 32.2 |
| | R/C | | 0.23 | 0.26 | 0.26 | 0.26 | 0.26 | 0.26 | 0.26 |
| | C × 2/A | | 1.0 | 1.0 | 1.0 | 1.0 | 1.0 | 1.0 | 1.0 |

TABLE I-3-continued

Production Examples of Pretreatment Liquids

| | | | Production Example No. | | | | | |
|---|---|---|---|---|---|---|---|---|
| | | | Production Example 106 | Production Example 107 | Production Example 108 | Production Example 109 | Production Example 110 | Production Example 111 |
| | | | \multicolumn{6}{c}{Pretreatment Liquid No.} |
| | | | I-65 | I-66 | I-67 | I-68 | I-69 | I-70 |
| Resin Particles (A1) | (Meth)acrylic resin particles | Used resin particle dispersion (A1)-1 | Ac15 | Ac16 | | | | |
| | | SP Value[(cal/cm$^3$)$^{1/2}$] | 9.2 | 9.3 | | | | |
| | | Addition amount (dispersion amount) | 12.5 | 12.5 | | | | |
| | | Used res in particle dispersion (A1)-2 | Ac18 | Ac18 | | | | |
| | | SP Value[(cal/cm$^3$)$^{1/2}$] | 9.4 | 9.4 | | | | |
| | | Addition amount (dispersion amount) | 12.5 | 12.5 | | | | |
| Resin Particles (A2) | | Used resin particle dispersion (A2) | | | Ac27 | Ac28 | Ac29 | |
| | | SP Value[(cal/cm$^3$)$^{1/2}$] | | | 8.9 | 8.9 | 13.7 | |
| | | Addition amount (dispersion amount) | | | 25 | 25 | 25 | |
| | | HYTEC E-6400 (solid content of 35%) | 2.9 | 2.9 | 2.9 | 2.9 | 2.9 | |
| | | Arrowbase SB-1200 (solid content of 25%) | | | | | | 20 |
| Calcium salt of carboxylic acid | Calcium formate | | 3 | 3 | 3 | 3 | 3 | 4 |
| | Calcium lactate | | 2 | 2 | 2 | 2 | 2 | 4 |
| Water-soluble organic solvent (B) | IPA | | 5 | 5 | 5 | 5 | 5 | 5 |
| Surfactant (C) | Acetylene-based | Surfynol 440 | 1 | 1 | 1 | 1 | 1 | 1 |
| Thickener | Adeka Nol UH540 | | | | | | | 4.5 |
| Preservative | Proxel GXL | | 0.05 | 0.05 | 0.05 | 0.05 | 0.05 | 0.05 |
| Ion-exchanged water | | | 61.1 | 61.1 | 61.1 | 61.1 | 61.1 | 61.45 |
| Total | | | 100 | 100 | 100 | 100 | 100 | 100 |
| Blending amount | Amount of resin particles (A); R [g] | | 8.5 | 8.5 | 8.5 | 8.5 | 8.5 | 5.0 |
| | Amount of calcium ions in millimoles; C [mmol] | | 32.2 | 32.2 | 32.2 | 32.2 | 32.2 | 49.1 |
| | R/C | | 0.26 | 0.26 | 0.26 | 0.26 | 0.26 | 0.102 |
| | C × 2/A | | 1.0 | 1.0 | 1.0 | 1.0 | 1.0 | 1.0 |

| | | | Production Example No. | | | | | | |
|---|---|---|---|---|---|---|---|---|---|
| | | | Production Example 112 | Production Example 113 | Production Example 114 | Production Example 115 | Production Example 116 | Production Example 117 | Production Example 118 |
| | | | \multicolumn{7}{c}{Pretreatment Liquid No.} |
| | | | I-71 | I-72 | I-73 | I-74 | I-75 | I-76 | I-77 |
| Resin Particles (A1) | Urethane urea resin particles/urethane-(meth)acrylic resin particles | Used resin particle dispersion (A1)-1 | Ur1 | Ur2 | Ur3 | Ur4 | Ur5 | Ur6 | Ur7 |
| | | SP Value[(cal/cm$^3$)$^{1/2}$] | 11.1 | 11.2 | 11.1 | 11.0 | 11.1 | 11.7 | 12.2 |
| | | Addition amount (dispersion amount) | 25 | 25 | 25 | 25 | 25 | 25 | 25 |
| Resin Particles (A2) | HYTEC E-6400 | | 2.9 | 2.9 | 2.9 | 2.9 | 2.9 | 2.9 | 2.9 |
| Calcium salt of carboxylic acid | Calcium formate | | 3 | 3 | 3 | 3 | 3 | 3 | 3 |
| | Calcium lactate | | 2 | 2 | 2 | 2 | 2 | 2 | 2 |
| Water-soluble organic solvent (B) | IPA | | 5 | 5 | 5 | 5 | 5 | 5 | 5 |
| Surfactant (C) | Acetylene-based | Surfynol 440 | 1 | 1 | 1 | 1 | 1 | 1 | 1 |
| Preservative | Proxel GXL | | 0.05 | 0.05 | 0.05 | 0.05 | 0.05 | 0.05 | 0.05 |
| Ion-exchanged water | | | 61.1 | 61.1 | 61.1 | 61.1 | 61.1 | 61.1 | 61.1 |
| Total | | | 100 | 100 | 100 | 100 | 100 | 100 | 100 |
| Blending amount | Amount of resin particles (A); R [g] | | 8.5 | 8.5 | 8.5 | 8.5 | 8.5 | 8.5 | 8.5 |
| | Amount of calcium ions in millimoles; C [mmol] | | 32.2 | 32.2 | 32.2 | 32.2 | 32.2 | 32.2 | 32.2 |
| | R/C | | 0.26 | 0.26 | 0.26 | 0.26 | 0.26 | 0.26 | 0.26 |
| | C × 2/A | | 1.0 | 1.0 | 1.0 | 1.0 | 1.0 | 1.0 | 1.0 |

| | | | Production Example No. | | | | |
|---|---|---|---|---|---|---|---|
| | | | Production Example 119 | Production Example 120 | Production Example 121 | Production Example 122 | Production Example 123 |
| | | | \multicolumn{5}{c}{Pretreatment Liquid No.} |
| | | | I-78 | I-79 | I-80 | I-81 | I-82 |
| Resin Particles (A1) | Urethane urea resin particles/urethane- | Used resin particle dispersion (A1)-1 | Ur8 | Ur9 | Ur10 | Ur11 | UrAc1 |
| | | SP Value[(cal/cm$^3$)$^{1/2}$] | 12.4 | 11.3 | 11.7 | 11.8 | 11.7 |

TABLE I-3-continued

Production Examples of Pretreatment Liquids

| | | | | | | | | |
|---|---|---|---|---|---|---|---|---|
| | | (meth)acrylic resin particles | Addition amount (dispersion amount) | 25 | 25 | 25 | 25 | 25 |
| Resin Particles (A2) | HYTEC E-6400 | | | 2.9 | 2.9 | 2.9 | 2.9 | 2.9 |
| Calcium salt of carboxylic acid | Calcium formate | | | 3 | 3 | 3 | 3 | 3 |
| | Calcium lactate | | | 2 | 2 | 2 | 2 | 2 |
| Water-soluble organic solvent (B) | IPA | | | 5 | 5 | 5 | 5 | 5 |
| Surfactant (C) | Acetylene-based | Surfynol 440 | | 1 | 1 | 1 | 1 | 1 |
| Preservative | Proxel GXL | | | 0.05 | 0.05 | 0.05 | 0.05 | 0.05 |
| Ion-exchanged water | | | | 61.1 | 61.1 | 61.1 | 61.1 | 61.1 |
| Total | | | | 100 | 100 | 100 | 100 | 100 |
| Blending amount | Amount of resin particles (A); R [g] | | | 8.5 | 8.5 | 8.5 | 8.5 | 8.5 |
| | Amount of calcium ions in millimoles; C [mmol] | | | 32.2 | 32.2 | 32.2 | 32.2 | 32.2 |
| | R/C | | | 0.26 | 0.26 | 0.26 | 0.26 | 0.26 |
| | C × 2/A | | | 1.0 | 1.0 | 1.0 | 1.0 | 1.0 |

| | | | Production Example No. | | | | | |
|---|---|---|---|---|---|---|---|---|
| | | | Production Example 124 | Production Example 125 | Production Example 126 | Production Example 127 | Production Example 128 | Production Example 129 |
| | | | Pretreatment Liquid No. | | | | | |
| | | | I-83 | I-84 | I-85 | I-86 | I-87 | I-88 |
| Resin Particles (A1) | (Meth)acrylic resin particles | Used resin particle dispersion (A1)-1 | Ac11 | Ac11 | Ac11 | Ac16 | Ac16 | Ac16 |
| | | SP Value[(cal/cm$^3$)$^{1/2}$] | 9.3 | 9.3 | 9.3 | 9.2 | 9.2 | 9.2 |
| | | Addition amount (dispersion amount) | 20 | 12.5 | 5 | 6.3 | 6.3 | 6.3 |
| | | Used resin particle dispersion (A1)-2 | | | | Ac20 | Ac20 | Ac20 |
| | | SP Value[(cal/cm$^3$)$^{1/2}$] | | | | 9.4 | 9.4 | 9.4 |
| | | Addition amount (dispersion amount) | | | | 6.3 | 6.3 | 6.3 |
| | Urethane urea resin particles | Used resin particle dispersion (A1)-4 | Ur2 | Ur2 | Ur2 | Ur2 | Ur9 | Ur9 |
| | | SP Value[(cal/cm$^3$)$^{1/2}$] | 11.2 | 11.2 | 11.2 | 11.2 | 11.3 | 11.3 |
| | | Addition amount (dispersion amount) | 5 | 12.5 | 20 | 12.4 | 12.4 | 12.4 |
| Resin Particles (A2) | HYTEC E-6400 | | 2.9 | 2.9 | 2.9 | 2.9 | 2.9 | 2.9 |
| Calcium salt of carboxylic acid | Calcium formate | | 3 | 3 | 3 | 3 | 3 | 3 |
| | Calcium lactate | | 2 | 2 | 2 | 2 | 2 | 2 |
| Water-soluble organic solvent (B) | IPA | | 5 | 5 | 5 | 5 | 5 | 5 |
| Surfactant (C) | Acetylene-based | Surfynol 440 | 1 | 1 | 1 | 1 | 1 | 1 |
| Preservative | Proxel GXL | | 0.05 | 0.05 | 0.05 | 0.05 | 0.05 | 0.05 |
| Ion-exchanged water | | | 61.1 | 61.1 | 61.1 | 61.1 | 61.1 | 61.1 |
| Total | | | 100 | 100 | 100 | 100 | 100 | 100 |
| Blending amount | Amount of resin particles (A); R [g] | | 8.5 | 8.5 | 8.5 | 8.5 | 8.5 | 8.5 |
| | Amount of calcium ions in millimoles; C [mmol] | | 32.2 | 32.2 | 32.2 | 32.2 | 32.2 | 32.2 |
| | R/C | | 0.26 | 0.26 | 0.26 | 0.26 | 0.26 | 0.26 |
| | C × 2/A | | 1.0 | 1.0 | 1.0 | 1.0 | 1.0 | 1.0 |

Details of the product names and abbreviations described in Table 1-3 are as follows.

HYTEC E-6400: non-chlorinated polyolefin resin particles (solid content of 35%) available from Toho Chemical Industry Co., Ltd.

Arrowbase SB-1200: non-chlorinated polyolefin resin particles (solid content 25%) available from Unitika Ltd.

Surfynol 440: acetylenediol-based surfactant available from Nissin Chemical Co., Ltd. IPA: 2-propanol (isopropanol)

Adeka Nol UH1526: hydrophobically modified water-soluble urethane resin available from Adeka Corporation Proxel GXL: dipropylene glycol solution of 1,2-benzisothiazol-3-one available from Arch Chemicals, Inc.

<3> Production Examples of Water-Based Inkjet Ink

Production Example 130: Production Example of Pigment Dispersion Resin 1

A reaction vessel equipped with a gas inlet tube, a thermometer, a condenser, and a stirrer was charged with 95 parts of butanol and purged with nitrogen gas. The inside of the reaction vessel was heated to 110° C., after which a mixture of 45 parts of styrene, 30 parts of acrylic acid, and 25 parts of lauryl methacrylate, as polymerizable monomers, and 6 parts of V-601 (available from Fujifilm Wako Pure Chemical Industries, Ltd.) as a polymerization initiator was added dropwise over 2 hours, and a polymerization reaction was carried out.

After completion of the dropwise addition, the reaction was continued at 110° C. for 3 hours, after which 0.6 parts of V-601 were added, and the reaction was further continued at 110° C. for 1 hour. Subsequently, the inside of the reaction vessel was cooled to room temperature, after which dimethylaminoethanol was added thereto to fully neutralize the acid groups of the product, and then 100 parts of water were added thereto to make the product aqueous. The inside of the reaction vessel was then heated to 100° C. or higher, butanol was distilled off by azeotropic distillation of butanol with water, and the solid content was adjusted to 30%, thereby an aqueous solution of a pigment dispersion resin 1 (solid content: 30%) was obtained. The acid value of the pigment dispersion resin 1 was 233.6 mgKOH/g.

Production Example 131: Production Example of Black Pigment Dispersion Liquid

A mixing vessel equipped with a stirrer was charged with 15 parts of carbon black ("PrinteX85" available from Orion Engineered Carbons LLC), 10 parts of an aqueous solution of the pigment dispersion resin 1 (solid content of 30%), and 75 parts of water, after which the components were premixed for 1 hour. Subsequently, the mixture was circulated and dispersed using a Dyno Mill (available from Shinmaru Enterprises Corporation, volume: 0.6 L) filled with 1800 g of zirconia beads having a diameter of 0.5 mm, and thereby a black pigment dispersion was produced.

Production Examples 132 to 134: Production Examples of Cyan Pigment Dispersion, Magenta Pigment Dispersion, and Yellow Pigment Dispersion A cyan pigment dispersion, a magenta pigment dispersion, and a yellow pigment dispersion were obtained in the same manner as in the case of the black pigment dispersion with the exception that the following pigments were used as the pigments.
Cyan: LIONOL BLUE 7358G available from Toyo Color Co., Ltd. (C.I. Pigment Blue 15:3)
Magenta: FASTOGEN SUPER MAGENTA RG available from DIC Corporation (C.I. Pigment Red 122)
Yellow: LIONOL YELLOW TT1405G available from Toyo Color Co., Ltd. (C.I. Pigment Yellow 14)

Production Example 135: Production Example of Black Ink 1 (K1)

A mixing vessel was sequentially charged with 33.3 parts of the black pigment dispersion, 13.4 parts of an aqueous solution of a binder resin 28 (solid content of 30%) produced by the method described in the examples of JP 2020-180178 A, 20 parts of 1,2-propanediol, 4 parts of propylene glycol monomethyl ether, 1.5 parts of TEGO Wet 280 (polyether-modified siloxane-based surfactant available from Evonik Industries AG), and 1 part of Surfynol 465 (acetylenediol-based surfactant available from Nissin Chemical Co., Ltd.), after which water was added thereto such that the total amount of addition was 100 parts, and the components were thoroughly stirred with a stirrer until the mixture was homogeneous. Subsequently, the mixture was filtered through a membrane filter having a pore diameter of 1 μm to remove coarse particles causing clogging of the head, and thereby a black ink 1 (K1) was prepared.

Production Examples 136 to 138: Production Examples of Cyan Ink 1 (C1), Magenta Ink 1 (M1), and Yellow Ink 1 (Y1)

A cyan ink 1 (C1), a magenta ink 1 (M1), and a yellow ink 1 (Y1) were obtained in the same manner as the black ink 1 with the exception that the cyan pigment dispersion, the magenta pigment dispersion, and the yellow pigment dispersion were respectively used as the pigment dispersion. Four types of water-based inkjet inks, namely K1, C1, M1, and Y1, were used as water-based inkjet ink set 1 in the evaluations described below.

<4> Preparation Example of Film Substrate to which Pretreatment Liquid was Applied Using the non-wire bar coater 250-OSP-02 available from OSG System Products Co., Ltd., the pretreatment liquid prepared above was applied to the following film substrate to have a wet film thickness of 2.0±0.2 μm. Next, the coated film substrate was placed in an air oven at 70° C. and dried for 2 minutes to prepare a film substrate to which the pretreatment liquid was applied.
Film Substrate Used for Evaluation
  OPP: biaxially stretched polypropylene film "OPU-1" (thickness: 20 μm) available from Mitsui Chemicals, Inc.
  PET: polyethylene terephthalate film "FE2001" (thickness: 12 μm) available from Futamura Chemical Co., Ltd.

<5> Printed Matter Preparation Examples

Four "KJ4B-1200" inkjet heads (design resolution of 1200 dpi, nozzle diameter of 20 μm) available from Kyocera Corporation were installed above a conveyor capable of conveying a substrate, and the inkjet heads were filled with the water-based inkjet ink set 1 produced above, in the order of K1, C1, M1, and Y1 from the inkjet head on the upstream side in the conveyance direction of the recording media. Next, the produced film substrate to which the pretreatment liquid was applied was fixed on the conveyor, and then the conveyor was driven at a constant speed. Furthermore, when the film substrate passed through the portion where the inkjet heads were installed, the water-based inkjet ink was discharged from each inkjet head at a drop volume of 2 μL to thereby print an image. Next, the printed matter was immediately placed in an air oven at 70° C. and dried for 3 minutes to thereby prepare a printed matter.

Two types of printed images were prepared including an image in which 5 cm×10 cm solid patches with a coverage rate of 100% were adjacent in the order of CMYK (hereinafter, referred to as a "solid patch image"), and a four color (CMYK) image in which the total coverage rate (the sum of the coverage rates of the respective colors) was continuously changed from 40% to 320% (hereinafter referred to as a "gradation image"; note that the coverage rates of the respective colors with regard to each total coverage rate were the same), and printed matters of each type of printed image were prepared.

Examples I-1 to I-75 and Comparative Examples I-1 to I-13

Each of the pretreatment liquids produced above was combined with the water-based inkjet ink set 1 to prepare a printed matter. The following evaluations were carried out using this printed matter or the film substrate itself to which the pretreatment liquid was applied. The evaluation results are as described in Table I-4.
Evaluation 1: Evaluation of Mix Color Bleeding
Based on the above method, printed matters were prepared at a conveyor driving speed of 75 m/min. Among the obtained printed matters, a gradation image printed matter on an OPP film substrate was used, and the dot shape thereof was observed at a magnification of 200 times using an optical microscope to evaluate the image quality (mixed color bleeding). The evaluation criteria were as follows, and evaluations of ⊚, ◯, and Δ were determined to be usable on a practical level.

Evaluation Criteria

⊚: Coalescence of dots and non-uniformity of dot shape were not observed in a portion where the total coverage rate was 240%.

◯: In the portion where the total coverage rate was 240%, coalescence of dots and unevenness of dot shape were observed, but in a portion where the total coverage rate was 160%, coalescence of dots and unevenness of dot shape were not observed.

Δ: In the portion where the total coverage rate was 160%, coalescence of dots and non-uniformity of dot shape were observed, but in a portion where the total coverage rate was 120%, coalescence of dots and non-uniformity of dot shape were not observed.

x: Coalescence of dots and non-uniformity of dot shape were observed in the portion where the total coverage rate was 120%.

Evaluation 2: Evaluation of Solid Filling

Based on the above-described method, printed matters were prepared at conveyor driving speeds of 25 m/min, 50 m/min, or 75 m/min. Among the obtained printed matters, the non-printed surface of the solid patch image printed matter on the OPP film substrate was affixed on a white backing paper, and then the image quality (solid filling) was evaluated by visually observing the degree of white spots. The evaluation criteria were as follows, and evaluations of ⊚, ◯, and Δ were determined to be usable on a practical level.

Evaluation Criteria

⊚: White spots were not observed in the printed matter printed at 75 m/min.

◯: White spots were observed in the printed matter printed at 75 m/min, but no white spots were observed in the printed matter printed at 50 m/min.

Δ: White spots were observed in the printed matter printed at 50 m/min, but no white spots were observed in the printed matter printed at 25 m/min.

x: White spots were observed in the printed matter printed at 25 m/min.

Evaluation 3: Evaluation of Blocking Resistance

Based on the above method, printed matters were prepared at a conveyor driving speed of 50 m/min. From each of the solid patch image printed matters on the OPP film substrate and the PET film substrate among the obtained printed matters, a black ink 1 printed portion was cut out into a 4 cm×4 cm square. Subsequently, the printed surface of the black ink 1 printed portion that was cut out and a non-printed surface (film back surface) of the same film as that was used for printing were superposed on each other to prepare a test piece, and the test piece was subjected to a blocking test using a constant load permanent strain tester (available from Tester Sangyo Co., Ltd.). The environmental conditions of the blocking test included a load of 10 kg/cm$^2$, a temperature of 40° C., a relative humidity of 80% RH, and a standing time of 24 hours. After 24 hours had passed, the superposed film was instantaneously peeled off while maintaining an angle of 90°, and the printed surface after peeling was visually confirmed to evaluate the blocking resistance. The evaluation criteria were as follows, and evaluations of ⊚, ◯, and Δ were determined to be usable on a practical level.

Evaluation Criteria

⊚: There was absolutely no removal of the printed layer from the non-printed film, and there was no peeling resistance.

◯: There was absolutely no removal of the printed layer from the non-printed film, but there was slight resistance at the time of peeling.

Δ: Removal of the printed layer from the non-printed film was 30% or less of the total surface area of the superposed films.

x: Removal of the printed layer from the non-printed film exceeded 30% of the total surface area of the superposed films.

Evaluation 4: Evaluation of Lamination Strength (Adhesive Force)

Based on the above method, printed matters were prepared at a conveyor driving speed of 50 m/min. The printed surface of the solid patch image printed matters on the OPP film substrate and the PET film substrate, among the obtained printed matters, was coated with a solventless laminating adhesive ("EA-N373A/B" available from Toyo-Morton, Ltd.) using a solventless test coater under conditions including a temperature of 60° C. and a coating speed of 50 m/min (coating amount: 2 g/m$^2$).

Subsequently, a corona-treated surface of a cast polypropylene (CPP) film ("FHK2" (thickness of 25 μm) available from Futamura Chemical Co., Ltd.) was superposed on the surface coated with the laminating adhesive, and then aged for one day in an environment at a temperature of 40° C. and a relative humidity of 80% RH to cure the solventless laminating adhesive, and a laminated product was thereby prepared. Then, a black ink 1 printed portion of the obtained laminated product was cut to a length of 100 mm and a width of 15 mm to obtain a test piece.

This test piece was set in an Instron type tensile tester and then pulled at a peeling rate of 300 mm/min in a 25° C. environment to measure the T-type peeling strength (N). This test was carried out five times, and the average value thereof was calculated as the adhesive force (lamination strength) to thereby evaluate the lamination strength. The evaluation criteria were as follows, and evaluations of ⊚, ◯, and Δ were determined to be usable on a practical level. Note that "OPP/CPP" and "PET/CPP" described in Table 4 represent the film configuration of the laminated product, and each represents a "(film substrate used for printing)/(film bonded with a laminating adhesive)".

Evaluation Criteria

⊚: Lamination strength was 1.5 N or greater.

◯: Lamination strength was 1.0 N or greater and less than 1.5 N.

Δ: Lamination strength was 0.5 N or greater and less than 1.0 N.

x: Lamination strength was less than 0.5 N.

Evaluation 5: Evaluation of Coating Stability

The appearance of the OPP film substrate to which the pretreatment liquid was applied and which was prepared based on the method described above was observed visually and with a loupe to evaluate the coating stability. The evaluation criteria were as follows, and evaluations of ⊚, ◯, and Δ were determined to be usable on a practical level.

Evaluation Criteria

⊚: Coating unevenness was not observed visually or with a loupe.

◯: Slight coating unevenness was observed with a loupe, but was not observed visually.

Δ: Slight coating unevenness was visually observed.

x: Visually apparent coating unevenness was observed.

TABLE I-4

| | Pretreatment Liquid No. | Mixed color bleeding | Solid filling | Blocking resistance OPP | Blocking resistance PET | Lamination strength OPP/CPP | Lamination strength PET/CPP | Coating stability |
|---|---|---|---|---|---|---|---|---|
| Example I-1 | I-1 | ⊚ | ⊚ | ⊚ | ⊚ | ⊚ | ⊚ | ⊚ |
| Example I-2 | I-2 | ⊚ | ⊚ | ⊚ | ⊚ | ⊚ | ⊚ | ⊚ |
| Example I-3 | I-3 | ○ | ○ | ⊚ | ⊚ | ⊚ | ⊚ | ⊚ |
| Example I-4 | I-4 | ⊚ | ⊚ | ⊚ | ⊚ | ○ | ⊚ | ⊚ |
| Example I-5 | I-5 | ⊚ | ⊚ | ⊚ | ⊚ | ⊚ | ⊚ | ⊚ |
| Example I-6 | I-6 | ⊚ | ⊚ | ⊚ | ⊚ | ⊚ | ⊚ | ⊚ |
| Example I-7 | I-7 | △ | ○ | △ | △ | ⊚ | ⊚ | ⊚ |
| Example I-8 | I-8 | ⊚ | △ | ⊚ | ⊚ | ○ | ○ | ⊚ |
| Example I-9 | I-9 | ⊚ | △ | ○ | ○ | △ | △ | ○ |
| Example I-10 | I-10 | ⊚ | ⊚ | ⊚ | ⊚ | ⊚ | ⊚ | ⊚ |
| Example I-11 | I-11 | △ | ○ | △ | △ | ○ | ○ | ○ |
| Example I-12 | I-12 | ⊚ | ⊚ | ○ | ○ | ○ | ○ | △ |
| Example I-13 | I-13 | ⊚ | ⊚ | △ | △ | △ | △ | △ |
| Example I-14 | I-14 | ⊚ | ○ | △ | △ | △ | △ | ⊚ |
| Example I-15 | I-15 | ⊚ | ⊚ | ○ | ○ | ○ | ○ | ⊚ |
| Example I-16 | I-16 | ⊚ | ⊚ | ⊚ | ⊚ | ⊚ | ⊚ | ⊚ |
| Example I-17 | I-17 | ⊚ | ⊚ | ⊚ | ⊚ | ⊚ | ⊚ | ⊚ |
| Example I-18 | I-18 | ⊚ | ○ | △ | △ | △ | △ | ⊚ |
| Example I-19 | I-19 | ⊚ | ⊚ | ⊚ | ⊚ | ⊚ | ⊚ | ⊚ |
| Example I-20 | I-20 | ⊚ | △ | ○ | ○ | ⊚ | ⊚ | ⊚ |
| Comparative Example I-1 | I-21 | X | △ | X | X | ○ | ○ | ⊚ |
| Comparative Example I-2 | I-22 | ⊚ | X | ○ | ○ | X | X | △ |
| Comparative Example I-3 | I-23 | ⊚ | X | △ | △ | X | X | △ |
| Comparative Example I-4 | I-24 | XX | ○ | XX | X | ○ | ⊚ | ⊚ |
| Comparative Example I-5 | I-25 | △ | △ | X | △ | △ | ○ | ⊚ |
| Comparative Example I-6 | I-26 | ○ | XX | △ | ○ | X | △ | ○ |
| Comparative Example I-7 | I-27 | ⊚ | △ | X | X | ○ | ○ | ⊚ |
| Comparative Example I-8 | I-28 | ⊚ | △ | X | X | ○ | ○ | ⊚ |
| Comparative Example I-9 | I-29 | ⊚ | △ | X | X | ○ | ○ | ⊚ |
| Example I-21 | I-30 | ⊚ | ⊚ | △ | △ | △ | △ | ○ |
| Example I-22 | I-31 | ⊚ | ⊚ | ○ | ⊚ | ⊚ | ⊚ | ⊚ |
| Example I-23 | I-32 | ⊚ | ⊚ | ○ | ○ | ⊚ | ⊚ | ⊚ |
| Example I-24 | I-33 | ○ | ⊚ | ○ | ○ | ⊚ | ⊚ | ⊚ |
| Example I-25 | I-34 | ○ | ⊚ | △ | △ | ○ | ○ | ○ |
| Example I-26 | I-35 | ○ | ⊚ | △ | △ | △ | △ | ○ |
| Example I-27 | I-36 | △ | ○ | △ | △ | △ | △ | △ |
| Example I-28 | I-37 | ○ | ○ | ⊚ | ○ | ○ | ○ | ⊚ |
| Example I-29 | I-38 | ○ | ○ | ⊚ | ○ | ○ | ○ | ⊚ |
| Example I-30 | I-39 | ⊚ | ⊚ | ○ | ○ | ⊚ | ⊚ | ⊚ |
| Example I-31 | I-40 | ⊚ | ⊚ | ⊚ | ⊚ | ⊚ | ⊚ | ⊚ |
| Example I-32 | I-41 | ⊚ | ⊚ | ⊚ | ⊚ | ⊚ | ⊚ | ⊚ |
| Example I-33 | I-42 | ⊚ | ⊚ | ⊚ | ⊚ | ⊚ | ⊚ | ⊚ |
| Example I-34 | I-43 | ⊚ | ⊚ | △ | △ | ○ | ○ | ⊚ |
| Example I-35 | I-44 | ⊚ | ⊚ | △ | △ | △ | △ | ⊚ |
| Example I-36 | I-45 | ⊚ | ⊚ | △ | △ | ○ | ○ | ⊚ |
| Example I-37 | I-46 | ⊚ | ⊚ | ○ | ○ | ⊚ | ⊚ | ⊚ |
| Example I-38 | I-47 | ⊚ | ⊚ | ⊚ | ⊚ | ⊚ | ⊚ | ⊚ |
| Example I-39 | I-48 | ⊚ | ⊚ | ○ | ○ | ⊚ | ⊚ | ⊚ |
| Example I-40 | I-49 | ⊚ | ⊚ | ○ | ○ | ○ | ○ | ⊚ |
| Example I-41 | I-50 | ⊚ | ⊚ | ⊚ | ⊚ | ⊚ | ⊚ | ⊚ |
| Example I-42 | I-51 | ⊚ | ⊚ | ⊚ | ⊚ | ⊚ | ⊚ | ⊚ |
| Example I-43 | I-52 | ⊚ | ⊚ | ⊚ | ⊚ | ⊚ | ⊚ | ⊚ |
| Example I-44 | I-53 | ⊚ | ⊚ | ○ | ○ | ⊚ | ⊚ | ⊚ |
| Example I-45 | I-54 | ⊚ | ⊚ | ○ | ○ | ⊚ | ⊚ | ⊚ |
| Example I-46 | I-55 | ⊚ | ⊚ | ○ | ○ | ⊚ | ⊚ | ⊚ |
| Example I-47 | I-56 | ⊚ | ⊚ | ○ | ○ | ⊚ | ⊚ | ⊚ |
| Example I-48 | I-57 | ⊚ | ⊚ | ⊚ | ⊚ | ⊚ | ⊚ | ⊚ |
| Example I-49 | I-58 | ○ | ○ | ⊚ | ○ | ○ | ○ | ⊚ |
| Example I-50 | I-59 | ○ | △ | ⊚ | △ | ○ | △ | ⊚ |
| Example I-51 | I-60 | ⊚ | ⊚ | ⊚ | ⊚ | ⊚ | ⊚ | ⊚ |
| Example I-52 | I-61 | ⊚ | ⊚ | ⊚ | ⊚ | ⊚ | ⊚ | ⊚ |
| Example I-53 | I-62 | ⊚ | ⊚ | ⊚ | ⊚ | ⊚ | ⊚ | ⊚ |
| Example I-54 | I-63 | ⊚ | ⊚ | ○ | ○ | ⊚ | ⊚ | ⊚ |
| Example I-55 | I-64 | ⊚ | ⊚ | ⊚ | ⊚ | ⊚ | ⊚ | ⊚ |
| Example I-56 | I-65 | ⊚ | ⊚ | ⊚ | ⊚ | ⊚ | ⊚ | ⊚ |

TABLE I-4-continued

Evaluation Results (Examples and Comparative Examples)

| | Pretreatment Liquid No. | Mixed color bleeding | Solid filling | Blocking resistance | | Lamination strength | | Coating stability |
|---|---|---|---|---|---|---|---|---|
| | | | | OPP | PET | OPP/CPP | PET/CPP | |
| Example I-57 | I-66 | ◎ | ◎ | ◎ | ◎ | ◎ | ◎ | ◎ |
| Comparative Example I-10 | I-67 | △ | △ | ◎ | ○ | X | X | ◎ |
| Comparative Example I-11 | I-68 | △ | △ | ◎ | ○ | X | X | ◎ |
| Comparative Example I-12 | I-69 | ○ | ◎ | X | X | X | X | ◎ |
| Comparative Example I-13 | I-70 | ○ | △ | ◎ | X | X | X | ◎ |
| Example I-58 | I-71 | ◎ | ◎ | ◎ | ◎ | ◎ | ◎ | ◎ |
| Example I-59 | I-72 | ◎ | ◎ | ◎ | ◎ | ◎ | ◎ | ◎ |
| Example I-60 | I-73 | ◎ | ◎ | ◎ | ◎ | ◎ | ◎ | ◎ |
| Example I-61 | I-74 | ◎ | ◎ | ◎ | ◎ | ◎ | ◎ | ◎ |
| Example I-62 | I-75 | ◎ | ◎ | ◎ | ◎ | ◎ | ◎ | ◎ |
| Example I-63 | I-76 | ◎ | ◎ | ◎ | ◎ | ◎ | ◎ | ◎ |
| Example I-64 | I-77 | ○ | ◎ | ○ | ○ | ◎ | ◎ | ◎ |
| Example I-65 | I-78 | ○ | ○ | △ | △ | ○ | ○ | ○ |
| Example I-66 | I-79 | ◎ | ◎ | ◎ | ◎ | ◎ | ◎ | ◎ |
| Example I-67 | I-80 | ◎ | ◎ | ◎ | ◎ | ◎ | ◎ | ◎ |
| Example I-68 | I-81 | ◎ | ◎ | ◎ | ◎ | ◎ | ◎ | ◎ |
| Example I-69 | I-82 | ◎ | ◎ | ◎ | ◎ | ◎ | ◎ | ◎ |
| Example I-70 | I-83 | ◎ | ◎ | ◎ | ◎ | ◎ | ◎ | ◎ |
| Example I-71 | I-84 | ◎ | ◎ | ◎ | ◎ | ◎ | ◎ | ◎ |
| Example I-72 | I-85 | ◎ | ◎ | ◎ | ◎ | ◎ | ◎ | ◎ |
| Example I-73 | I-86 | ◎ | ◎ | ◎ | ◎ | ◎ | ◎ | ◎ |
| Example I-74 | I-87 | ◎ | ◎ | ◎ | ◎ | ◎ | ◎ | ◎ |
| Example I-75 | I-88 | ◎ | ◎ | ◎ | ◎ | ◎ | ◎ | ◎ |

Examples I-1 to I-71 contained resin particles (A1) having an SP value in a specific range, calcium ions, and plural types of carboxylate ions including one or more types of hydroxycarboxylate ions, and were configured such that the ratio of the amount of the resin particles (A) to the amount of calcium ions in millimoles was within a specific range, and good results were obtained in all the evaluations.

On the other hand, in Comparative Example I-1, the amount of calcium ions relative to the resin particles (A) was insufficient, and mixed color bleeding occurred. Furthermore, deterioration of blocking resistance attributed to insufficient crosslinking of the solid content in the water-based inkjet ink was also confirmed. On the other hand, in Comparative Examples I-2 and I-3, the amount of calcium ions relative to the amount of the resin particles (A) was excessive, and a deterioration in solid filling occurred. Furthermore, a decrease in lamination strength attributed to insufficient viscosity of the printed layer was also observed.

In addition, in Comparative Examples I-4 to I-6, which contained only one type of carboxylate ion in the pretreatment liquid, trade-offs between mixed color bleeding and solid filling, and between blocking resistance and lamination strength were observed. Furthermore, in Comparative Examples I-7 to I-9, which did not contain hydroxycarboxylate ions, the dot shape of the ink was non-uniformly spread, and the solid filling property was also poor. Poor results were also observed with regard to the blocking resistance.

Comparative Examples I-10 and I-11 did not contain the resin particles (A1), and instead contained resin particles having a low SP value. In these comparative examples, deterioration of solid filling due to insufficient spreading of the water-based inkjet ink was confirmed. In addition, mixed color bleeding, which is considered to be caused by a decrease in the release rate of calcium ions, also occurred. Meanwhile, Comparative Example I-12 contained resin particles having a high SP value and was therefore thought to have a high hygroscopic property. Further, a deterioration in blocking resistance and a deterioration in lamination strength due to curing failure of the laminating adhesive were observed.

Comparative Example I-13 reproduced the pretreatment liquid disclosed in Example 75 of Patent Document 3 described above. From the evaluation results, it was found that the blocking property with respect to the PET substrate and the lamination suitability were inferior. In addition, although Comparative Example I-13 resulted in a product of a practical level for use, the solid filling was found to be A and did not reach a good level (◎ or ○ evaluation level). In the pretreatment liquid I-70 used in Comparative Example I-13, similar to Comparative Examples I-2 and I-3, the amount of calcium ions relative to the amount of the resin particles (A) was excessive, and therefore it is thought that the deterioration in quality could not be suppressed even when the hydrophobically modified water-soluble urethane resin was used.

Example II

The following description relates to examples and comparative examples corresponding to the embodiments of the pretreatment liquid (II) described above.

<1> Production Examples of Pretreatment Liquid

Production Example of Pretreatment Liquid II-1

A mixing vessel equipped with a stirrer was charged with the following materials, and the materials were mixed at room temperature (25° C.) for 1 hour, then heated to 50° C., and further mixed for 1 hour. Subsequently, the mixture was cooled to room temperature and then filtered through a nylon mesh having a pore size of 100 μm, and thereby a pretreatment liquid II-1 was prepared. Details of the following materials will be described later.

| | |
|---|---|
| NeoCryl XK-190 | 16.7 parts |
| HYTEC E-6400 | 3.3 parts |
| Calcium formate | 3.0 parts |
| Calcium lactate | 2.0 parts |
| 2-propanol | 5.0 parts |
| Surfynol 440 | 1.0 parts |
| Proxel GXL | 0.05 parts |
| Ion-exchanged water | 68.95 parts |

Production Examples of Pretreatment Liquids II-2 to II-67

Pretreatment liquids II-2 to II-67 were produced in the same manner as the pretreatment liquid II-1 with the exception that the materials shown in Table II-1 were used.

TABLE II-1

| Pretreatment Liquid No. | | | | II-1 | II-2 | II-3 | II-4 | II-5 | II-6 | II-7 | II-8 | II-9 | II-10 | II-11 | II-12 | II-13 |
|---|---|---|---|---|---|---|---|---|---|---|---|---|---|---|---|---|
| Pretreatment Liquid | Resin Particles (A) | (Meth)acrylic-type | NeoCryl A-1127 | Nv = 44% | 16.7 | 16.7 | 16.7 | 16.7 | 16.7 | 16.7 | 13.3 | 11.2 | 16.7 | 16.7 | 16.7 | 16.7 | 16.7 |
| | | | NeoCryl XK-188 | Nv = 44.5% | | | | | | | | | | | | | |
| | | | NeoCryl XK-190 | Nv = 45% | | | | | | | | | | | | | |
| | | Urethane (Urea)-type | NeoRez R-600 | Nv = 33% | | | | | | | | | | | | | |
| | | | NeoRez R-9621 | Nv = 38% | | | | | | | | | | | | | |
| | | | Superflex 300 | Nv = 30% | | | | | | | | | | | | | |
| | | | Superflex 460 | Nv = 38% | | | | | | | | | | | | | |
| | | Urethane (meth)acrylic-type | WEM-3000 | Nv = 32.5% | | | | | | | | | | | | | |
| | | Polyester-type | Plas Coat Z-880 | Nv = 25% | 2.9 | 2.9 | 2.9 | 2.9 | 2.9 | 2.9 | 2.9 | 2.9 | 2.9 | 2.9 | 2.9 | 2.9 | 2.9 |
| | | | Plas Coat Z-3310 | Nv = 25% | | | | | | | | | | | | | |
| | | Polyolefin-type | HYTEC E-6400 | Nv = 35% | | | | | | | | | | | | | |
| | | | Arrowbase SB-1230N | Nv = 25% | | | | | | | | | | | | | |
| | Calcium salt of carboxylic acid | Calcium salt of non-hydroxycarboxylic acid | Calcium formate | Solubility = 17 | 3 | 3 | 3 | 2.0 | 5.4 | 2 | 3 | 1.1 | | | 3 | 2 | 3 |
| | | | Calcium acetate | Solubility = 28 | | | | | | | | | 3 | | | 2 | |
| | | | Calcium propionate | Solubility = 10 | | | | | | | | | | 3 | | | |
| | | Calcium salt of hydroxycarboxylic acid | Calcium gluconate | Solubility = 3 | | | | | | | | | | | 2 | | |
| | | | Calcium lactate | Solubility = 3 | 2 | 3 | 4 | 1.3 | 3.6 | 3 | 4 | 0.8 | 2 | 2 | | 2 | |
| | | | Calcium pantothenate | Solubility = 35 | | | | | | | | | | | | | 2 |
| | Calcium salt of non-carboxylic acid | | Calcium hydrogencarbonate | Solubility = 17 | | | | | | | | | | | | | |
| | | | Calcium iodide | Solubility = 67 | | | | | | | | | | | | | |
| | Non-calcium salt of carboxylic acid | | Magnesium lactate | Solubility = 4 | | | | | | | | | | | | | |
| | Organic solvent | Water-soluble organic solvent having one hydroxy group | IPA | Boiling Point = 83° C. | 5 | 5 | 5 | 5 | 5 | 5 | 5 | 5 | 5 | 5 | 5 | 5 | 5 |
| | | | EtOH | Boiling Point = 78° C. | | | | | | | | | | | | | |
| | | | PGM | Boiling Point = 121° C. | | | | | | | | | | | | | |
| | | | MB | Boiling Point = 150° C. | | | | | | | | | | | | | |
| | | Water-soluble organic solvent having two hydroxy groups | 1,2PD | Boiling Point = 188° C. | | | | | | | | | | | | | |
| | | | 1,3BD | Boiling Point = 208° C. | | | | | | | | | | | | | |
| | Surfactant | Acetylene-based | SF104 | | 1 | 1 | 1 | 1 | 1 | 1 | 1 | 1 | 1 | 1 | 1 | 1 | 1 |
| | | | SF440 | | | | | | | | | | | | | | |
| | | | SF485 | | | | | | | | | | | | | | |
| | | Siloxane-based | BYK349 | | | | | | | | | | | | | | |
| | Preservative | | Proxel GXL | | 0.05 | 0.05 | 0.05 | 0.05 | 0.05 | 0.05 | 0.05 | 0.05 | 0.05 | 0.05 | 0.05 | 0.05 | 0.05 |
| | Ion-exchanged water | | | | 69.35 | 68.35 | 67.35 | 71.11 | 65.35 | 69.35 | 70.75 | 77.95 | 69.35 | 69.35 | 69.35 | 68.35 | 69.35 |
| Specifications | Resin particle (A) content in 100 g of pretreatment liquid; [R(g)] | | | | 8.5 | 8.5 | 8.5 | 8.5 | 8.5 | 8.5 | 7.0 | 6.1 | 8.5 | 8.5 | 8.5 | 8.5 | 8.5 |
| | Amount of calcium ions in millimoles in 100 g of pretreatment liquid; [C(mmol)] | | | | 32.2 | 36.8 | 41.4 | 20.9 | 58.0 | 29.1 | 41.4 | 12.1 | 28.1 | 25.3 | 27.7 | 37.2 | 27.3 |
| | R/C | | | | 0.26 | 0.23 | 0.21 | 0.41 | 0.15 | 0.29 | 0.17 | 0.50 | 0.30 | 0.34 | 0.31 | 0.23 | 0.31 |
| | Amount of hydroxycarboxylate-derived OH groups in millimoles in 100 g of pretreatment liquid; [$H_{B1}$(mmol)] | | | | 18.3 | 27.5 | 36.7 | 11.8 | 33.0 | 27.5 | 36.7 | 7.3 | 18.3 | 18.3 | 46.5 | 18.3 | 16.8 |
| | Molar content of hydroxycarboxylate ions (mmol) | | | | 18.33 | 27.50 | 36.66 | 11.82 | 32.99 | 27.50 | 36.66 | 7.33 | 18.33 | 18.33 | 9.29 | 18.33 | 8.39 |
| | Molar content of water-soluble organic solvent having one OH group in molecular structure (mmol) | | | | 83.19 | 83.19 | 83.19 | 83.19 | 83.19 | 83.19 | 83.19 | 83.19 | 83.19 | 83.19 | 83.19 | 83.19 | 83.19 |
| | (Molar content of hydroxycarboxylate ions)/(molar content of water-soluble organic solvent having one OH group in molecular structure) | | | | 0.22 | 0.33 | 0.44 | 0.14 | 0.40 | 0.33 | 0.44 | 0.09 | 0.22 | 0.22 | 0.11 | 0.22 | 0.10 |

TABLE II-1-continued

| Pretreatment Liquid No. | | | | II-14 | II-15 | II-16 | II-17 | II-18 | II-19 | II-20 | II-21 | II-22 | II-23 | II-24 | II-25 |
|---|---|---|---|---|---|---|---|---|---|---|---|---|---|---|---|
| Pretreatment Liquid | Resin Particles (A) | (Meth)acrylic-type | NeoCryl A-1127 Nv = 44% | | | | | | 17.0 | | | | | | |
| | | | NeoCryl XK-188 Nv = 44.5% | | | | | | | 16.9 | | | | | |
| | | | NeoCryl XK-190 Nv = 45% | | | | | 26.7 | | | | | | | |
| | | Urethane (Urea)-type | NeoRez R-600 Nv = 33% | 11.2 | 22.2 | 16.7 | 24.4 | | | | 22.7 | 19.7 | | | |
| | | | NeoRez R-9621 Nv = 38% | | | | | | | | | | 25.0 | | |
| | | | Superflex 300 Nv = 30% | | | | | | | | | | | 20.0 | |
| | | | Superflex 460 Nv = 38% | | | | | | | | | | | | 23.1 |
| | | Urethane (meth)acrylic-type | WEM-3000 Nv = 32.5% | | | | | | | | | | | | |
| | | Polyester-type | Plas Coat Z-880 Nv = 25% | | | | | | | | | | | | |
| | | | Plas Coat Z-3310 Nv = 25% | | | | | | | | | | | | |
| | | Polyolefin-type | HYTEC E-6400 Nv = 35% | 2.9 | 2.9 | 2.9 | 2.9 | 2.9 | 2.9 | 2.9 | 2.9 | 2.9 | 2.9 | 2.9 | 2.9 |
| | Calcium salt of carboxylic acid | Calcium salt of non-hydroxycarboxylic acid | Arrowbase SB-1230N Nv = 25% | 3 | 3 | 3 | 3 | 3 | 3 | 3 | 3 | 3 | 3 | 3 | 3 |
| | | | Calcium formate Solubility = 17 | | | | | | | | | | | | |
| | | | Calcium acetate Solubility = 28 | | | | | | | | | | | | |
| | | | Calcium propionate Solubility = 10 | | | | | | | | | | | | |
| | | Calcium salt of hydroxycarboxylic acid | Calcium gluconate Solubility = 3 | 2 | 2 | 2 | 2 | 2 | 2 | 2 | 2 | 2 | 2 | 2 | 2 |
| | | | Calcium lactate Solubility = 3 | | | | | | | | | | | | |
| | | | Calcium pantothenate Solubility = 35 | | | | | | | | | | | | |
| | Calcium salt of non-carboxylic acid | | Calcium hydrogencarbonate Solubility = 17 | | | | | | | | | | | | |
| | | | Calcium iodide Solubility = 67 | | | | | | | | | | | | |
| | Non-calcium salt of carboxylic acid | | Magnesium lactate Solubility = 4 | | | | | | | | | | | | |
| | Organic solvent | Water-soluble organic solvent having one hydroxy group | IPA Boiling Point = 83° C. | 5 | 5 | 5 | 5 | 5 | 5 | 5 | 5 | 5 | 5 | 5 | 5 |
| | | | EtOH Boiling Point = 78° C. | | | | | | | | | | | | |
| | | | PGM Boiling Point = 121° C. | | | | | | | | | | | | |
| | | | MB Boiling Point = 150° C. | | | | | | | | | | | | |
| | | Water-soluble organic solvent having two hydroxy groups | 1,2PD Boiling Point = 188° C. | | | | | | | | | | | | |
| | | | 1,3BD Boiling Point = 208° C. | | | | | | | | | | | | |
| | Surfactant | Acetylene-based | SF104 | 1 | 1 | 1 | 1 | 1 | 1 | 1 | 1 | 1 | 1 | 1 | 1 |
| | | | SF440 | | | | | | | | | | | | |
| | | | SF485 | | | | | | | | | | | | |
| | | Siloxane-based | BYK349 | | | | | | | | | | | | |
| | Preservative | | Proxel GXL | 0.05 | 0.05 | 0.05 | 0.05 | 0.05 | 0.05 | 0.05 | 0.05 | 0.05 | 0.05 | 0.05 | 0.05 |
| | | | Ion-exchanged water | 74.85 | 63.85 | 69.35 | 61.65 | 59.35 | 69.05 | 69.15 | 63.35 | 66.35 | 61.05 | 66.05 | 62.95 |
| Specifications | | | Resin particle (A) content in 100 g of pretreatment liquid; [R(g)] | 6.1 | 11.0 | 8.5 | 12.0 | 13.0 | 8.5 | 8.5 | 8.5 | 8.5 | 8.5 | 8.6 | 8.5 |
| | | | Amount of calcium ions in millimoles in 100 g of pretreatment liquid; [C(mmol)] | 32.2 | 32.2 | 32.2 | 32.2 | 32.2 | 32.2 | 32.2 | 32.2 | 32.2 | 32.2 | 32.2 | 32.2 |
| | | | R/C | 0.19 | 0.34 | 0.26 | 0.37 | 0.40 | 0.26 | 0.26 | 0.26 | 0.26 | 0.26 | 0.27 | 0.26 |
| | | | Amount of hydroxycarboxylate-derived OH groups in millimoles in 100 g of pretreatment liquid; [H$_{B1}$(mmol)] | 18.3 | 18.3 | 18.3 | 18.3 | 18.3 | 18.3 | 18.3 | 18.3 | 18.3 | 18.3 | 18.3 | 18.3 |
| | | | Molar content of hydroxycarboxylate ions (mmol) | 18.33 | 18.33 | 18.33 | 18.33 | 18.33 | 18.33 | 18.33 | 18.33 | 18.33 | 18.33 | 18.33 | 18.33 |
| | | | Molar content of water-soluble organic solvent having one OH group in molecular structure (mmol) | 83.19 | 83.19 | 83.19 | 83.19 | 83.19 | 83.19 | 83.19 | 83.19 | 83.19 | 83.19 | 83.19 | 83.19 |
| | | | (Molar content of hydroxycarboxylate ions)/(molar content of water-soluble organic solvent having one OH group in molecular structure) | 0.22 | 0.22 | 0.22 | 0.22 | 0.22 | 0.22 | 0.22 | 0.22 | 0.22 | 0.22 | 0.22 | 0.22 |

| Pretreatment Liquid No. | | | | II-26 | II-27 | II-28 | II-29 | II-30 | II-31 | II-32 | II-33 | II-34 | II-35 | II-36 | II-37 |
|---|---|---|---|---|---|---|---|---|---|---|---|---|---|---|---|
| Pretreatment Liquid | Resin Particles (A) | (Meth)acrylic-type | NeoCryl A-1127 Nv = 44% | | | | 8.3 | 8.3 | 16.7 | 16.7 | 16.7 | 16.7 | 16.7 | 16.7 | 16.7 |
| | | | NeoCryl XK-188 Nv = 44.5% | | | | | | | | | | | | |
| | | | NeoCryl XK-190 Nv = 45% | | | | | | | | | | | | |

TABLE II-1-continued

| | | | | II-38 | II-39 | II-40 | II-41 | II-42 | II-43 | II-44 | II-45 | II-46 | II-47 | II-48 | II-49 |
|---|---|---|---|---|---|---|---|---|---|---|---|---|---|---|---|
| | Urethane (Urea)-type | NeoRez R-600 | Nv = 33% | | | | | | | | | | | | |
| | | NeoRez R-9621 | Nv = 38% | | | | | | | | | | | | |
| | | Superflex 300 | Nv = 30% | | | | | | | | | | | | |
| | | Superflex 460 | Nv = 38% | | | | | | | | | | | | |
| | | WEM-3000 | Nv = 32.5% | | | | | | | | | | | | |
| | Urethane (meth)acrylic-type | | | | | | | | | | | | | | |
| | Polyester-type | Plas Coat Z-880 | Nv = 25% | | 30.0 | 30.0 | | | | | | | | | |
| | | Plas Coat Z-3310 | Nv = 25% | | | | | | | | | | | | |
| | Polyolefin-type | HYTEC E-6400 | Nv = 35% | | | | | 15.0 | | | | | | | |
| | | Arrowbase SB-1230N | Nv = 25% | | 2.9 | 2.9 | 2.9 | 2.9 | 2.9 | 2.9 | 2.9 | 2.9 | 2.9 | 2.9 | 2.9 |
| Calcium salt of carboxylic acid | Calcium formate | | Solubility = 17 | | 3 | 3 | 30.0 3 | 3 | 3 | 3 | 3 | 3 | 3 | 3 | 3 |
| | Calcium acetate | | Solubility = 28 | | | | | | | | | | | | |
| | Calcium propionate | | Solubility = 10 | | | | | | | | | | | | |
| | Calcium gluconate | | Solubility = 3 | | 2 | 2 | 2 | 2 | 2 | 2 | 2. | 2 | 2 | 2 | 2 |
| | Calcium lactate | | Solubility = 3 | | | | | | | | | | | | |
| | Calcium pantothenate | | Solubility = 35 | | | | | | | | | | | | |
| Calcium salt of non-carboxylic acid | Calcium hydrogencarbonate | | Solubility = 17 | | | | | | | | | | | | |
| Non-calcium salt of carboxylic acid | Calcium iodide | | Solubility = 67 | | | | | | | | | | | | |
| | Magnesium lactate | | Solubility = 4 | | | | | | | | | | | | |
| Organic solvent | Water-soluble organic solvent having one hydroxy group | IPA | Boiling Point = 83° C. | | 5 | 5 | 5 | 5 | 5 | 5 | | | | | |
| | | EtOH | Boiling Point = 78° C. | | | | | | | | 5 | | | | |
| | | PGM | Boiling Point = 121° C. | | | | | | | | | | | | |
| | | MB | Boiling Point = 150° C. | | | | | | | | | 5 | 5 | | |
| | Water-soluble organic solvent having two hydroxy groups | 1,2PD | Boiling Point = 188° C. | | | | | | | | | | | 3 | |
| | | 1,3BD | Boiling Point = 208° C. | | | | | | | | | | | 2 | 5 |
| Surfactant | Acetylene-based | SF104 | | | 1 | 1 | 1 | 1 | 1 | 1 | 1 | 1 | 1 | 1 | 1 |
| | | SF440 | | | | | | | | | | | 5 | | |
| | | SF485 | | | | | | | | | | | | | |
| | Siloxane-based | BYK349 | | | | | | | | | | | | | |
| Preservative | | Proxel GXL | | | 0.05 | 0.05 | 0.05 | 0.05 | 0.05 | 0.05 | 0.05 | 0.05 | 0.05 | 0.05 | 0.05 |
| | Ion-exchanged water | | | | 56.05 | 56.05 | 56.05 | 67.85 | 62.75 | 69.35 | 69.35 | 69.35 | 69.35 | 69.35 | 64.35 |
| Specifications | Resin particle (A) content in 100 g of pretreatment liquid; [R(g)] | | | | 8.5 | 8.5 | 8.5 | 8.5 | 8.5 | 8.5 | 8.5 | 8.5 | 8.5 | 8.5 | 8.5 |
| | Amount of calcium ions in millimoles in 100 g of pretreatment liquid; [C(mmol)] | | | | 32.2 | 32.2 | 32.2 | 32.2 | 32.2 | 32.2 | 32.2 | 32.2 | 32.2 | 32.2 | 32.2 |
| | R/C | | | | 0.26 | 0.26 | 0.26 | 0.26 | 0.26 | 0.26 | 0.26 | 0.26 | 0.26 | 0.26 | 0.26 |
| | Amount of hydroxycarboxylate-derived OH groups in millimoles in 100 g of pretreatment liquid; [$H_{B1}$(mmol)] | | | | 18.3 | 18.3 | 18.3 | 18.3 | 18.3 | 18.3 | 18.3 | 18.3 | 18.3 | 18.3 | 18.3 |
| | Molar content of hydroxycarboxylate ions (mmol) | | | | 18.33 | 18.33 | 18.33 | 18.33 | 18.33 | 18.33 | 18.33 | 18.33 | 18.33 | 18.33 | 18.33 |
| | Molar content of water-soluble organic solvent having one OH group in molecular structure (mmol) | | | | 83.19 | 83.19 | 83.19 | 83.19 | 108.53 | 55.48 | 55.48 | 48.01 | 0 | 0 | 93.33 | 55.48 |
| | (Molar content of hydroxycarboxylate ions)/(molar content of water-soluble organic solvent having one OH group in molecular structure) | | | | 0.22 | 0.22 | 0.22 | 0.22 | 0.17 | 0.33 | 0.33 | 0.38 | — | — | 0.20 | 0.33 |
| | Pretreatment Liquid No. | | | II-38 | II-39 | II-40 | II-41 | II-42 | II-43 | II-44 | II-45 | II-46 | II-47 | II-48 | II-49 |
| Pretreatment Liquid | Resin Particles (A) | (Meth)acrylic-type | NeoCryl A-1127 | Nv = 44% | 16.7 | 16.7 | | | | | | | | | | |
| | | | NeoCryl XK-188 | Nv = 44.5% | | | | | | | | | | | | |
| | | | NeoCryl XK-190 | Nv = 45% | | | | | | | | | | | | |
| | | Urethane (Urea)-type | NeoRez R-600 | Nv = 33% | | | 16.7 | 16.7 | 16.7 | 16.7 | 16.7 | 16.7 | 16.7 | 16.7 | 16.7 | 16.7 |
| | | | NeoRez R-9621 | Nv = 38% | | | | | | | | | | | | |
| | | | Superflex 300 | Nv = 30% | | | | | | | | | | | | |
| | | | Superflex 460 | Nv = 38% | | | | | | | | | | | | |
| | | Urethane (meth)acrylic-type | WEM-3000 | Nv = 32.5% | | | | | | | | | | | | |

TABLE II-1-continued

| | | | | | | | | | | | | |
|---|---|---|---|---|---|---|---|---|---|---|---|---|
| Polyester-type | Plas Coat Z-880 | Nv = 25% | | | | | | | | | | |
| | Plas Coat Z-3310 | Nv = 25% | 2.9 | 2.9 | 2.9 | 2.9 | 2.9 | 2.9 | 2.9 | 2.9 | 2.9 | 2.9 |
| Polyolefin-type | HYTEC E-6400 | Nv = 35% | | | | | | | | | | |
| | Arrowbase SB-1230N | Nv = 25% | | | | | | | | | | |
| Calcium salt of | Calcium formate | Solubility = 17 | 3 | 3 | 3 | 3 | 3 | 3 | 2 | 3 | 3 | 3 |
| non-hydroxycarboxylic acid | Calcium acetate | Solubility = 28 | | | | | | | | | | |
| | Calcium propionate | Solubility = 10 | | | | | | | | | | |
| Calcium salt of | Calcium gluconate | Solubility = 3 | 2 | 2 | 2 | 2 | 2 | 2 | 3 | 2 | 2 | 2 |
| hydroxycarboxylic acid | Calcium lactate | Solubility = 3 | | | | | | | | | | |
| | Calcium pantothenate | Solubility = 35 | | | | | | | | | | |
| Calcium salt of non-carboxylic acid | Calcium hydrogencarbonate | Solubility = 17 | | | | | | | | | | |
| Non-calcium salt of carboxylic acid | Calcium iodide | Solubility = 67 | | | | | | | | | | |
| | Magnesium lactate | Solubility = 4 | | | | | | | | | | |
| Organic solvent | | | | | | | | | | | | |
| Water-soluble organic solvent having one hydroxy group | IPA | Boiling Point = 83° C. | 2 | 3 | 11 | 13.5 | 16 | 10 | 10 | 5 | 5 | 5 |
| | EtOH | Boiling Point = 78° C. | | | | | | | 8 | | | |
| | PGM | Boiling Point = 121° C. | | | | | | | | | | |
| | MB | Boiling Point = 150° C. | | | | | | | 12 | | | |
| Water-soluble organic solvent having two hydroxy groups | 1,2PD | Boiling Point = 188° C. | | | | | 5 | | | | | |
| | 1,3BD | Boiling Point = 208° C. | | | | | | | | | | |
| Surfactant | SF104 | | 1 | 1 | 1 | 1 | 1 | 1 | 1 | 1 | 1 | 1 |
| | SF440 | | | | | | | | | | 1 | 1 |
| | SF485 | | | | | | | | | 1 | | |
| Acetylene-based | | | | | | | | | | | | |
| Siloxane-based | BYK349 | | | | | | | | | | | |
| Preservative | Proxel GXL | | 0.05 | 0.05 | 0.05 | 0.05 | 0.05 | 0.05 | 0.05 | 0.05 | 0.05 | 0.05 |
| | Ion-exchanged water | | 72.35 | 71.35 | 63.35 | 60.85 | 58.35 | 59.35 | 44.35 | 69.35 | 69.35 | 68.35 | 68.35 | 67.35 |
| Specifications | Resin particle (A) content in 100 g of pretreatment liquid; [R(g)] | | 8.5 | 8.5 | 8.5 | 8.5 | 8.5 | 8.5 | 8.5 | 8.5 | 8.5 | 8.5 |
| | Amount of calcium ions in millimoles in 100 g of pretreatment liquid; [C(mmol)] | | 32.2 | 32.2 | 32.2 | 32.2 | 32.2 | 32.2 | 29.1 | 32.2 | 32.2 | 32.2 |
| | R/C | | 0.26 | 0.26 | 0.26 | 0.26 | 0.26 | 0.26 | 0.29 | 0.26 | 0.26 | 0.26 |
| | Amount of hydroxycarboxylate-derived OH groups in millimoles in 100 g of pretreatment liquid; [H$_{B1}$(mmol)] | | 18.3 | 18.3 | 18.3 | 18.3 | 18.3 | 18.3 | 27.5 | 18.3 | 18.3 | 18.3 |
| | Molar content of hydroxycarboxylate ions (mmol) | | 18.33 | 18.33 | 18.33 | 18.33 | 18.33 | 18.33 | 27.50 | 18.33 | 18.33 | 18.33 |
| | Molar content of water-soluble organic solvent having one OH group in molecular structure (mmol) | | 33.28 | 49.92 | 183.03 | 224.63 | 266.22 | 166.39 | 255.15 | 83.19 | 83.19 | 83.19 |
| | (Molar content of hydroxycarboxylate ions)/(molar content of water-soluble organic solvent having one OH group in molecular structure) | | 0.55 | 0.37 | 0.10 | 0.08 | 0.07 | 0.11 | 0.11 | 0.22 | 0.22 | 0.22 |

| | | | II-50 | II-51 | II-52 | II-53 | II-54 | II-55 | II-56 | II-57 | II-58 | II-59 |
|---|---|---|---|---|---|---|---|---|---|---|---|---|
| Pretreatment Liquid No. | | | | | | | | | | | | |
| Pretreatment Liquid | Resin Particles (A) | (Meth)acrylic-type | NeoCryl A-1127 | Nv = 44% | | | | | | | | |
| | | | NeoCryl XK-188 | Nv = 44.5% | 16.7 | | 16.7 | 16.7 | 16.7 | 16.7 | 16.7 | 16.7 | 16.7 | 16.7 |
| | | | NeoCryl XK-190 | Nv = 45% | | | | | | | | | |
| | | Urethane (Urea)-type | NeoRez R-600 | Nv = 33% | | 16.7 | | | | | | | | |
| | | | NeoRez R-9621 | Nv = 38% | | | | | | | | | |
| | | | Superflex 300 | Nv = 30% | | | | | | | | | |
| | | | Superflex 460 | Nv = 38% | | | | | | | | | |
| | | Urethane (meth)acrylic-type | WEM-3000 | Nv = 32.5% | | | | | | | | | |
| | | Polyester-type | Plas Coat Z-880 | Nv = 25% | | | | | | | | | |
| | | | Plas Coat Z-3310 | Nv = 25% | 2.9 | 2.9 | 2.9 | 2.9 | 2.9 | 2.9 | 2.9 | 2.9 | 2.9 | 2.9 |
| | | Polyolefin-type | HYTEC E-6400 | Nv = 35% | | | | | | | | | |
| | | | Arrowbase SB-1230N | Nv = 25% | | | | | | | | | |
| | Calcium salt of | Calcium formate | Solubility = 17 | 3 | 3 | 1.5 | 7 | 3 | 5 | | | 3 |

TABLE II-1-continued

| | | | II-60 | II-61 | II-62 | II-63 | II-64 | II-65 | II-66 | II-67 |
|---|---|---|---|---|---|---|---|---|---|---|
| carboxylic acid | non-hydroxycarboxylic acid | Calcium acetate Solubility = 28 | 2 | 1 | | | | | | |
| | | Calcium propionate Solubility = 10 | | | 7 | | | | | |
| | Calcium salt of hydroxycarboxylic acid | Calcium gluconate Solubility = 3 | | | | 2 | | | | |
| | | Calcium lactate Solubility = 3 | | | | | | 3 | | |
| | | Calcium pantothenate Solubility = 35 | 2 | | | | | | | |
| | Calcium salt of non-carboxylic acid | Calcium hydrogencarbonate Solubility = 17 | | | | | | | | |
| | | Calcium iodide Solubility = 67 | | | | | | | 3 | 3 |
| | Non-calcium salt of carboxylic acid | Magnesium lactate Solubility = 4 | | | | | | | | 2 |
| Organic solvent | Water-soluble organic solvent having one hydroxy group | IPA Boiling Point = 83° C. | 5 | 5 | 5 | 5 | 5 | 5 | 5 | 5 |
| | | EtOH Boiling Point = 78° C. | | | | | | | | |
| | | PGM Boiling Point = 121° C. | | | | | | | | |
| | | MB Boiling Point = 150° C. | | | | | | 3 | | |
| | Water-soluble organic solvent having two hydroxy groups | 1,2PD Boiling Point = 188° C. | | | | | | | | |
| | | 1,3BD Boiling Point = 208° C. | | | | | | | | |
| Surfactant | Acetylene-based | SF104 | 1 | 1 | 1 | 1 | 1 | 1 | 1 | 1 |
| | | SF440 | | | | | | | | |
| | | SF485 | | | | | | | | |
| | Siloxane-based | BYK349 | | | | | | | | |
| Preservative | | Proxel GXL | 0.05 | 0.05 | 0.05 | 0.05 | 0.05 | 0.05 | 0.05 | 0.05 |
| | Ion-exchanged water | | 68.35 | 71.85 | 60.35 | 69.35 | 69.35 | 71.35 | 69.35 | 69.35 |
| Specifications | Resin particle (A) content in 100 g of pretreatment liquid; [R(g)] | | 8.5 | 8.5 | 8.5 | 8.5 | 8.5 | 8.5 | 8.5 | 8.5 |
| | Amount of calcium ions in millimoles in 100 g of pretreatment liquid; [C(mmol)] | | 32.2 | 16.1 | 85.9 | 35.7 | 38.4 | 13.7 | 25.3 | 23.1 |
| | R/C | | 0.26 | 0.53 | 0.10 | 0.24 | 0.22 | 0.62 | 0.34 | 0.37 |
| | Amount of hydroxycarboxylate-derived OH groups in millimoles in 100 g of pretreatment liquid; [H$_{B1}$(mmol)] | | 18.3 | 9.2 | 64.2 | 0.0 | 0.0 | 27.5 | 0.0 | 19.8 |
| | Molar content of hydroxycarboxylate ions (mmol) | | 18.33 | 9.17 | 64.16 | 0.00 | 0.00 | 27.50 | 18.33 | 19.76 |
| | Molar content of water-soluble organic solvent having one OH group in molecular structure (mmol) | | 83.19 | 83.19 | 83.19 | 83.19 | 83.19 | 83.19 | 83.19 | 83.19 |
| | (Molar content of hydroxycarboxylate ions)/(molar content of water-soluble organic solvent having one OH group in molecular structure) | | 0.22 | 0.11 | 0.77 | 0.00 | 0.00 | 0.33 | 0.22 | 0.24 |

| | | | Pretreatment Liquid No. |
|---|---|---|---|
| Pretreatment Liquid | Resin Particles (A) | (Meth)acrylic-type | NeoCryl A-1127 Nv = 44% |
| | | | NeoCryl XK-188 Nv = 44.5% |
| | | | NeoCryl XK-190 Nv = 45% |
| | | Urethane (Urea)-type | NeoRez R-600 Nv = 33% |
| | | | NeoRez R-9621 Nv = 38% |
| | | | Superflex 300 Nv = 30% |
| | | | Superflex 460 Nv = 38% |
| | | Urethane (meth)acrylic-type | WEM-3000 Nv = 32.5% |
| | | Polyester-type | Plas Coat Z-880 Nv = 25% |
| | | | Plas Coat Z-3310 Nv = 25% |
| | | Polyolefin-type | HYTEC E-6400 Nv = 35% |
| | | | Arrowbase SB-1230N Nv = 25% |
| | Calcium salt of carboxylic acid | Calcium salt of non-hydroxycarboxylic acid | Calcium formate Solubility = 17 |
| | | | Calcium acetate Solubility = 28 |
| | | | Calcium propionate Solubility = 10 |
| | | Calcium salt of hydroxycarboxylic acid | Calcium gluconate Solubility = 3 |
| | | | Calcium lactate Solubility = 3 |
| | | | Calcium pantothenate Solubility = 35 |
| | Calcium salt of non- | Calcium hydrogencarbonate Solubility = 17 | |

TABLE II-1-continued

| | | | | | | | | | |
|---|---|---|---|---|---|---|---|---|---|
| carboxylic acid | Calcium iodide | Solubility = 67 | | | | | | | |
| Non-calcium salt of carboxylic acid | Magnesium lactate | Solubility = 4 | | | | | | | |
| Organic solvent | Water-soluble organic solvent having one hydroxy group | IPA | Boiling Point = 83° C. | 5 | 5 | 5 | 5 | 5 | | |
| | | EtOH | Boiling Point = 78° C. | | | | | | | |
| | | PGM | Boiling Point = 121° C. | | | | | 4 | 5 | |
| | | MB | Boiling Point = 150° C. | | | | | | | |
| | Water-soluble organic solvent having two hydroxy groups | 1,2PD | Boiling Point = 188° C. | | | | | | | 30 |
| | | 1,3BD | Boiling Point = 208° C. | | | | | | | |
| Surfactant | Acetylene-based | SF104 | | 1 | 1 | 1 | 1 | 1 | 1 | 0.5 |
| | | SF440 | | | | | | | | |
| | | SF485 | | | | | | | | |
| | Siloxane-based | BYK349 | | | | | | | | 0.5 |
| Preservative | Proxel GXL | | | 0.05 | 0.05 | 0.05 | 0.05 | 0.05 | 0.05 | 63.16 |
| | Ion-exchanged water | | | 81.05 | 48.25 | 56.85 | 82.95 | 64.95 | 65.95 | 0 |
| Specifications | Resin particle (A) content in 100 g of pretreatment liquid; [R(g)] | | | 3.3 | 18.0 | 11.0 | 4.0 | 5.0 | 5.0 | 95.50 |
| | Amount of calcium ions in millimoles in 100 g of pretreatment liquid; [C(mmol)] | | | 32.2 | 32.2 | 73.6 | 9.2 | 54.5 | 49.1 | 0.7 |
| | R/C | | | 0.101 | 0.56 | 0.15 | 0.44 | 0.09 | 0.10 | 12.6 |
| | Amount of hydroxycarboxylate-derived OH groups in millimoles in 100 g of pretreatment liquid; [H$_{B1}$(mmol)] | | | 18.3 | 18.3 | 55.0 | 4.6 | 45.8 | 36.7 | 0.05 |
| | Molar content of hydroxycarboxylate ions (mmol) | | | 18.33 | 18.33 | 54.99 | 4.58 | 45.83 | 36.66 | 0.0 |
| | Molar content of water-soluble organic solvent having one OH group in molecular structure (mmol) | | | 83.19 | 83.19 | 83.19 | 83.19 | 66.56 | 83.19 | 0 |
| | (Molar content of hydroxycarboxylate ions)/(molar content of water-soluble organic solvent having one OH group in molecular structure) | | | 0.22 | 0.22 | 0.66 | 0.06 | 0.69 | 0.44 | 20.0 |
| | | | | | | | | | | 0 |
| | | | | | | | | | | 40.0 |
| | | | | | | | | | | 19.98 |
| | | | | | | | | | | 0 |
| | | | | | | | | | | — |

Details regarding the product names and abbreviations described in Table 11-1 are as follows.

NeoCryl A-1127: (meth)acrylic resin particles available from DSM Coating Resins Ltd., solid content of 44%

NeoCryl XK-188: (meth)acrylic resin particles available from DSM Coating Resins Ltd., solid content of 44.5%

NeoCryl XK-190: (meth)acrylic resin particles available from DSM Coating Resins Ltd., solid content of 45%

NeoRez R-600: urethane (urea) resin particles available from DSM Coating Resins Ltd., solid content of 33%

NeoRez R-9621: urethane (urea) resin particles available from DSM Coating Resins Ltd., solid content of 38%

Superflex 300: urethane (urea) resin particles available from DKS Co., Ltd., solid content of 30%

Superflex 460: urethane (urea) resin particles available from DKS Co., Ltd., solid content of 38%

WEM-3000: urethane-(meth)acrylic resin particles available from Taisei Fine Chemical Co., Ltd., solid content of 32.5%

Plas Coat Z-880: available from Goo Chemical Co., Ltd. (water-soluble polyester resin, solid content of 25%)

Plas Coat Z-3310: available from Goo Chemical Co., Ltd. (water-soluble polyester resin, solid content of 25%)

HYTEC E-6400: polyolefin resin particles available from Toho Chemical Industry Co., Ltd., solid content of 35%

Arrowbase SB-1230N: polyolefin resin particles available from Unitika Ltd., solid content of 25%

IPA: isopropyl alcohol (monohydric alcohol-based solvent, boiling point at 1 atm of 83° C.)

EtOH: ethyl alcohol (monohydric alcohol-based solvent, boiling point at 1 atm of 78° C.)

PGM: propylene glycol monomethyl ether (glycol monoalkyl ether-based solvent, boiling point at 1 atm of 121° C.)

MB: 3-methoxybutanol (monohydric alcohol-based solvent, boiling point at 1 atm of 150° C.)

1,2PD: 1,2-propanediol (alkanediol-based solvent, boiling point at 1 atm of 188° C.)

1,3BD: 1,3-butanediol (alkanediol-based solvent, boiling point at 1 atm of 208° C.)

SF104: Surfynol 104 (acetylenediol-based surfactant available from Nissin Chemical Co., Ltd.)

SF440: Surfynol 440 (acetylenediol-based surfactant available from Nissin Chemical Co., Ltd.)

SF485: Surfynol 485 (acetylenediol-based surfactant available from Nissin Chemical Co., Ltd.)

BYK349: siloxane-based surfactant available from BYK-Chemie GmbH

Proxel GXL: dipropylene glycol solution of 1,2-benzisothiazol-3-one (solid content of 20%, preservative available from Arch Chemicals, Inc.)

<2> Production Examples of Water-Based Inkjet Ink

<2-1> Production Examples of Pigment Dispersion Resin Liquids

Production Example of Pigment Dispersion Resin 1

A reaction vessel equipped with a gas inlet tube, a thermometer, a condenser, and a stirrer was charged with 95 parts of butanol and purged with nitrogen gas. The inside of the reaction vessel was heated to 110° C., after which a mixture of 45 parts of styrene, 30 parts of acrylic acid, and 25 parts of lauryl methacrylate, as polymerizable monomers, and 6 parts of V-601 (available from Fujifilm Wako Pure Chemical Industries, Ltd.) as a polymerization initiator was added dropwise over 2 hours. After completion of the dropwise addition, the polymerization reaction was continued for 3 hours while maintaining the inside of the reaction vessel at 110° C., after which 0.6 parts of V-601 were added, and the polymerization reaction was further continued for 1 hour at 110° C.

Subsequently, the inside of the reaction vessel was cooled to room temperature (25° C.), after which dimethylaminoethanol was added to fully neutralize the acid groups in the reaction product, and then 100 parts of water were added thereto. Subsequently, the mixture containing the reaction product was heated to 100° C. or higher, butanol was distilled off by azeotropic distillation of butanol with water, and water was further added to adjust the solid content to 30%, and thereby an aqueous solution of a pigment dispersion resin 1 (a solution containing an aqueous solvent and a component dispersed and/or dissolved in the aqueous solvent) was obtained. The theoretical acid value of the pigment dispersion resin 1 as calculated by the FOX equation was 233.6 mgKOH/g.

Production Example of Black Pigment Dispersion

A mixing vessel equipped with a stirrer was charged with 15 parts of carbon black ("PrinteX85" available from Orion Engineered Carbons LLC), 10 parts of an aqueous solution of the pigment dispersion resin 1 (solid content of 30%), and 75 parts of water, after which the components were premixed for 1 hour. Subsequently, the mixture was circulated and dispersed using a Dyno Mill (available from Shinmaru Enterprises Corporation, volume: 0.6 L) filled with 1800 g of zirconia beads having a diameter of 0.5 mm, and thereby a black pigment dispersion was produced.

Production Examples of Cyan Pigment Dispersion, Magenta Pigment Dispersion, and Yellow Pigment Dispersion A cyan pigment dispersion, a magenta pigment dispersion, and a yellow pigment dispersion were obtained in the same manner as in the case of the black pigment dispersion with the exception that the following pigments were used.

Cyan: LIONOL BLUE 7358G (C.I. Pigment Blue 15:3) available from Toyo Color Co., Ltd.

Magenta: a mixture of equal amounts of FASTOGEN SUPER MAGENTA RG (C.I. Pigment Red 122) available from DIC Corporation and Toshiki Red 150 TR (C.I. Pigment Red 150) available from Tokyo Shikizai Industry Co., Ltd.

Yellow: Paliotol Yellow D 1155 (C.I. Pigment Yellow 185) available from BASF SE

Production Example of White Pigment Dispersion

A mixing vessel equipped with a stirrer was charged with 50 parts of titanium oxide ("Tipaque CR-60" available from Ishihara Sangyo Kaisha, Ltd.), 20 parts of an aqueous solution of the pigment dispersion resin 1 (solid content of 30%), and 30 parts of water, and the components were premixed for 1 hour. Subsequently, the mixture was circulated and dispersed using a Dyno Mill (available from Shinmaru Enterprises Corporation, volume: 0.6 L) filled with 1800 g of zirconia beads having a diameter of 0.5 mm, and thereby a white pigment dispersion was produced.

<2-2> Production of Ink

Production Example of Black Ink 1 (K1)

A mixing vessel was sequentially charged with 33.3 parts of the black pigment dispersion, 13.4 parts of an aqueous solution of a binder resin 28 (solid content of 30%) produced by the method described in the examples of JP 2020-180178 A, 20 parts of 1,2-propanediol, 4 parts of propylene glycol monomethyl ether, 1.5 parts of TEGO Wet 280 (polyether-modified siloxane-based surfactant available from Evonik Industries AG), and 1 part of Surfynol 465 (acetylenediol-based surfactant available from Nissin Chemical Co., Ltd.), after which water was added thereto such that the total amount of addition was 100 parts, and the components were thoroughly stirred with a stirrer until the mixture was homogeneous. Subsequently, the mixture was filtered through a membrane filter having a pore diameter of 1 μm to remove coarse particles causing clogging of the head, and thereby a black ink 1 (K1) was prepared.

Production Examples of Cyan Ink 1 (C1), Magenta Ink 1 (M1), Yellow Ink 1 (Y1), and White Ink 1 (W1)

A cyan ink 1 (C1), a magenta ink 1 (M1), a yellow ink 1 (Y1), and a white ink 1 (W1) were obtained in the same manner as the black ink 1 with the exception that the cyan pigment dispersion, the magenta pigment dispersion, the yellow pigment dispersion, and the white pigment dispersion were respectively used in place of the black pigment dispersion. Note that a set of K1, C1, M1, Y1, and W1 was used as inkjet ink set 1 in the evaluations described below.

<3> Preparation Example of Film Substrate to which Pretreatment Liquid was Applied Using the non-wire bar coater 250-OSP-02 available from OSG System Products Co., Ltd., the pretreatment liquid prepared above was applied to the following film substrate to have a wet film thickness of 2.0±0.2 μm, after which the coated film substrate was placed in an air oven at 70° C. and dried for 2 minutes, and thereby a film substrate to which the pretreatment liquid was applied was prepared.
Film Substrate Used for Evaluation
  OPP: biaxially stretched polypropylene film "OPU-1" (thickness: 20 μm) available from Mitsui Chemicals, Inc.
  PET: polyethylene terephthalate film "FE2001" (thickness: 12 μm) available from Futamura Chemical Co., Ltd.

<4> Printed Matter Preparation Examples

Printed Matter Preparation Example 1

Four "KJ4B-1200" inkjet heads (available from Kyocera Corporation, design resolution of 1200 dpi) available from Kyocera Corporation were installed above a conveyor capable of conveying a substrate, and the inkjet heads were filled with four colors of the water-based inkjet ink set 1 produced above, excluding the white ink 1, in the order of K1, C1, M1, and Y1 from the inkjet head on the upstream side in the conveyance direction of the substrate. Next, the film substrate to which the pretreatment liquid was applied was fixed on the conveyor, and then the conveyor was driven at a constant speed. Subsequently, when the film substrate passed through the portion where the inkjet heads were installed, each ink was discharged from the respective inkjet head at a drop volume of 2 μL to thereby print an image. Furthermore, immediately after the printing, the printed matter was placed on a laboratory hot plate preheated to 70±1° C. and dried for 3 minutes to prepare a 4C printed matter.

As images of the 4C printed matter, two types of images were prepared including an image in which 5 cm×10 cm solid patches with a coverage rate of 100% were adjacent in the order of CMYK (hereinafter, referred to as a "solid patch image") and a four color (CMYK) image in which the total coverage rate (the sum of the coverage rates of the respective colors) was continuously changed from 40% to 320% (hereinafter referred to as a "gradation image"; note that the coverage rates of the respective colors with regard to each total coverage rate were the same), and printed matters of each type of printed image were prepared.

Printed Matter Preparation Example 2

Four "KJ4B-1200" inkjet heads (available from Kyocera Corporation, design resolution of 1200 dpi) available from Kyocera Corporation were installed above a conveyor capable of conveying a substrate, and the inkjet heads were filled with four colors of the water-based inkjet ink set 1 produced above, excluding the white ink 1, in the order of K1, C1, M1, and Y1 from the inkjet head on the upstream side in the conveyance direction of the substrate. Next, the film substrate to which the pretreatment liquid was applied was fixed on the conveyor, and then the conveyor was driven at a constant speed. Subsequently, when the film substrate passed through the portion where the inkjet heads were installed, each ink was discharged from the respective inkjet head at a drop volume of 2 μL to thereby print an image. Furthermore, immediately after the printing, the printed matter was placed on a laboratory hot plate preheated to 70±1° C. and dried for 3 minutes to prepare a printed matter.

Next, the ink (K1) filled in the inkjet head on the most upstream side with respect to the conveyance direction was replaced with the white ink 1. Subsequently, the dried printed matter was fixed on the conveyor again, after which the conveyor was driven at a constant speed. Then, when the printed matter passed below the portion where the inkjet heads were installed, the white ink 1 was discharged at a drop volume of 2 μL only from the inkjet head at the most upstream side, and a solid image with a coverage rate of 100% was printed. Note that at this time, a solid image was printed to completely overlap the printed matter. Furthermore, immediately after the printing, the printed matter was placed on a laboratory hot plate preheated to 70±1° C. and dried for 3 minutes to prepare a 5C printed matter.

In Preparation Example 2 of the printed matter, as images of printed matter prepared using the ink of four colors of K1, C1, M1, and Y1, three types of images were prepared including: a solid patch image (hereinafter, 5C printed matter prepared using the solid patch image is referred to as a "5C solid patch image"); a natural image N1 (portrait) of JIS X 9201 high definition color digital standard image data (CMYK/SCID) (hereinafter, 5C printed matter produced using the natural image N1 is referred to as a "5C portrait image"); and an image printed with 4-point MS Mincho characters including a mixture of hiragana and kanji for each color (hereinafter, 5C printed matter produced using the character image is referred to as a "5C character image"), and printed matters of each image type were prepared.

Examples II-1 to II-51 and Comparative Examples II-1 to II-16

Each of the pretreatment liquids produced above was combined with the inkjet ink set 1 to prepare a printed matter. The following evaluations were carried out using these printed matters. The evaluation results are as described in Table II-2.

Evaluation 1: Evaluation of Mixed Color Bleeding

Based on the above method, a gradation image was printed on an OPP film substrate at conveyor driving speeds of 25 m/min, 50 m/min and 75 m/min. Mixed color bleeding was then evaluated by observing the dot shape of the gradation image printed matter using an optical microscope at a magnification of 200 times. The evaluation criteria were as follows, and evaluations of ⊚, ○, and Δ were determined to be usable on a practical level.

Evaluation Criteria

⊚: Coalescence of dots and non-uniformity in the dot shape were not observed in the printed matter printed at 75 m/min.

○: Coalescence of dots and non-uniformity in the dot shape were observed in the printed matter printed at 75 m/min, but were not observed in the printed matter printed at 50 m/min.

Δ: Coalescence of dots and non-uniformity in the dot shape were observed in the printed matter printed at 50 m/min, but were not observed in the printed matter printed at 25 m/min.

x: Coalescence of dots and non-uniformity in the dot shape were observed in the printed matter printed at 25 m/min.

Evaluation 2: Evaluation of Solid Filling

Based on the above method, a solid patch image was printed on an OPP film substrate at conveyor driving speeds of 25 m/min, 50 m/min, and 75 m/min. White backing paper was then affixed to the non-printed surface of the solid patch printed matter, after which the degree of white spots was visually observed to evaluate solid filling. The evaluation criteria were as follows, and evaluations of ⊚, ○, and Δ were determined to be usable on a practical level.

Evaluation Criteria

⊚: White spots were not observed in the printed matter printed at 75 m/min.

○: White spots were observed in the printed matter printed at 75 m/min, but were not observed in the printed matter printed at 50 m/min.

Δ: White spots were observed in the printed matter printed at 50 m/min, but were not observed in the printed matter printed at 25 m/min.

x: White spots were observed in the printed matter printed at 25 m/min.

Evaluation 3: Evaluation of Character Reproducibility

Based on the above method, a 5C character image was printed on an OPP film at a conveyor driving speed of 50 m/min. The character shape of the 5C character image printed matter was then visually observed to evaluate the character reproducibility. The evaluation criteria were as follows, and evaluations of ⊚, ○, and Δ were determined to be usable on a practical level.

Evaluation Criteria

⊚: Characters were recognized as characters in all colors, and an expected character image was reproduced without character blurring, character thickening, character crushing, or the like.

○: While characters were recognized as characters in all colors, slight character blurring, character thickening, character crushing, or the like was observed in some character images.

Δ: While characters were recognized as characters in all colors, character blurring, character thickening, character crushing, or the like was clearly observed in some character images.

x: Characters that are difficult to decipher were present.

Evaluation 4: Evaluation of Overlapping Image Quality

Based on the above method, a 5C portrait image was printed on an OPP film at conveyor driving speeds of 25 m/min, 50 m/min, and 75 m/min. The 5C portrait image printed matter was then observed from the non-printed surface side with an optical microscope at a magnification of 200 times, and the degree of white spots, the dot shape, and the presence or absence of color mixing were comprehensively determined to evaluate the overlapping image quality. The evaluation results were as follows, and evaluations of ⊚, ○, and Δ were determined to be usable on a practical level.

Evaluation Criteria

⊚: Neither white spots nor irregularity in dot shape was observed in the printed matter printed at 75 m/min, and no color mixing was observed.

○: In the printed matter printed at 75 m/min, one or more of white spots, irregularity in dot shape, and color mixing were observed, but in the printed matter printed at 50 m/min, neither white spots nor irregularity in dot shapes was observed, and no color mixing was observed.

Δ: In the printed matter printed at 50 m/min, one or more of white spots, irregularity in dot shape, and color mixing were observed, but in the printed matter printed at 25 m/min, neither white spots nor irregularity in dot shapes was observed, and no color mixing was observed.

x: One or more of white spots, irregularity in dot shape, and color mixing were observed in the printed matter printed at 25 m/min.

Evaluation 5: Evaluation of Adhesion

Based on the above method, a 5C solid patch image was printed on an OPP film at a conveyor driving speed of 50 m/min. Next, cellophane tape (18 mm wide) available from Nichiban Co., Ltd. was firmly affixed at four places on the printed surface of the 5C solid patch image printed matter such that a solid patch of each color was included. The edge of the cellophane tape was then held and instantaneously peeled off while maintaining an angle of 60 degrees, and the surface of the printed matter after the cellophane tape was peeled off and the adhesive surface of the cellophane tape were visually confirmed to evaluate the adhesion. The evaluation criteria were as follows, and evaluations of ⊚, ○, and Δ were determined to be usable on a practical level. It should be noted that the evaluation results described in Table 2 pertain to the color having the worst evaluation among the four evaluated colors.

Evaluation Criteria

⊚: The surface area of the peeled portion with respect to the surface area of the portion to which the cellophane tape was affixed was less than 5%.

○: The surface area of the peeled portion with respect to the surface area of the portion to which the cellophane tape was affixed was from 5% to less than 10%.

Δ: The surface area of the peeled portion with respect to the surface area of the portion to which the cellophane tape was affixed was from 10% to less than 20%.

x: The surface area of the peeled portion with respect to the surface area of the portion to which the cellophane tape was affixed was 20% or greater.

Evaluation 6: Evaluation of Blocking Resistance

A solid patch image was printed on an OPP film according to the above method at a conveyor driving speed of 50 m/min. A 4 cm×4 cm square of a black ink 1 printed portion was cut out from the solid patch image printed matter. Subsequently, the printed surface of the black ink 1 that was cut out and a non-printed surface (film back surface) of the same film as that used for printing were superposed on each other to prepare a test piece, and the test piece was subjected to a blocking test using a constant load permanent strain tester (available from Tester Sangyo Co., Ltd.). The environmental conditions of the blocking test included a load of 10 kg/cm$^2$, a temperature of 40° C., a relative humidity of 80% RH, and a standing time of 24 hours. After 24 hours had passed, the superposed film was instantaneously peeled off while maintaining an angle of 90°, and the printed surface after peeling was visually confirmed to evaluate the blocking resistance. The evaluation criteria were as follows, and evaluations of ⊚, ○, and Δ were determined to be usable on a practical level.

Evaluation Criteria

⊚: There was absolutely no removal of the printed surface with respect to the subsequently superposed film, and there was no peeling resistance.

○: There was absolutely no removal of the printed surface with respect to the subsequently superposed film, but there was slight resistance during peeling.

Δ: Removal of the printed surface with respect to the subsequently superposed film was 30% or less of the total superposed surface area.

x: Removal of the printed surface with respect to the subsequently superposed film exceeded 30% of the total superposed surface area.

Evaluation 7: Evaluation of Lamination Strength (Adhesive Force)

A solid patch image was printed on an OPP film according to the above method at a conveyor driving speed of 50 m/min. Next, using a solventless test coater, a solventless laminating adhesive ("EA-N373A/B" available from Toyo-Morton Co., Ltd.) was applied (coating amount: 2 g/m$^2$) to the printed surface of the obtained solid patch printed matter at a temperature of 60° C. and a coating speed of 50 m/min. Subsequently, a corona-treated surface of a cast polypropylene (CPP) film ("FHK2" (thickness of 25 μm) available from Futamura Chemical Co., Ltd.) was superposed on the surface coated with the laminating adhesive, and then aged for one day in an environment at a temperature of 40° C. and a relative humidity of 80% RH to cure the solventless laminating adhesive, and a laminated product was thereby prepared. Then, a black ink 1 portion of the obtained laminated product was cut to a length of 100 mm and a width of 15 mm to obtain a test piece, and this test piece was set in an Instron type tensile tester and then pulled at a peeling rate of 300 mm/min in 25° C. environment to measure the T-type peeling strength (N). This test was carried out five times, and the average value thereof was calculated as the adhesive force (lamination strength) to evaluate the lamination strength. The evaluation criteria were as follows, and evaluations of ⊚, ○, and Δ were determined to be usable on a practical level.

Evaluation Criteria

⊚: The lamination strength was 1.5 N or greater.

○: The lamination strength was from 1.0 N to less than 1.5 N.

Δ: The lamination strength was from 0.5 N to less than 1.0 N.

x: The lamination strength was less than 0.5 N.

TABLE II-2

| | | | | Examples/Comparative Examples | | | | | |
|---|---|---|---|---|---|---|---|---|---|
| | | | | Example II-1 | Example II-2 | Example II-3 | Example II-4 | Example II-5 | Example II-6 |
| | | | | Used Pretreatment Liquid No. | | | | | |
| | | | | II-1 | II-2 | II-3 | II-4 | II-5 | II-6 |
| Evaluation Results | Image quality | Evaluation 1 | Mixed color bleeding | ⊚ | ⊚ | ⊚ | ○ | ⊚ | ⊚ |
| | | Evaluation 2 | Color unevenness (solid filling) | ⊚ | ⊚ | ○ | ⊚ | Δ | ⊚ |
| | | Evaluation 3 | Character reproducibility | ⊚ | ⊚ | ⊚ | ⊚ | ○ | ⊚ |
| | | Evaluation 4 | Overlapping image quality | ⊚ | ⊚ | ⊚ | ⊚ | ⊚ | ⊚ |
| | Printed matter properties | Evaluation 5 | Substrate adhesion | ⊚ | ⊚ | Δ | ⊚ | ○ | ⊚ |
| | Post-processing suitability | Evaluation 6 | Blocking resistance | ⊚ | ⊚ | ⊚ | ○ | ⊚ | ⊚ |
| | | Evaluation 7 | Lamination suitability | ⊚ | ⊚ | ⊚ | ⊚ | ○ | ⊚ |

| | | | | Examples/Comparative Examples | | | | | | |
|---|---|---|---|---|---|---|---|---|---|---|
| | | | | Example II-7 | Example II-8 | Example II-9 | Example II-10 | Example II-11 | Example II-12 | Example II-13 |
| | | | | Used Pretreatment Liquid No. | | | | | | |
| | | | | II-7 | II-8 | II-9 | II-10 | II-11 | II-12 | II-13 |
| Evaluation Results | Image quality | Evaluation 1 | | ⊚ | ○ | ⊚ | ⊚ | ⊚ | ⊚ | ⊚ |
| | | Evaluation 2 | | Δ | ○ | ⊚ | ⊚ | ⊚ | ⊚ | ⊚ |
| | | Evaluation 3 | | ○ | ○ | ⊚ | ⊚ | ⊚ | ⊚ | ○ |
| | | Evaluation 4 | | ⊚ | Δ | ⊚ | ⊚ | ⊚ | ⊚ | ○ |
| | Printed matter properties | Evaluation 5 | | Δ | ⊚ | ⊚ | ⊚ | ⊚ | ⊚ | ○ |

TABLE II-2-continued

| | | | | | | | | | |
|---|---|---|---|---|---|---|---|---|---|
| Post-processing suitability | Evaluation 6 | | ○ | ◎ | ◎ | ◎ | ◎ | ◎ | ◎ |
| | Evaluation 7 | | ○ | ◎ | ◎ | ◎ | ○ | ◎ | ◎ |

| | | | | Examples/Comparative Examples | | | | | |
|---|---|---|---|---|---|---|---|---|---|
| | | | | Example II-14 | Example II-15 | Example II-16 | Example II-17 | Example II-18 | Example II-19 |
| | | | | Used Pretreatment Liquid No. | | | | | |
| | | | | II-14 | II-15 | II-16 | II-17 | II-18 | II-19 |
| Evaluation Results | Image quality | Evaluation 1 | Mixed color bleeding | ◎ | ◎ | ◎ | ◎ | ○ | ◎ |
| | | Evaluation 2 | Color unevenness (solid filling) | ○ | ◎ | ◎ | ◎ | ○ | ◎ |
| | | Evaluation 3 | Character reproducibility | ◎ | ◎ | ◎ | ◎ | ◎ | ◎ |
| | | Evaluation 4 | Overlapping image quality | ◎ | ◎ | ◎ | ◎ | ◎ | ◎ |
| | Printed matter properties | Evaluation 5 | Substrate adhesion | ○ | ◎ | ◎ | ◎ | ◎ | ◎ |
| | Post-processing suitability | Evaluation 6 | Blocking resistance | ◎ | ◎ | ◎ | ○ | ○ | ◎ |
| | | Evaluation 7 | Lamination suitability | ○ | ◎ | ◎ | ○ | ○ | ◎ |

| | | | | Examples/Comparative Examples | | | | | |
|---|---|---|---|---|---|---|---|---|---|
| | | | | Example II-20 | Example II-21 | Example II-22 | Example II-23 | Example II-24 | Example II-25 |
| | | | | Used Pretreatment Liquid No. | | | | | |
| | | | | II-20 | II-21 | II-22 | II-23 | II-24 | II-25 |
| Evaluation Results | Image quality | Evaluation 1 | | ◎ | ◎ | ◎ | ◎ | ◎ | ◎ |
| | | Evaluation 2 | | ◎ | ◎ | ◎ | ◎ | ◎ | ◎ |
| | | Evaluation 3 | | ◎ | ◎ | ◎ | ◎ | ◎ | ◎ |
| | | Evaluation 4 | | ◎ | ◎ | ◎ | ◎ | ◎ | ◎ |
| | Printed matter properties | Evaluation 5 | | ◎ | ◎ | ◎ | ◎ | ◎ | ◎ |
| | Post-processing suitability | Evaluation 6 | | ◎ | ◎ | ◎ | ◎ | ◎ | ◎ |
| | | Evaluation 7 | | ◎ | ◎ | ◎ | ◎ | ◎ | ◎ |

| | | | | Examples/Comparative Examples | | | | | |
|---|---|---|---|---|---|---|---|---|---|
| | | | | Example II-26 | Example II-27 | Example II-28 | Example II-29 | Example II-30 | Example II-31 |
| | | | | Used Pretreatment Liquid No. | | | | | |
| | | | | II-26 | II-27 | II-28 | II-29 | II-30 | II-31 |
| Evaluation Results | Image quality | Evaluation 1 | Mixed color bleeding | ◎ | ◎ | ◎ | ◎ | ◎ | ◎ |
| | | Evaluation 2 | Color unevenness (solid filling) | ◎ | ◎ | ◎ | ◎ | ◎ | ◎ |
| | | Evaluation 3 | Character reproducibility | ◎ | ◎ | ◎ | ◎ | ◎ | ◎ |
| | | Evaluation 4 | Overlapping image quality | ◎ | ◎ | ◎ | ◎ | ◎ | ◎ |
| | Printed matter properties | Evaluation 5 | Substrate adhesion | ◎ | ◎ | ◎ | ◎ | ◎ | ◎ |
| | Post-processing suitability | Evaluation 6 | Blocking resistance | ○ | ○ | ○ | ◎ | ◎ | ◎ |
| | | Evaluation 7 | Lamination suitability | ○ | ○ | ○ | ◎ | ○ | ◎ |

| | | | | Examples/Comparative Examples | | | | | |
|---|---|---|---|---|---|---|---|---|---|
| | | | | Example II-32 | Example II-33 | Example II-34 | Example II-35 | Example II-36 | Example II-37 |
| | | | | Used Pretreatment Liquid No. | | | | | |
| | | | | II-32 | II-33 | II-34 | II-35 | II-36 | II-37 |
| Evaluation Results | Image quality | Evaluation 1 | | ◎ | ◎ | ◎ | ○ | ◎ | ◎ |
| | | Evaluation 2 | | ◎ | ◎ | Δ | Δ | ◎ | ◎ |
| | | Evaluation 3 | | ◎ | ◎ | ◎ | ◎ | ◎ | ◎ |
| | | Evaluation 4 | | ◎ | ◎ | ◎ | ◎ | ◎ | ◎ |
| | Printed matter properties | Evaluation 5 | | ◎ | ○ | Δ | Δ | ◎ | ◎ |
| | Post-processing suitability | Evaluation 6 | | ◎ | ○ | ○ | ○ | ◎ | ◎ |
| | | Evaluation 7 | | ◎ | ◎ | ○ | ○ | ◎ | ◎ |

TABLE II-2-continued

|  |  |  |  | Example II-38 | Example II-39 | Example II-40 | Example II-41 | Example II-42 | Example II-43 |
|---|---|---|---|---|---|---|---|---|---|
|  |  |  |  | \multicolumn{6}{c}{Used Pretreatment Liquid No.} |
|  |  |  |  | II-38 | II-39 | II-40 | II-41 | II-42 | II-43 |
| Evaluation Results | Image quality | Evaluation 1 | Mixed color bleeding | ○ | ◎ | ◎ | ◎ | ◎ | ◎ |
|  |  | Evaluation 2 | Color unevenness (solid filling) | ○ | ◎ | ◎ | ◎ | ◎ | ◎ |
|  |  | Evaluation 3 | Character reproducibility | ○ | ◎ | ◎ | ◎ | ◎ | ◎ |
|  |  | Evaluation 4 | Overlapping image quality | ◎ | ◎ | ◎ | ◎ | ○ | ◎ |
|  | Printed matter properties | Evaluation 5 | Substrate adhesion | △ | ◎ | ◎ | ◎ | ○ | ◎ |
|  | Post-processing suitability | Evaluation 6 | Blocking resistance | ◎ | ◎ | ◎ | ○ | △ | ◎ |
|  |  | Evaluation 7 | Lamination suitability | ◎ | ◎ | ◎ | ◎ | ○ | ◎ |

| | | | Example II-44 | Example II-45 | Example II-46 | Example II-47 | Example II-48 | Example II-49 |
|---|---|---|---|---|---|---|---|---|
| | | | \multicolumn{6}{c}{Used Pretreatment Liquid No.} |
| | | | II-44 | II-45 | II-46 | II-47 | II-48 | II-49 |
| Evaluation Results | Image quality | Evaluation 1 | ◎ | ◎ | ◎ | ◎ | ◎ | ◎ |
| | | Evaluation 2 | ◎ | ◎ | ◎ | ◎ | ◎ | ◎ |
| | | Evaluation 3 | ◎ | ◎ | ◎ | ◎ | ◎ | ◎ |
| | | Evaluation 4 | ◎ | ◎ | ◎ | ◎ | ◎ | ◎ |
| | Printed matter properties | Evaluation 5 | ◎ | ◎ | ◎ | ◎ | ◎ | ◎ |
| | Post-processing suitability | Evaluation 6 | ◎ | ◎ | ◎ | ◎ | ◎ | ◎ |
| | | Evaluation 7 | ◎ | ◎ | ◎ | ◎ | ◎ | ◎ |

| | | | Example II-50 | Example II-51 | Comparative Example II-1 | Comparative Example II-2 | Comparative Example II-3 |
|---|---|---|---|---|---|---|---|
| | | | \multicolumn{5}{c}{Used Pretreatment Liquid No.} |
| | | | II-50 | II-51 | II-52 | II-53 | II-54 |
| Evaluation Results | Image quality | Evaluation 1 Mixed color bleeding | ◎ | ◎ | ○ | ◎ | ◎ |
| | | Evaluation 2 Color unevenness (solid filling) | ◎ | ◎ | ○ | X | ○ |
| | | Evaluation 3 Character reproducibility | ◎ | ◎ | ○ | X | △ |
| | | Evaluation 4 Overlapping image quality | ◎ | ◎ | ○ | ◎ | X |
| | Printed matter properties | Evaluation 5 Substrate adhesion | ◎ | ◎ | ◎ | X | ◎ |
| | Post-processing suitability | Evaluation 6 Blocking resistance | ◎ | ◎ | X | ○ | △ |
| | | Evaluation 7 Lamination suitability | ◎ | ◎ | △ | △ | ○ |

| | | | Comparative Example II-4 | Comparative Example II-5 | Comparative Example II-6 | Comparative Example II-7 | Comparative Example II-8 |
|---|---|---|---|---|---|---|---|
| | | | \multicolumn{5}{c}{Used Pretreatment Liquid No.} |
| | | | II-55 | II-56 | II-57 | II-58 | II-59 |
| Evaluation Results | Image quality | Evaluation 1 | ◎ | X | X | X | ◎ |
| | | Evaluation 2 | △ | ◎ | ◎ | △ | △ |
| | | Evaluation 3 | △ | △ | △ | △ | X |
| | | Evaluation 4 | X | X | X | X | X |
| | Printed matter properties | Evaluation 5 | ◎ | ◎ | ◎ | ◎ | ◎ |
| | Post-processing suitability | Evaluation 6 | △ | X | X | X | △ |
| | | Evaluation 7 | ○ | ◎ | ◎ | ○ | ○ |

TABLE II-2-continued

|  |  |  |  | Examples/Comparative Examples | | | |
|---|---|---|---|---|---|---|---|
|  |  |  |  | Comparative Example II-9 | Comparative Example II-10 | Comparative Example II-11 | Comparative Example II-12 |
|  |  |  |  | Used Pretreatment Liquid No. | | | |
|  |  |  |  | II-60 | II-61 | II-62 | II-63 |
| Evaluation Results | Image quality | Evaluation 1 | Mixed color bleeding | ◉ | X | ◉ | X |
|  |  | Evaluation 2 | Color unevenness (solid filling) | ○ | Δ | X | ○ |
|  |  | Evaluation 3 | Character reproducibility | ◉ | ○ | Δ | X |
|  |  | Evaluation 4 | Overlapping image quality | ◉ | ○ | ◉ | X |
|  | Printed matter properties | Evaluation 5 | Substrate adhesion | X | ◉ | X | ○ |
|  | Post-processing suitability | Evaluation 6 | Blocking resistance | ○ | X | ○ | ○ |
|  |  | Evaluation 7 | Lamination suitability | ○ | ○ | Δ | ○ |

|  |  |  |  | Examples/Comparative Examples | | | |
|---|---|---|---|---|---|---|---|
|  |  |  |  | Comparative Example II-13 | Comparative Example II-14 | Comparative Example II-15 | Comparative Example II-16 |
|  |  |  |  | Used Pretreatment Liquid No. | | | |
|  |  |  |  | II-64 | II-65 | II-66 | II-67 |
| Evaluation Results | Image quality | Evaluation 1 | ◉ | ◉ | ○ | ○ |
|  |  | Evaluation 2 | Δ | Δ | ○ | Δ |
|  |  | Evaluation 3 | X | X | X | ◉ |
|  |  | Evaluation 4 | ◉ | ◉ | X | ◉ |
|  | Printed matter properties | Evaluation 5 | X | X | X | X |
|  | Post-processing suitability | Evaluation 6 | ○ | ◉ | X | X |
|  |  | Evaluation 7 | Δ | Δ | Δ | X |

From the results of the evaluations, with regard to Examples II-1 to II-51, which each used a pretreatment liquid containing resin particles (A) and, as a flocculant component (flocculant), plural types of calcium salt of carboxylic acid (B) including calcium salts of hydroxycarboxylic acid, the pretreatment liquid also satisfying the stipulations regarding the amount (C) of calcium ions in millimoles and the ratio of the amount (C) to the amount (R) of the resin particles (A) in millimoles, it was confirmed that these examples exhibited quality of a level enabling practical use with regard to all of the evaluated items.

On the other hand, in Comparative Example II-1, the amount of calcium ions was too small in relation to the amount of the resin particles (A), and therefore the crosslinking of the solid components in the ink was insufficient and resulted in poor blocking resistance. Conversely, in Comparative Example II-2, the amount of calcium ions was excessive, and therefore the speed of aggregation and thickening of the ink to be printed later was too high, and the ink droplets did not undergo wet spreading, resulting in poor solid filling and poor character reproducibility. In addition, the effect of the resin particles (A) was inhibited by the excessive amount of calcium ions, and as a result, deterioration in adhesion was also confirmed.

Comparative Examples II-3 and II-4 did not contain salts of hydroxycarboxylic acid, and therefore recrystallization at the time of drying could not be completely suppressed, and as a result, the quality of the overlapping image deteriorated. In addition, Comparative Examples II-5 to II-7 did not contain plural types of calcium salts of carboxylic acid, and therefore trade-offs between mixed color bleeding and solid filling, and between blocking resistance and lamination suitability were observed. Further, Comparative Example II-8 used a magnesium salt instead of a calcium salt, resulting in a deterioration in character reproducibility and the overlapping image quality. This deterioration is thought to be due to the slow diffusion of the magnesium salt into the ink landed and to the slow aggregation speed of the ink droplets.

In Comparative Example II-9, the amount of the resin particles (A) was too small in relation to the amount of calcium ions, and deterioration in substrate adhesion was confirmed. Conversely, in Comparative Example II-10, the amount of the resin particles (A) was excessive, and a deterioration in mixed color bleeding occurred. This deterioration is thought to be due to a delayed diffusion of the flocculant component into the ink. In addition, as in the case of Comparative Example II-1, crosslinking of the solid content in the ink was insufficient, and also resulted in poor blocking resistance.

In Comparative Example II-11, the content of calcium ions was excessive, and the aggregation speed of the ink was too high, and as a result, the droplets of the ink did not sufficiently undergo wet spreading, and the solid filling property deteriorated. Conversely, in Comparative Example II-12, the content of calcium ions was insufficient, and the aggregation speed of the ink was reduced, and as a result, the mixed color bleeding, character reproducibility, and overlapping image quality deteriorated.

Comparative Examples II-13 to II-16 are reproductions of the examples described in Patent Documents 1 to 4 described above. Comparative Example II-13 is a reproduction of Example 72 of Patent Document 1, and Comparative Example II-14 is a reproduction of Example 75 of Patent Document 2. As a result of the evaluation, deterioration in character reproducibility was confirmed, and adhesion to the substrate was insufficient. In both examples, it is thought that the content of calcium ions was excessive in relation to the resin particles (A).

On the other hand, in Comparative Example II-15, which is a reproduction of Example 2 of Patent Document 3, deterioration of character reproducibility and the quality of the overlapping image was observed. In addition, deterioration in blocking resistance and further deterioration in adhesion due to insufficient crosslinking of the solid content in the ink were also confirmed. This is thought to be attributed to the shortage of the flocculant component because only one type of calcium salts of carboxylic acid was contained, and a calcium salt of hydroxycarboxylic acid was not contained. In addition, Comparative Example II-16 is a reproduction of Example 2 of Patent Document 4, and since resin particles (A) were not contained, the pretreatment liquid layer did not adhere to the substrate, and a deterioration of blocking resistance and lamination suitability was also observed.

Example III

The following description relates to Examples and Comparative Examples corresponding to the embodiments of the pretreatment liquid (III) described above.

<1> Production Examples of Resin Particles (A1)

Production Example 1: Production of (Meth)Acrylic Resin Particles 1 (Ac1)

A reaction vessel equipped with a gas inlet tube, a thermometer, a condenser, and a stirrer was charged with 124 parts of ion-exchanged water and 1.2 parts of sodium polyoxyethylene lauryl ether sulfate (Latemul E-150, available from Kao Corporation) as an emulsifier, and the contents were stirred and mixed well. Meanwhile, another mixing vessel equipped with a stirrer was prepared, and 0.2 parts of acrylic acid, 39.8 parts of n-butyl acrylate, and 60 parts of methyl methacrylate as ethylenically unsaturated monomers; 64 parts of ion-exchanged water; and 0.8 parts of sodium polyoxyethylene lauryl ether sulfate (Latemul E-150 available from Kao Corporation) as an emulsifier were sequentially added to the prepared mixing vessel, after which the contents were stirred and mixed thoroughly to form an emulsion.

Next, 8 portions of the emulsion were taken from the mixing vessel and added to the reaction vessel. After the addition, the internal temperature of the reaction vessel was increased to 80° C., and the inside of the vessel was sufficiently purged with nitrogen, after which 4 parts of a 5% aqueous solution of potassium persulfate and 8 parts of a 1% aqueous solution of anhydrous sodium bisulfite were added to initiate a polymerization reaction. After initiation of the polymerization reaction, the remainder (156.8 parts) of the emulsion prepared above, 1.2 parts of a 5% aqueous solution of potassium persulfate, and 2.5 parts of a 1% aqueous solution of anhydrous sodium bisulfite were added dropwise over 1.5 hours while maintaining the internal temperature of the reaction vessel at 80° C. After completion of the dropwise addition, the contents in the reaction vessel were further stirred for 2 hours and then cooled until the internal temperature reached 30° C. or lower. Subsequently, dimethylaminoethanol was added to adjust the pH to 8.5, after which ion-exchanged water was added to adjust the solid content to 30%, and thereby an aqueous dispersion (solid content: 30%) of (meth)acrylic resin particles 1 (Ac1) was obtained. The acid value and Tg of the (meth)acrylic resin particles 1, calculated by the methods described above, were 1.6 (mgKOH/g) and 19.9 (° C.), respectively.

Production Examples 2 to 10: Production of (Meth)Acrylic Resin Particles 2 to 10 (Ac2 to Ac10)

Aqueous dispersions (each having a solid content of 30%) of (meth)acrylic resin particles 2 to 10 (Ac2 to Ac10) were produced by the same operation as that for (meth)acrylic resin particles 1 with the exception that the type and amount of the ethylenically unsaturated monomer used in the preparation of the emulsion were changed as described in Table III-1.

TABLE III-1

|  |  | Production Example 1 Ac1 | Production Example 2 Ac2 | Production Example 3 Ac3 | Production Example 4 Ac4 | Production Example 5 Ac5 | Production Example 6 Ac6 | Production Example 7 Ac7 | Production Example 8 Ac8 | Production Example 9 Ac9 | Production Example 10 Ac10 |
| --- | --- | --- | --- | --- | --- | --- | --- | --- | --- | --- | --- |
| Acid group-containing ethylenically unsaturated monomer | Acrylic acid | 0.2 | 2 | 5 | 7 | 2 | 2 | 2 | 2 | 2 | 2 |
| Other ethylenically unsaturated monomer | n-butyl acrylate | 39.8 | 38 | 35 | 33 |  | 48 | 30 | 20 | 25 |  |
|  | 2-ethylhexyl acrylate |  |  |  |  | 50 |  |  |  |  |  |
|  | methyl methacrylate | 60 | 60 | 60 | 60 | 30 |  |  |  | 73 | 70 |
|  | n-butyl methacrylate |  |  |  |  | 18 | 50 | 68 | 78 |  | 28 |
| Total |  | 100 | 100 | 100 | 100 | 100 | 100 | 100 | 100 | 100 | 100 |
| Acid value [mgKOH/g] |  | 1.6 | 15.6 | 38.9 | 54.5 | 15.6 | 15.6 | 15.6 | 15.6 | 15.6 | 15.6 |
| Glass transition temperature [° C.] |  | 19.9 | 23.3 | 28.5 | 32.0 | 21.2 | −19.9 | −5.9 | 2.6 | 47.0 | 76.6 |

Table III-1 also describes the acid values and glass transition temperatures of the (meth)acrylic resin particles 1 to 10, calculated by the methods described above.

Production Example 11: Production of Urethane Urea Resin Particles 1 (Ur1)

A reaction vessel equipped with a gas inlet tube, a thermometer, a condenser, and a stirrer was charged with 72 parts of a polyester polyol ("HS2H-201AP" available from Hokoku Corporation, hydroxyl value: 56 (mgKOH/g)) dehydrated in advance under reduced pressure, 3.4 parts of dimethylolpropionic acid, 59.9 parts of methyl ethyl ketone, and 20 parts of isophorone diisocyanate. Subsequently, the internal temperature of the reaction vessel was increased to 80° C., and the mixture was reacted for 4 hours, and thereby a mixed solution containing a urethane prepolymer having an isocyanate group at a molecular terminal was obtained. The mixed solution was cooled to 40° C., after which 20 parts of methyl ethyl ketone were added thereto, and 2.2 parts of dimethylaminoethanol were further added thereto to neutralize the acid groups present in the urethane prepolymer. Subsequently, 209.4 parts of ion-exchanged water were further gradually added to the mixed solution containing the urethane prepolymer while stirring, and the urethane prepolymer was thereby emulsified.

Next, an aqueous solution containing isophoronediamine as a chain extender (prepared by dissolving 4.6 parts of isophoronediamine in a mixed solution of 16.4 parts of isopropyl alcohol and 16.4 parts of ion-exchanged water) was gradually added to the obtained urethane prepolymer emulsion to cause a chain extension reaction. Subsequently, methyl ethyl ketone and isopropyl alcohol were removed under reduced pressure, and ion-exchanged water was further added to adjust the solid content to 30%, and thereby an aqueous dispersion (solid content: 30%) of urethane urea resin particles 1 (Ur1) was obtained. The acid value of the urethane urea resin particles 1 calculated by the above-described method was 14.2 (mgKOH/g).

Production Example 12: Production of Urethane Urea Resin Particles 2 (Ur2)

An aqueous dispersion (solids content: 30%) of urethane urea resin particles 2 (Ur2) was produced in the same manner as in the production of the above-described urethane-urea resin particles 1 (Ur1) with the exception that the materials initially added in the reaction vessel included 70.2 parts of a polyesterpolyol ("HS2H-201AP" available from Hokoku Corporation) dehydrated in advance under reduced pressure, 3.3 parts of dimethylolpropionic acid, 59.9 parts of methyl ethyl ketone, and 21.4 parts of m-tetramethylxylylene diisocyanate, and the solution added during the chain extension reaction was an aqueous solution containing m-tetramethylxylylene diamine (aqueous solution obtained by dissolving 5.1 parts of m-tetramethylxylylene diamine in a mixed solution of 16.4 parts of isopropyl alcohol and 16.4 parts of ion-exchanged water). The acid value of the urethane urea resin particles 2 calculated by the above-described method was 13.8 (mgKOH/g).

<2> Production Example of Water-Soluble Resin (D)

Production Example 13: Production of Water-Soluble (Meth)Acrylic Resin 1 (AcB1)

A reaction vessel equipped with a gas inlet tube, a thermometer, a condenser, a stirrer, and two dropping funnels was charged with 94 parts of 1-butanol and then sufficiently purged with nitrogen, after which the contents of the reaction vessel were heated under stirring until the internal temperature reached 105° C. Next, a mixture of 50 parts of methoxypolyethylene glycol monomethacrylate 2 (number of moles of EO added: 23), 20 parts of styrene, 1 part of acrylic acid, and 29 parts of methyl methacrylate, which are ethylenically unsaturated monomers, was added dropwise from one of the two dropping funnels over 3 hours. From the other dropping funnel, a dimethyl-2,2'-azobisisobutyrate solution (prepared by dissolving 7.7 parts of dimethyl-2,2'-azobisisobutyrate in 12 parts of 1-butanol) was added dropwise over 4 hours. After completion of dropwise addition of the dimethyl-2,2'-azobisisobutyrate solution, the reaction was further continued for 10 hours. Then, 1-butanol was completely dried and removed from the obtained mixture to thereby obtain a solid water-soluble (meth)acrylic resin 1 (AcB1). The content of the EO structure in the water-soluble (meth)acrylic resin 1 (AcB1) calculated by the above-described method was 45.6%, and the acid value was 7.8 mgKOH/g. The weight-average molecular weight (calibrated with polystyrene) of the water-soluble (meth)acrylic resin 1 measured using the "HLC-8120GPC" equipped with an RI detector and a TSKgel column (available from Tosoh Corporation) was 15000.

Production Examples 14 to 42: Production of Water-Soluble (Meth)Acrylic Resins 2 to 30 (AcB2 to AcB30)

Water-soluble (meth)acrylic resins 2 to 30 (AcB2 to AcB30), each of which was a solid, were obtained by the same operation as that of the water-soluble (meth)acrylic resin 1 with the exception that the constitution of the mixture of the ethylenically unsaturated monomers added dropwise from one of the dropping funnels was changed as described in Table III-2.

TABLE III-2

| | | Production Example 13 AcB1 | Production Example 14 AcB2 | Production Example 15 AcB3 | Production Example 16 AcB4 | Production Example 17 AcB5 | Production Example 18 AcB6 |
|---|---|---|---|---|---|---|---|
| Acid group-containing ethylenically unsaturated monomer | Acrylic acid | 1 | 2 | 3 | | 1 | 2 |
| | Methacrylic acid | | | | 4 | 1 | |
| EO chain-containing ethylenically unsaturated monomer | Methoxypolyethylene glycol monoacrylate (number of added moles of EO: 9) | | | | | | |
| | Methoxy polyethylene glycol monomethacrylate 1 (number of added moles of EO: 9) | | | | | | |
| | Methoxypolyethylene glycol monomethacrylate 2 (number of added moles of EO: 23) | 50 | 50 | 50 | 50 | 50 | 50 |
| | Methoxypolyethylene glycol monomethacrylate 3 (number of added moles of EO: 90) | | | | | | |
| | Polyethylene glycol monomethacrylate (number of added moles of EO: 8) | | | | | | |
| PO chain-containing ethylenically unsaturated monomer | Polypropylene glycol monomethacrylate 1 (number of added moles of PO: 9) | | | | | | |
| | Polypropylene glycol monomethacrylate 2 (number of added moles of PO: 13) | | | | | | |

TABLE III-2-continued

| | | Production Example 13 AcB1 | Production Example 14 AcB2 | Production Example 15 AcB3 | Production Example 16 AcB4 | Production Example 17 AcB5 | Production Example 18 AcB6 |
|---|---|---|---|---|---|---|---|
| Aromatic ethylenically unsaturated monomer | Styrene | 20 | 20 | 20 | 20 | 20 | 20 |
| Other ethylenically unsaturated monomer | Methyl methacrylate | 29 | 28 | 27 | 26 | 28 | |
| | Ethyl methacrylate | | | | | | 28 |
| | n-butyl methacrylate | | | | | | |
| | Lauryl methacrylate | | | | | | |
| Total | | 100 | 100 | 100 | 100 | 100 | 100 |
| Content of EO structure | | 45.6 | 45.6 | 45.6 | 45.6 | 45.6 | 45.6 |
| Content of PO structure | | 0 | 0 | 0 | 0 | 0 | 0 |
| Acid value [mgKOH/g] | | 7.8 | 15.6 | 23.4 | 26.1 | 14.3 | 15.6 |
| Weight average molecular weight | | 15000 | 15000 | 15000 | 15000 | 15000 | 15000 |

| | | Production Example 19 AcB7 | Production Example 20 AcB8 | Production Example 21 AcB9 | Production Example 22 AcB10 | Production Example 23 AcB11 |
|---|---|---|---|---|---|---|
| Acid group-containing ethylenically unsaturated monomer | Acrylic acid | 2 | 2 | 2 | 2 | 2 |
| | Methacrylic acid | | | | | |
| EO chain-containing ethylenically unsaturated monomer | Methoxypolyethylene glycol monoacrylate (number of added moles of EO: 9) | | | | | |
| | Methoxy polyethylene glycol monomethacrylate 1 (number of added moles of EO: 9) | | | | | |
| | Methoxypolyethylene glycol monomethacrylate 2 (number of added moles of EO: 23) | 50 | 50 | 10 | 30 | 75 |
| | Methoxypolyethylene glycol monomethacrylate 3 (number of added moles of EO: 90) | | | | | |
| | Polyethylene glycol monomethacrylate (number of added moles of EO: 8) | | | | | |
| PO chain-containing ethylenically unsaturated monomer | Polypropylene glycol monomethacrylate 1 (number of added moles of PO: 9) | | | | | |
| | Polypropylene glycol monomethacrylate 2 (number of added moles of PO: 13) | | | | | |
| Aromatic ethylenically unsaturated monomer | Styrene | 20 | 20 | 20 | 20 | 18 |
| Other ethylenically unsaturated monomer | Methyl methacrylate | | | 68 | 48 | 5 |
| | Ethyl methacrylate | | | | | |
| | n-butyl methacrylate | 28 | | | | |
| | Lauryl methacrylate | | 28 | | | |
| Total | | 100 | 100 | 100 | 100 | 100 |
| Content of EO structure | | 45.6 | 45.6 | 9.1 | 27.4 | 68.4 |
| Content of PO structure | | 0 | 0 | 0 | 0 | 0 |
| Acid value [mgKOH/g] | | 15.6 | 15.6 | 15.6 | 15.6 | 15.6 |
| Weight average molecular weight | | 15000 | 15000 | 13000 | 14000 | 17000 |

| | | Production Example 24 AcB12 | Production Example 25 AcB13 | Production Example 26 AcB14 | Production Example 27 AcB15 | Production Example 28 AcB16 |
|---|---|---|---|---|---|---|
| Acid group-containing ethylenically unsaturated monomer | Acrylic acid | 2 | 2 | 2 | 2 | 2 |
| | Methacrylic acid | | | | | |
| EO chain-containing ethylenically unsaturated monomer | Methoxypolyethylene glycol monoacrylate (number of added moles of EO: 9) | | | 50 | | |
| | Methoxy polyethylene glycol monomethacrylate 1 (number of added moles of EO: 9) | | | | 50 | |
| | Methoxypolyethylene glycol monomethacrylate 2 (number of added moles of EO: 23) | 40 | 40 | | | |
| | Methoxypolyethylene glycol monomethacrylate 3 (number of added moles of EO: 90) | | | | | 50 |
| | Polyethylene glycol monomethacrylate (number of added moles of EO: 8) | | | | | |
| PO chain-containing ethylenically unsaturated monomer | Polypropylene glycol monomethacrylate 1 (number of added moles of PO: 9) | 10 | | | | |
| | Polypropylene glycol monomethacrylate 2 (number of added moles of PO: 13) | | 10 | | | |
| Aromatic ethylenically unsaturated monomer | Styrene | 20 | 20 | 20 | 20 | 20 |
| Other ethylenically unsaturated monomer | Methyl methacrylate | 28 | 28 | 28 | 28 | 28 |
| | Ethyl methacrylate | | | | | |
| | n-butyl methacrylate | | | | | |
| | Lauryl methacrylate | | | | | |
| Total | | 100 | 100 | 100 | 100 | 100 |

TABLE III-2-continued

| | | | | | | |
|---|---|---|---|---|---|---|
| Content of EO structure | | 36.5 | 36.5 | 49.5 | 39.9 | 48.3 |
| Content of PO structure | | 6.5 | 6.8 | 0 | 0 | 0 |
| Acid value [mgKOH/g] | | 15.6 | 15.6 | 15.6 | 15.6 | 15.6 |
| Weight average molecular weight | | 15000 | 15000 | 15000 | 15000 | 25000 |

| | | Production Example 29 AcB17 | Production Example 30 AcB18 | Production Example 31 AcB19 | Production Example 32 AcB20 |
|---|---|---|---|---|---|
| Acid group-containing ethylenically unsaturated monomer | Acrylic acid | 2 | 1 | 2 | 2 |
| | Methacrylic acid | | | | |
| EO chain-containing ethylenically unsaturated monomer | Methoxypolyethylene glycol monoacrylate (number of added moles of EO: 9) | | | | |
| | Methoxy polyethylene glycol monomethacrylate 1 (number of added moles of EO: 9) | | | | |
| | Methoxypolyethylene glycol monomethacrylate 2 (number of added moles of EO: 23) | | 50 | 10 | 75 |
| | Methoxypolyethylene glycol monomethacrylate 3 (number of added moles of EO: 90) | | | | |
| | Polyethylene glycol monomethacrylate (number of added moles of EO: 8) | 50 | | | |
| PO chain-containing ethylenically unsaturated monomer | Polypropylene glycol monomethacrylate 1 (number of added moles of PO: 9) | | | | |
| | Polypropylene glycol monomethacrylate 2 (number of added moles of PO: 13) | | | | |
| Aromatic ethylenically unsaturated monomer | Styrene | 20 | | | |
| Other ethylenically unsaturated monomer | Methyl methacrylate | 28 | 29 | 48 | 13 |
| | Ethyl methacrylate | | 20 | | |
| | n-butyl methacrylate | | | 40 | 10 |
| | Lauryl methacrylate | | | | |
| Total | | 100 | 100 | 100 | 100 |
| Content of EO structure | | 40.1 | 45.6 | 9.1 | 68.4 |
| Content of PO structure | | 0 | 0 | 0 | 0 |
| Acid value [mgKOH/g] | | 15.6 | 7.8 | 15.6 | 15.6 |
| Weight average molecular weight | | 15000 | 15000 | 13000 | 17000 |

| | | Production Example 33 AcB21 | Production Example 34 AcB22 | Production Example 35 AcB23 | Production Example 36 AcB24 | Production Example 37 AcB25 | Production Example 38 AcB26 |
|---|---|---|---|---|---|---|---|
| Acid group-containing ethylenically unsaturated monomer | Acrylic acid | 2 | 2 | 2 | | 6 | 2 |
| | Methacrylic acid | | | | | | |
| EO chain-containing ethylenically unsaturated monomer | Methoxypolyethylene glycol monoacrylate (number of added moles of EO: 9) | | 50 | | | | |
| | Methoxy polyethylene glycol monomethacrylate 1 (number of added moles of EO: 9) | | | | | | |
| | Methoxypolyethylene glycol monomethacrylate 2 (number of added moles of EO: 23) | 40 | | | 50 | 50 | |
| | Methoxypolyethylene glycol monomethacrylate 3 (number of added moles of EO: 90) | | | 50 | | | |
| | Polyethylene glycol monomethacrylate (number of added moles of EO: 8) | | | | | | |
| PO chain-containing ethylenically unsaturated monomer | Polypropylene glycol monomethacrylate 1 (number of added moles of PO: 9) | 10 | | | | | |
| | Polypropylene glycol monomethacrylate 2 (number of added moles of PO: 13) | | | | | | |
| Aromatic ethylenically unsaturated monomer | Styrene | | | | 20 | 20 | 45 |
| Other ethylenically unsaturated monomer | Methyl methacrylate | 28 | 28 | 28 | 30 | 24 | 53 |
| | Ethyl methacrylate | | | | | | |
| | n-butyl methacrylate | 20 | 20 | 20 | | | |
| | Lauryl methacrylate | | | | | | |
| Total | | 100 | 100 | 100 | 100 | 100 | 100 |
| Content of EO structure | | 36.5 | 49.5 | 48.3 | 45.6 | 45.6 | 0 |
| Content of PO structure | | 6.5 | 0 | 0 | 0 | 0 | 0 |
| Acid value [mgKOH/g] | | 15.6 | 15.6 | 15.6 | 0.0 | 46.7 | 15.6 |
| Weight average molecular weight | | 15000 | 15000 | 25000 | 15000 | 15000 | 15000 |

TABLE III-2-continued

|  |  | Production Example 39 AcB27 | Production Example 40 AcB28 | Production Example 41 AcB29 | Production Example 42 AcB30 |
|---|---|---|---|---|---|
| Acid group-containing ethylenically unsaturated monomer | Acrylic acid<br>Methacrylic acid | 2 | 2 |  | 6 |
| EO chain-containing ethylenically unsaturated monomer | Methoxypolyethylene glycol monoacrylate (number of added moles of EO: 9)<br>Methoxy polyethylene glycol monomethacrylate 1 (number of added moles of EO: 9)<br>Methoxypolyethylene glycol monomethacrylate 2 (number of added moles of EO: 23)<br>Methoxypolyethylene glycol monomethacrylate 3 (number of added moles of EO: 90)<br>Polyethylene glycol monomethacrylate (number of added moles of EO: 8) |  |  | 50 | 50 |
| PO chain-containing ethylenically unsaturated monomer | Polypropylene glycol monomethacrylate 1 (number of added moles of PO: 9)<br>Polypropylene glycol monomethacrylate 2 (number of added moles of PO: 13) | 50 | 50 |  |  |
| Aromatic ethylenically unsaturated monomer | Styrene | 20 | 20 |  |  |
| Other ethylenically unsaturated monomer | Methyl methacrylate<br>Ethyl methacrylate<br>n-butyl methacrylate<br>Lauryl methacrylate | 28 | 28 | 30<br><br>20 | 24<br><br>20 |
| Total |  | 100 | 100 | 100 | 100 |
| Content of EO structure |  | 0 | 0 | 45.6 | 45.6 |
| Content of PO structure |  | 32.5 | 34.0 | 0 | 0 |
| Acid value [mgKOH/g] |  | 15.6 | 15.6 | 0 | 46.7 |
| Weight average molecular weight |  | 15000 | 15000 | 15000 | 15000 |

Table III-2 also describes the content of the EO structure, the content of the PO structure, and the acid value in each of the water-soluble (meth)acrylic resins 1 to 30, calculated by the methods described above, and the weight average molecular weight of each of the water-soluble (meth)acrylic resins 1 to 30 measured by the above-described device.

Production Example 43: Production of Water-Soluble Styrene-Maleic Acid (Anhydride) Resin 1 (SMAB1)

A reaction vessel equipped with a gas inlet tube, a thermometer, a condenser, and a stirrer was charged with 9 parts of styrene-maleic anhydride resin 1 (constituent monomer ratio: styrene/maleic acid=1/1, weight-average molecular weight: 5500), 91 parts of polyoxyethylene monomethyl ether having a number of moles of EO added of 45, and 20 parts of xylene in this order, after which the contents were heated to 80° C. while stirring, and then maintained at that temperature for 4 hours to cause an esterification reaction. Subsequently, xylene was completely removed by drying to obtain a water-soluble styrene-maleic acid (anhydride) resin 1 (SMAB1) as a solid. The content of the EO structure in the water-soluble styrene-maleic acid (anhydride) resin 1 calculated by the method described above was 89.9%, and the acid value was 25.5 mgKOH/g. The weight average molecular weight of the water-soluble styrene-maleic acid (anhydride) resin 1 measured by the same method as in the case of the water-soluble (meth)acrylic resin 1 was 15000.

Production Examples 44 to 61: Production of Water-Soluble Styrene-Maleic Acid (Anhydride) Resins 2 to 19 (SMAB2 to SMAB19)

Water-soluble styrene-maleic acid (anhydride) resins 2 to 19 (SMAB2 to SMAB19), which were each a solid, were obtained through synthesis by the same operations as that of the water-soluble styrene-maleic acid (anhydride) resin 1 (SMAB1) with the exception that the types and charging amounts of the raw materials charged into the reaction vessel were changed as described in Table III-3.

TABLE III-3

|  |  | Production Example 43 SMAB1 | Production Example 44 SMAB2 | Production Example 45 SMAB3 | Production Example 46 SMAB4 | Production Example 47 SMAB5 | Production Example 48 SMAB6 |
|---|---|---|---|---|---|---|---|
| Styrene-maleic anhydride resin | Styrene-maleic anhydride resin 1 (styrene:maleic acid = 1:1, weight average molecular weight: 5500)<br>Styrene-maleic anhydride resin 2 (styrene:maleic acid = 2:1, weight average molecular weight: 7500)<br>Styrene-maleic anhydride resin 3 (styrene:maleic acid = 3:1, weight average | 9 | 5 | 6 | 6 | 6 | 6 |

TABLE III-3-continued

| | | | | | | | |
|---|---|---|---|---|---|---|---|
| | molecular weight: 9500) | | | | | | |
| | Styrene-maleic anhydride resin 4 (styrene:maleic acid = 6:1, weight average molecular weight: 11500) | | | | | | |
| EO chain-containing alkyl ether | Polyoxyethylene monomethyl ether 1 (number of added moles of EO: 45) | 91 | | | | | |
| | Polyoxyethylene monomethyl ether 2 (number of added moles of EO: 90) | | 95 | 94 | 58 | 58 | 69 |
| PO chain-containing alkyl ether | Polyoxypropylene butyl ether 1 (number of added moles of PO: 40) | | | | 36 | | 25 |
| | Polyoxypropylene butyl ether 2 (number of added moles of PO: 52) | | | | | 36 | |
| EO/PO chain-containing alkyl ether | Polyoxyethylene polyoxypropylene butyl ether 1 (number of added moles of EO: 17, number of added moles of PO: 17) | | | | | | |
| | Polyoxyethylene polyoxypropylene butyl ether 2 (number of added moles of EO: 30, number of added moles of PO: 30) | | | | | | |
| Total | | 100 | 100 | 100 | 100 | 100 | 100 |
| Content of EO structure | | 89.9 | 94.1 | 93.1 | 57.4 | 57.4 | 68.3 |
| Content of PO structure | | 0 | 0 | 0 | 34.9 | 35.4 | 24.3 |
| Acid value [mgKOH/g] | | 25.5 | 27.7 | 20.1 | 16.7 | 18.6 | 17.7 |
| Weight average molecular weight | | 15000 | 18000 | 18000 | 15000 | 17000 | 17000 |

| | | Production Example 49 SMAB7 | Production Example 50 SMAB8 | Production Example 51 SMAB9 | Production Example 52 SMAB10 |
|---|---|---|---|---|---|
| Styrene-maleic anhydride resin | Styrene-maleic anhydride resin 1 (styrene:maleic acid = 1:1, weight average molecular weight: 5500) | 6 | 6 | 6 | 6 |
| | Styrene-maleic anhydride resin 2 (styrene:maleic acid = 2:1, weight average molecular weight: 7500) | | | | |
| | Styrene-maleic anhydride resin 3 (styrene:maleic acid = 3:1, weight average molecular weight: 9500) | | | | |
| | Styrene-maleic anhydride resin 4 (styrene:maleic acid = 6:1, weight average molecular weight: 11500) | | | | |
| EO chain-containing alkyl ether | Polyoxyethylene monomethyl ether 1 (number of added moles of EO: 45) | | | | |
| | Polyoxyethylene monomethyl ether 2 (number of added moles of EO: 90) | 46 | 86 | 32 | 24 |
| PO chain-containing alkyl ether | Polyoxypropylene butyl ether 1 (number of added moles of PO: 40) | 48 | 8 | 62 | 70 |
| | Polyoxypropylene butyl ether 2 (number of added moles of PO: 52) | | | | |
| EO/PO chain-containing alkyl ether | Polyoxyethylene polyoxypropylene butyl ether 1 (number of added moles of EO: 17, number of added moles of PO: 17) | | | | |
| | Polyoxyethylene polyoxypropylene butyl ether 2 (number of added moles of EO: 30, number of added moles of PO: 30) | | | | |
| Total | | 100 | 100 | 100 | 100 |
| Content of EO structure | | 45.5 | 85.1 | 31.7 | 23.8 |
| Content of PO structure | | 46.6 | 7.8 | 60.2 | 67.9 |
| Acid value [mgKOH/g] | | 15.6 | 19.4 | 17.5 | 17.1 |
| Weight average molecular weight | | 17000 | 16500 | 18000 | 17000 |

| | | Production Example 53 SMAB11 | Production Example 54 SMAB12 | Production Example 55 SMAB13 | Production Example 56 SMAB14 | Production Example 57 SMAB15 |
|---|---|---|---|---|---|---|
| Styrene-maleic anhydride resin | Styrene-maleic anhydride resin 1 (styrene:maleic acid = 1:1, weight average molecular weight: 5500) | 9 | 6 | | | |
| | Styrene-maleic anhydride resin 2 (styrene:maleic acid = 2:1, weight average molecular weight: 7500) | | | 8 | | |
| | Styrene-maleic anhydride resin 3 (styrene:maleic acid = 3:1, weight average molecular weight: 9500) | | | | 10 | |

TABLE III-3-continued

| | | | | | | |
|---|---|---|---|---|---|---|
| | Styrene-maleic anhydride resin 4 (styrene:maleic acid = 6:1, weight average molecular weight: 11500) | | | | | 16 |
| EO chain-containing alkyl ether | Polyoxyethylene monomethyl ether 1 (number of added moles of EO: 45) | | | | | |
| | Polyoxyethylene monomethyl ether 2 (number of added moles of EO: 90) | | | 92 | 90 | 84 |
| PO chain-containing alkyl ether | Polyoxypropylene butyl ether 1 (number of added moles of PO: 40) | | | | | |
| | Polyoxypropylene butyl ether 2 (number of added moles of PO: 52) | | | | | |
| EO/PO chain-containing alkyl ether | Polyoxyethylene polyoxypropylene butyl ether 1 (number of added moles of EO: 17, number of added moles of PO: 17) | 91 | | | | |
| | Polyoxyethylene polyoxypropylene butyl ether 2 (number of added moles of EO: 30, number of added moles of PO: 30) | | 94 | | | |
| Total | | 100 | 100 | 100 | 100 | 100 |
| Content of EO structure | | 34.0 | 41.4 | 91.1 | 89.1 | 83.2 |
| Content of PO structure | | 44.8 | 54.5 | 0 | 0 | 0 |
| Acid value [mgKOH/g] | | 25.5 | 15.7 | 16.4 | 14.7 | 13.1 |
| Weight average molecular weight | | 15000 | 16000 | 15000 | 15000 | 15000 |

| | | Production Example 58 SMAB16 | Production Example 59 SMAB17 | Production Example 60 SMAB18 | Production Example 61 SMAB19 |
|---|---|---|---|---|---|
| Styrene-maleic anhydride resin | Styrene-maleic anhydride resin 1 (styrene:maleic acid = 1:1, weight average molecular weight: 5500) | 12 | 15 | 8 | 8 |
| | Styrene-maleic anhydride resin 2 (styrene:maleic acid = 2:1, weight average molecular weight: 7500) | | | | |
| | Styrene-maleic anhydride resin 3 (styrene:maleic acid = 3:1, weight average molecular weight: 9500) | | | | |
| | Styrene-maleic anhydride resin 4 (styrene:maleic acid = 6:1, weight average molecular weight: 11500) | | | | |
| EO chain-containing alkyl ether | Polyoxyethylene monomethyl ether 1 (number of added moles of EO: 45) | 88 | | | |
| | Polyoxyethylene monomethyl ether 2 (number of added moles of EO: 90) | | 85 | | |
| PO chain-containing alkyl ether | Polyoxypropylene butyl ether 1 (number of added moles of PO: 40) | | | 92 | |
| | Polyoxypropylene butyl ether 2 (number of added moles of PO: 52) | | | | 92 |
| EO/PO chain-containing alkyl ether | Polyoxyethylene polyoxypropylene butyl ether 1 (number of added moles of EO: 17, number of added moles of PO: 17) | | | | |
| | Polyoxyethylene polyoxypropylene butyl ether 2 (number of added moles of EO: 30, number of added moles of PO: 30) | | | | |
| Total | | 100 | 100 | 100 | 100 |
| Content of EO structure | | 87.1 | 84.2 | 0 | 0 |
| Content of PO structure | | 0 | 0 | 89.3 | 90.4 |
| Acid value [mgKOH/g] | | 41.9 | 41.6 | 22.8 | 27.6 |
| Weight average molecular weight | | 15000 | 15000 | 15000 | 15000 |

Table III-3 also describes the content of the EO structure, the content of the PO structure, and the acid value in each of the water-soluble styrene-maleic acid (anhydride) resins 1 to 19, calculated by the methods described above, and the weight average molecular weight of each of the water-soluble styrene-maleic acid (anhydride) resins 1 to 19 measured by the above-described device.

Production Example 62: Production of Water-Soluble α-Olefin-Maleic Acid (Anhydride) Resin 1 (OMAB1)

A reaction vessel equipped with a gas inlet tube, a thermometer, a condenser and a stirrer was charged with 59 parts of 1-decene and 41 parts of maleic anhydride, after which 10 parts of xylene and 0.6 part of octyl thioglycolate as a chain transfer agent were further added thereto. The inside of the reaction vessel was then sufficiently purged with nitrogen, after which the temperature was increased while stirring until the internal temperature reached 130° C. Next, while the contents were stirred, a mixture of 1.0 part of t-butylperoxy-2-ethylhexanoate as a radical polymerization initiator and 20 parts of xylene was added dropwise to the reaction vessel over 2 hours.

Subsequently, while the internal temperature was maintained at 130° C., stirring was further continued for 1 hour to cause a polymerization reaction. After 1 hour, the polymerization conversion rate in the reaction vessel was confirmed to be 95% or higher, after which the internal temperature was reduced to 60° C. or lower, and a mixed solution containing an α-olefin-maleic acid (anhydride) precursor resin was obtained. Subsequently, 14.5 parts of the mixed solution (11 parts as the α-olefin-maleic acid (anhydride) precursor resin) was transferred to another reaction vessel equipped with a gas inlet tube, a thermometer, a condenser, and a stirrer, and 89 parts of polyoxyethylene monomethyl ether and 0.01 parts of diazabicycloundecene as a catalyst were further added thereto, after which the temperature inside the reaction vessel was increased to 80° C. while the contents were stirred, and then maintained at that temperature for 4 hours to cause an esterification reaction. Xylene was then completely removed by drying to obtain a solid water-soluble α-olefin-maleic acid (anhydride) resin 1 (OMAB1).

The content of the EO structure in the water-soluble α-olefin-maleic acid (anhydride) resin 1 calculated by the method described above was 88.1%, and the acid value was 26.8 mgKOH/g. The weight average molecular weight of the water-soluble α-olefin-maleic acid (anhydride) resin 1 measured by the same method as in the case of the water-soluble (meth)acrylic resin 1 was 16000.

Production Examples 63 to 73: Production of Water-Soluble α-Olefin-Maleic Acid (Anhydride) Resins 2 to 12 (OMAB2 to OMAB12)

Respective α-olefin-maleic acid (anhydride) precursor resins were produced by carrying out synthesis by the same operations as that of the water-soluble α-olefin-maleic acid (anhydride) resin 1 (OMAB1) with the exception that the types and amounts of the raw materials initially added to the reaction vessel were changed as described in the upper part of Table III-4. Subsequently, water-soluble α-olefin-maleic acid (anhydride) resins 2 to 12 (OMAB2 to OMAB12), each of which was a solid, were obtained by the same method as in the case of the water-soluble α-olefin-maleic acid (anhydride) resin 1 described above with the exception that a certain amount of the obtained α-olefin-maleic acid (anhydride) precursor resin was used, and the charging amounts of the raw materials were changed as described in the lower part of Table 4.

The addition amount of the "α-olefin-maleic acid (anhydride) precursor resin produced according to description of upper part of this table" described in the lower part of Table III-4 is not the addition amount of the mixed solution but a value converted to the addition amount of the α-olefin-maleic acid (anhydride) precursor resin. In addition, in order to adjust the weight average molecular weight in the production of the water-soluble α-olefin-maleic acid (anhydride) resins 61 to 71, the addition amounts of the radical polymerization initiator (t-butylperoxy-2-ethylhexanoate) and the chain transfer agent (octyl thioglycolate) were finely adjusted as appropriate.

TABLE III-4

| | | | Production Example 62 OMAB1 | Production Example 63 OMAB2 | Production Example 64 OMAB3 | Production Example 65 OMAB4 | Production Example 66 OMAB5 | Production Example 67 OMAB6 |
|---|---|---|---|---|---|---|---|---|
| Type and amount of α-olefin-maleic acid (anhydride) precursor resin | 1-decene | | 59 | 59 | 59 | 59 | 59 | 59 |
| | 1-hexadecene | | | | | | | |
| | Maleic anhydride | | 41 | 41 | 41 | 41 | 41 | 41 |
| | Total | | 100 | 100 | 100 | 100 | 100 | 100 |
| Type and amount of water-soluble α-olefin-maleic acid (anhydride) resin | α-olefin-maleic acid (anhydride) precursor resin produced according to description of upper part of this table (addition amount of precursor resin) | | 11 | 6 | 8 | 7 | 7 | 11 |
| | EO chain-containing alkyl ether | Polyoxyethylene monomethyl ether 1 (number of added moles of EO: 45) | 89 | | | | | |
| | | Polyoxyethylene monomethyl ether 2 (number of added moles of EO: 90) | | 94 | 92 | 57 | 57 | |
| | PO chain-containing alkyl ether | Polyoxypropylene butyl ether 1 (number of added moles of PO: 40) | | | | 36 | | |
| | | Polyoxypropylene butyl ether 2 (number of added moles of PO: 52) | | | | | 36 | |
| | EO/PO chain-containing alkyl ether | Polyoxyethylene polyoxypropylene butyl ether 1 (number of added moles of EO: 17, number of added moles of PO: 17) | | | | | | 89 |
| | | Polyoxyethylene polyoxypropylene butyl ether 2 (number of added moles of EO: 30, number of added moles of PO: 30) | | | | | | |
| | Total | | 100 | 100 | 100 | 100 | 100 | 100 |
| Specifications of water-soluble α-olefin-maleic acid (anhydride) resin | Content of EO structure | | 88.1 | 93.1 | 91.1 | 56.4 | 56.4 | 33.3 |
| | Content of PO structure | | 0 | 0 | 0 | 34.9 | 35.4 | 43.9 |
| | Acid value [mgKOH/g] | | 26.8 | 15.1 | 24.8 | 16.5 | 18.4 | 26.8 |
| | Weight average molecular weight | | 16000 | 18000 | 18000 | 18000 | 18000 | 16000 |

TABLE III-4-continued

|  |  | Production Example 68 OMAB7 | Production Example 69 OMAB8 | Production Example 70 OMAB9 | Production Example 71 OMAB10 | Production Example 72 OMAB11 | Production Example 73 OMAB12 |
|---|---|---|---|---|---|---|---|
| Type and amount of α-olefin-maleic acid (anhydride) precursor resin | 1-decene | 59 |  | 59 | 59 | 59 | 59 |
|  | 1-hexadecene |  | 70 |  |  |  |  |
|  | Maleic anhydride | 41 | 30 | 41 | 41 | 41 | 41 |
|  | Total | 100 | 100 | 100 | 100 | 100 | 100 |
| Type and amount of water-soluble α-olefin-maleic acid (anhydride) resin | α-olefin-maleic acid (anhydride) precursor resin produced according to description of upper part of this table (addition amount of precursor resin) | 8 | 8 | 15 | 13 | 10 | 9 |
|  | EO chain-containing alkyl ether — Polyoxyethylene monomethyl ether 1 (number of added moles of EO: 45) |  |  |  | 85 |  |  |
|  | Polyoxyethylene monomethyl ether 2 (number of added moles of EO: 90) |  | 92 |  |  | 87 |  |
|  | PO chain-containing alkyl ether — Polyoxypropylene butyl ether 1 (number of added moles of PO: 40) |  |  |  |  | 90 |  |
|  | Polyoxypropylene butyl ether 2 (number of added moles of PO: 52) |  |  |  |  |  | 91 |
|  | EO/PO chain-containing alkyl ether — Polyoxyethylene polyoxypropylene butyl ether 1 (number of added moles of EO: 17, number of added moles of PO: 17) |  |  |  |  |  |  |
|  | Polyoxyethylene polyoxypropylene butyl ether 2 (number of added moles of EO: 30, number of added moles of PO: 30) | 92 |  |  |  |  |  |
|  | Total | 100 | 100 | 100 | 100 | 100 | 100 |
| Specifications of water-soluble α-olefin-maleic acid (anhydride) resin | Content of EO structure | 40.5 | 91.1 | 84.2 | 86.1 | 0 | 0 |
|  | Content of PO structure | 53.4 | 0 | 0 | 0 | 87.4 | 89.4 |
|  | Acid value [mgKOH/g] | 20.5 | 14.9 | 46.8 | 49.0 | 26.0 | 25.7 |
|  | Weight average molecular weight | 17000 | 18000 | 16000 | 18000 | 16000 | 17000 |

Table III-4 also describes the content of the EO structure, the content of the PO structure, and the acid value in each of the water-soluble α-olefin-maleic acid (anhydride) resins 1 to 12, calculated by the methods described above, and the weight average molecular weight of each of the water-soluble α-olefin-maleic acid (anhydride) resins 60 to 71 measured by the device described above.

<3> Production of Pretreatment Liquid

Production Examples of Pretreatment Liquids III-1 to III-112

Prior to production of the pretreatment liquid, the materials described in each row of Table III-5 were charged into a respective mixing vessel equipped with a stirrer and stirred and mixed at room temperature (25° C.) for 1 hour to produce pre-pretreatment liquids III-1 to III-17. Next, the pre-pretreatment liquid, the aqueous dispersion of the resin particles, the water-soluble resin (the aqueous solution thereof), and the ion-exchanged water described in each column of Table III-6 were charged at the amounts described in Table III-6 into a mixing vessel equipped with a stirrer, stirred and mixed at room temperature (25° C.) for 1 hour, and then heated until the temperature of the mixture reached 50° C., and were then further stirred and mixed for 1 hour. The mixture was then cooled to room temperature, and then filtered with a nylon mesh having a pore diameter of 100 μm to produce pretreatment liquids III-1 to III-112.

TABLE III-5

| Pre-Pretreatment Liquid No. |  |  | III-1 | III-2 | III-3 | III-4 | III-5 | III-6 | III-7 | III-8 | III-9 |
|---|---|---|---|---|---|---|---|---|---|---|---|
| Calcium salt of carboxylic acid | Calcium formate | Solubility = 17 | 3 | 5 |  |  |  |  |  |  |  |
|  | Calcium acetate | Solubility = 28 |  |  | 5 |  |  |  | 3 |  |  |
|  | Calciumpropionate | Solubility = 38 |  |  |  | 5 |  |  |  |  |  |
|  | Calcium pantothenate | Solubility = 35 |  |  |  |  | 7.5 |  |  | 3 | 4 |
|  | Calcium lactate | Solubility = 3 | 2 |  |  |  |  | 3.5 | 2 | 2 | 2 |
| Water soluble organic solvent (B) | IPA |  | 5 | 5 | 5 | 5 | 5 | 5 | 5 | 5 | 5 |
| Surfactant (C) | SF440 |  | 1 | 1 | 1 | 1 | 1 | 1 | 1 | 1 | 1 |
|  | Proxel GXL |  | 0.05 | 0.05 | 0.05 | 0.05 | 0.05 | 0.05 | 0.05 | 0.05 | 0.05 |
|  | Ion-exchanged water |  | 23.95 | 23.95 | 23.95 | 23.95 | 21.45 | 25.45 | 23.95 | 23.95 | 22.95 |

| Pre-Pretreatment Liquid No. |  |  | III-10 | III-11 | III-12 | III-13 | III-14 | III-15 | III-16 | III-17 |
|---|---|---|---|---|---|---|---|---|---|---|
| Calcium salt of carboxylic acid | Calcium formate | Solubility = 17 | 3 | 4 | 3 | 1 | 2 | 3 | 5 | 9 |
|  | Calcium acetate | Solubility = 28 |  |  |  |  |  |  |  |  |

TABLE III-5-continued

|  |  |  |  |  |  |  |  |  |  |  |
|---|---|---|---|---|---|---|---|---|---|---|
|  | Calcium propionate | Solubility = 38 |  |  |  | 2 |  |  |  |  |
|  | Calcium pantothenate | Solubility = 35 | 2 |  |  |  |  |  |  |  |
|  | Calcium lactate | Solubility = 3 |  | 1 |  | 0.5 | 1 | 3 | 3 | 6 |
| Water soluble organic solvent (B) | IPA |  | 5 | 5 | 5 | 5 | 5 | 5 | 5 | 5 |
| Surfactant (C) | SF440 |  | 1 | 1 | 1 | 1 | 1 | 1 | 1 | 1 |
|  | Proxel GXL |  | 0.05 | 0.05 | 0.05 | 0.05 | 0.05 | 0.05 | 0.05 | 0.05 |
|  | Ion-exchanged water |  | 23.95 | 23.95 | 23.95 | 27.45 | 25.95 | 22.95 | 20.95 | 13.95 |

TABLE III-6

| Examples/Comparative Examples | Pretreatment Liquid | Pre-pretreatment liquid No. | Pre-pretreatment liquid Amount | Constitution of pretreatment liquid used for evaluation Aqueous dispersion of resin particles Type | Nv | Amount | Water-soluble resin (aqueous solution thereof) Type | Nv | Amount | Ion-exchanged water Amount | Specifications R (Amount of resin particles) | DW (Amount of water-soluble resin) | C (Amount of calcium ions in millimoles) | R/DW | R/C |
|---|---|---|---|---|---|---|---|---|---|---|---|---|---|---|---|
| Example III-1 | III-1 | 1 | 35 | Ac1 / E-6400 | 30% / 35% | 25 / 2.9 | BYK-190 | 40% | 4 | 33.1 | 8.5 | 1.6 | 32.2 | 5.3 | 0.26 |
| Example III-2 | III-2 | 1 | 35 | Ac2 / E-6400 | 30% / 35% | 25 / 2.9 | BYK-190 | 40% | 4 | 33.1 | 8.5 | 1.6 | 32.2 | 5.3 | 0.26 |
| Example III-3 | III-3 | 1 | 35 | Ac3 / E-6400 | 30% / 35% | 25 / 2.9 | BYK-190 | 40% | 4 | 33.1 | 8.5 | 1.6 | 32.2 | 5.3 | 0.26 |
| Example III-4 | III-4 | 1 | 35 | Ac4 / E-6400 | 30% / 35% | 25 / 2.9 | BYK-190 | 40% | 4 | 33.1 | 8.5 | 1.6 | 32.2 | 5.3 | 0.26 |
| Example III-5 | III-5 | 1 | 35 | Ac5 / E-6400 | 30% / 35% | 25 / 2.9 | BYK-190 | 40% | 4 | 33.1 | 8.5 | 1.6 | 32.2 | 5.3 | 0.26 |
| Example III-6 | III-6 | 1 | 35 | Ac6 / E-6400 | 30% / 35% | 25 / 2.9 | BYK-190 | 40% | 4 | 33.1 | 8.5 | 1.6 | 32.2 | 5.3 | 0.26 |
| Example III-7 | III-7 | 1 | 35 | Ac7 / E-6400 | 30% / 35% | 25 / 2.9 | BYK-190 | 40% | 4 | 33.1 | 8.5 | 1.6 | 32.2 | 5.3 | 0.26 |
| Example III-8 | III-8 | 1 | 35 | Ac8 / E-6400 | 30% / 35% | 25 / 2.9 | BYK-190 | 40% | 4 | 33.1 | 8.5 | 1.6 | 32.2 | 5.3 | 0.26 |
| Example III-9 | III-9 | 1 | 35 | Ac9 / E-6400 | 30% / 35% | 25 / 2.9 | BYK-190 | 40% | 4 | 33.1 | 8.5 | 1.6 | 32.2 | 5.3 | 0.26 |
| Example III-10 | III-10 | 1 | 35 | Ac10 / E-6400 | 30% / 35% | 25 / 2.9 | BYK-190 | 40% | 4 | 33.1 | 8.5 | 1.6 | 32.2 | 5.3 | 0.26 |
| Example III-11 | III-11 | 1 | 35 | XK-188 / E-6400 | 44.5% / 35% | 17.2 / 2.9 | BYK-190 | 40% | 4 | 40.9 | 8.7 | 1.6 | 32.2 | 5.4 | 0.27 |
| Example III-12 | III-12 | 1 | 35 | XK-190 / E-6400 | 45% / 35% | 17 / 2.9 | BYK-190 | 40% | 4 | 41.1 | 8.7 | 1.6 | 32.2 | 5.4 | 0.27 |
| Example III-13 | III-13 | 1 | 35 | Ac7 / Ac8 / E-6400 | 30% / 30% / 35% | 12.7 / 12.7 / 2.9 | BYK-190 | 40% | 4 | 32.7 | 8.6 | 1.6 | 32.2 | 5.4 | 0.27 |
| Example III-14 | III-14 | 1 | 35 | Ac7 / Ac10 / E-6400 | 30% / 30% / 35% | 12.7 / 12.7 / 2.9 | BYK-190 | 40% | 4 | 32.7 | 8.6 | 1.6 | 32.2 | 5.4 | 0.27 |
| Comparative Example III-1 | III-15 | 1 | 35 | Ac7 / Ac10 / E-6400 | 30% / 30% / 35% | 12.7 / 12.7 / 2.9 | — | | | 36.7 | 8.6 | 0 | 32.2 | — | 0.27 |
| Comparative Example III-2 | III-16 | 1 | 35 | Ac7 / Ac10 / E-6400 | 30% / 30% / 35% | 12.7 / 12.7 / 2.9 | BYK-190 | 40% | 1 | 35.7 | 8.6 | 0.4 | 32.2 | 21.6 | 0.27 |
| Example III-15 | III-17 | 1 | 35 | Ac7 / Ac10 / E-6400 | 30% / 30% / 35% | 12.7 / 12.7 / 2.9 | BYK-190 | 40% | 1.5 | 35.2 | 8.6 | 0.6 | 32.2 | 14.4 | 0.27 |
| Example III-16 | III-18 | 1 | 35 | Ac7 / Ac10 / E-6400 | 30% / 30% / 35% | 12.7 / 12.7 / 2.9 | BYK-190 | 40% | 2 | 34.7 | 8.6 | 0.8 | 32.2 | 10.8 | 0.27 |

TABLE III-6-continued

| Examples/Comparative Examples | Pretreatment Liquid | Pre-pretreatment liquid No. | Pre-pretreatment liquid Amount | Aqueous dispersion of resin particles Type | Aqueous dispersion of resin particles Nv | Aqueous dispersion of resin particles Amount | Water-soluble resin (aqueous solution thereof) Type | Water-soluble resin (aqueous solution thereof) Nv | Water-soluble resin (aqueous solution thereof) Amount | Ion-exchanged water Amount | R (Amount of resin particles) | DW (Amount of water-soluble resin) | C (Amount of calcium ions in millimoles) | R/DW | R/C |
|---|---|---|---|---|---|---|---|---|---|---|---|---|---|---|---|
| Example III-17 | III-19 | 1 | 35 | Ac7 / Ac10 / E-6400 | 30% / 30% / 35% | 12.7 / 12.7 / 2.9 | BYK-190 | 40% | 6 | 30.7 | 8.6 | 2.4 | 32.2 | 3.6 | 0.27 |
| Comparative Example III-3 | III-20 | 1 | 35 | Ac7 / Ac10 / E-6400 | 30% / 30% / 35% | 12.7 / 12.7 / 2.9 | BYK-190 | 40% | 8 | 28.7 | 8.6 | 3.2 | 32.2 | 2.7 | 0.27 |
| Example III-18 | III-21 | 1 | 35 | Ac7 / Ac10 / E-6400 | 30% / 30% / 35% | 12.7 / 12.7 / 2.9 | BYK-2015 | 40% | 4 | 32.7 | 8.6 | 1.6 | 32.2 | 5.4 | 0.27 |
| Example III-19 | III-22 | 1 | 35 | Ac7 / Ac10 / E-6400 | 30% / 30% / 35% | 12.7 / 12.7 / 2.9 | TEGO Dispers 750W | 40% | 4 | 32.7 | 8.6 | 1.6 | 32.2 | 5.4 | 0.27 |
| Example III-20 | III-23 | 1 | 35 | Ac7 / Ac10 / E-6400 | 30% / 30% / 35% | 12.7 / 12.7 / 2.9 | UrB1 | 25% | 6.4 | 30.1 | 8.6 | 1.6 | 32.2 | 5.4 | 0.27 |
| Example III-21 | III-24 | 1 | 35 | Ac7 / Ac10 / E-6400 | 30% / 30% / 35% | 12.7 / 12.7 / 2.9 | AcB1 | 100% | 1.6 | 63.4 | 8.6 | 2 | 32.2 | 5.4 | 0.27 |
| Example III-22 | III-25 | 1 | 35 | Ac7 / Ac10 / E-6400 | 30% / 30% / 35% | 12.7 / 12.7 / 2.9 | AcB2 | 100% | 1.6 | 63.4 | 8.6 | 1.6 | 32.2 | 5.4 | 0.27 |
| Example III-23 | III-26 | 1 | 35 | Ac7 / Ac10 / E-6400 | 30% / 30% / 35% | 12.7 / 12.7 / 2.9 | AcB3 | 100% | 1.6 | 63.4 | 8.6 | 1.6 | 32.2 | 5.4 | 0.27 |
| Example III-24 | III-27 | 1 | 35 | Ac7 / Ac10 / E-6400 | 30% / 30% / 35% | 12.7 / 12.7 / 2.9 | AcB4 | 100% | 1.6 | 63.4 | 8.6 | 1.6 | 32.2 | 5.4 | 0.27 |
| Example III-25 | III-28 | 1 | 35 | Ac7 / Ac10 / E-6400 | 30% / 30% / 35% | 12.7 / 12.7 / 2.9 | AcB5 | 100% | 1.6 | 63.4 | 8.6 | 1.6 | 32.2 | 5.4 | 0.27 |
| Example III-26 | III-29 | 1 | 35 | Ac7 / Ac10 / E-6400 | 30% / 30% / 35% | 12.7 / 12.7 / 2.9 | AcB6 | 100% | 1.6 | 63.4 | 8.6 | 1.6 | 32.2 | 5.4 | 0.27 |
| Example III-27 | III-30 | 1 | 35 | Ac7 / Ac10 / E-6400 | 30% / 30% / 35% | 12.7 / 12.7 / 2.9 | AcB7 | 100% | 1.6 | 63.4 | 8.6 | 1.6 | 32.2 | 5.4 | 0.27 |
| Example III-28 | III-31 | 1 | 35 | Ac7 / Ac10 / E-6400 | 30% / 30% / 35% | 12.7 / 12.7 / 2.9 | AcB8 | 100% | 1.6 | 63.4 | 8.6 | 1.6 | 32.2 | 5.4 | 0.27 |
| Example III-29 | III-32 | 1 | 35 | Ac7 / Ac10 / E-6400 | 30% / 30% / 35% | 12.7 / 12.7 / 2.9 | AcB9 | 100% | 1.6 | 63.4 | 8.6 | 1.6 | 32.2 | 5.4 | 0.27 |
| Example III-30 | III-33 | 1 | 35 | Ac7 / Ac10 / E-6400 | 30% / 30% / 35% | 12.7 / 12.7 / 2.9 | AcB10 | 100% | 1.6 | 63.4 | 8.6 | 1.6 | 32.2 | 5.4 | 0.27 |

TABLE III-6-continued

| Examples/Comparative Examples | Pretreatment Liquid | Constitution of pretreatment liquid used for evaluation | | | | | | | | | | Specifications | | | |
|---|---|---|---|---|---|---|---|---|---|---|---|---|---|---|---|
| | | Pre-pretreatment liquid | | Aqueous dispersion of resin particles | | | Water-soluble resin (aqueous solution thereof) | | | Ion-exchanged water | R (Amount of resin particles) | DW (Amount of water-soluble resin) | C (Amount of calcium ions in millimoles) | R/DW | R/C |
| | | No. | Amount | Type | Nv | Amount | Type | Nv | Amount | Amount | | | | | |
| Example III-31 | III-34 | 1 | 35 | Ac7 Ac10 E-6400 | 30% 30% 35% | 12.7 12.7 2.9 | AcB11 | 100% | 1.6 | 63.4 | 8.6 | 1.6 | 32.2 | 5.4 | 0.27 |
| Example III-32 | III-35 | 1 | 35 | Ac7 Ac10 E-6400 | 30% 30% 35% | 12.7 12.7 2.9 | AcB12 | 100% | 1.6 | 63.4 | 8.6 | 1.6 | 32.2 | 5.4 | 0.27 |
| Example III-33 | III-36 | 1 | 35 | Ac7 Ac10 E-6400 | 30% 30% 35% | 12.7 12.7 2.9 | AcB13 | 100% | 1.6 | 63.4 | 8.6 | 1.6 | 32.2 | 5.4 | 0.27 |
| Example III-34 | III-37 | 1 | 35 | Ac7 Ac10 E-6400 | 30% 30% 35% | 12.7 12.7 2.9 | AcB14 | 100% | 1.6 | 63.4 | 8.6 | 1.6 | 32.2 | 5.4 | 0.27 |
| Example III-35 | III-38 | 1 | 35 | Ac7 Ac10 E-6400 | 30% 30% 35% | 12.7 12.7 2.9 | AcB15 | 100% | 1.6 | 63.4 | 8.6 | 1.6 | 32.2 | 5.4 | 0.27 |
| Example III-36 | III-39 | 1 | 35 | Ac7 Ac10 E-6400 | 30% 30% 35% | 12.7 12.7 2.9 | AcB16 | 100% | 1.6 | 63.4 | 8.6 | 1.6 | 32.2 | 5.4 | 0.27 |
| Example III-37 | III-40 | 1 | 35 | Ac7 Ac10 E-6400 | 30% 30% 35% | 12.7 12.7 2.9 | AcB17 | 100% | 1.6 | 63.4 | 8.6 | 1.6 | 32.2 | 5.4 | 0.27 |
| Example III-38 | III-41 | 1 | 35 | Ac7 Ac10 E-6400 | 30% 30% 35% | 12.7 12.7 2.9 | AcB18 | 100% | 1.6 | 63.4 | 8.6 | 1.6 | 32.2 | 5.4 | 0.27 |
| Example III-39 | III-42 | 1 | 35 | Ac7 Ac10 E-6400 | 30% 30% 35% | 12.7 12.7 2.9 | AcB19 | 100% | 1.6 | 63.4 | 8.6 | 1.6 | 32.2 | 5.4 | 0.27 |
| Example III-40 | III-43 | 1 | 35 | Ac7 Ac10 E-6400 | 30% 30% 35% | 12.7 12.7 2.9 | AcB20 | 100% | 1.6 | 63.4 | 8.6 | 1.6 | 32.2 | 5.4 | 0.27 |
| Example III-41 | III-44 | 1 | 35 | Ac7 Ac10 E-6400 | 30% 30% 35% | 12.7 12.7 2.9 | AcB21 | 100% | 1.6 | 63.4 | 8.6 | 1.6 | 32.2 | 5.4 | 0.27 |
| Example III-42 | III-45 | 1 | 35 | Ac7 Ac10 E-6400 | 30% 30% 35% | 12.7 12.7 2.9 | AcB22 | 100% | 1.6 | 63.4 | 8.6 | 1.6 | 32.2 | 5.4 | 0.27 |
| Example III-43 | III-46 | 1 | 35 | Ac7 Ac10 E-6400 | 30% 30% 35% | 12.7 12.7 2.9 | AcB23 | 100% | 1.6 | 63.4 | 8.6 | 1.6 | 32.2 | 5.4 | 0.27 |
| Comparative Example III-4 | III-47 | 1 | 35 | Ac7 Ac10 E-6400 | 30% 30% 35% | 12.7 12.7 2.9 | AcB24 | 100% | 1.6 | 63.4 | 8.6 | 1.6 | 32.2 | 5.4 | 0.27 |
| Comparative Example III-5 | III-48 | 1 | 35 | Ac7 Ac10 E-6400 | 30% 30% 35% | 12.7 12.7 2.9 | AcB25 | 100% | 1.6 | 63.4 | 8.6 | 1.6 | 32.2 | 5.4 | 0.27 |

TABLE III-6-continued

| Examples/Comparative Examples | Pretreatment Liquid | Pre-pretreatment liquid No. | Pre-pretreatment liquid Amount | Aqueous dispersion of resin particles Type | Aqueous dispersion of resin particles Nv | Aqueous dispersion of resin particles Amount | Water-soluble resin (aqueous solution thereof) Type | Water-soluble resin Nv | Water-soluble resin Amount | Ion-exchanged water Amount | Specifications R (Amount of resin particles) | Specifications DW (Amount of water-soluble resin) in millimoles | Specifications C (Amount of calcium ions) | R/DW | R/C |
|---|---|---|---|---|---|---|---|---|---|---|---|---|---|---|---|
| Comparative Example III-6 | III-49 | 1 | 35 | Ac7<br>Ac10<br>E-6400 | 30%<br>30%<br>35% | 12.7<br>12.7<br>2.9 | AcB26 | 100% | 1.6 | 63.4 | 8.6 | 1.6 | 32.2 | 5.4 | 0.27 |
| Comparative Example III-7 | III-50 | 1 | 35 | Ac7<br>Ac10<br>E-6400 | 30%<br>30%<br>35% | 12.7<br>12.7<br>2.9 | AcB27 | 100% | 1.6 | 63.4 | 8.6 | 1.6 | 32.2 | 5.4 | 0.27 |
| Comparative Example III-8 | III-51 | 1 | 35 | Ac7<br>Ac10<br>E-6400 | 30%<br>30%<br>35% | 12.7<br>12.7<br>2.9 | AcB28 | 100% | 1.6 | 63.4 | 8.6 | 1.6 | 32.2 | 5.4 | 0.27 |
| Comparative Example III-9 | III-52 | 1 | 35 | Ac7<br>Ac10<br>E-6400 | 30%<br>30%<br>35% | 12.7<br>12.7<br>2.9 | AcB29 | 100% | 1.6 | 63.4 | 8.6 | 1.6 | 32.2 | 5.4 | 0.27 |
| Comparative Example III-10 | III-53 | 1 | 35 | Ac7<br>Ac10<br>E-6400 | 30%<br>30%<br>35% | 12.7<br>12.7<br>2.9 | AcB30 | 100% | 1.6 | 63.4 | 8.6 | 1.6 | 32.2 | 5.4 | 0.27 |
| Example III-44 | III-54 | 1 | 35 | Ac7<br>Ac10<br>E-6400 | 30%<br>30%<br>35% | 12.7<br>12.7<br>2.9 | SMAB1 | 100% | 1.6 | 28.4 | 8.6 | 1.6 | 32.2 | 5.4 | 0.27 |
| Example III-45 | III-55 | 1 | 35 | Ac7<br>Ac10<br>E-6400 | 30%<br>30%<br>35% | 12.7<br>12.7<br>2.9 | SMAB2 | 100% | 1.6 | 28.4 | 8.6 | 1.6 | 32.2 | 5.4 | 0.27 |
| Example III-46 | III-56 | 1 | 35 | Ac7<br>Ac10<br>E-6400 | 30%<br>30%<br>35% | 12.7<br>12.7<br>2.9 | SMAB3 | 100% | 1.6 | 28.4 | 8.6 | 1.6 | 32.2 | 5.4 | 0.27 |
| Example III-47 | III-57 | 1 | 35 | Ac7<br>Ac10<br>E-6400 | 30%<br>30%<br>35% | 12.7<br>12.7<br>2.9 | SMAB4 | 100% | 1.6 | 28.4 | 8.6 | 1.6 | 32.2 | 5.4 | 0.27 |
| Example III-48 | III-58 | 1 | 35 | Ac7<br>Ac10<br>E-6400 | 30%<br>30%<br>35% | 12.7<br>12.7<br>2.9 | SMAB5 | 100% | 1.6 | 28.4 | 8.6 | 1.6 | 32.2 | 5.4 | 0.27 |
| Example III-49 | III-59 | 1 | 35 | Ac7<br>Ac10<br>E-6400 | 30%<br>30%<br>35% | 12.7<br>12.7<br>2.9 | SMAB6 | 100% | 1.6 | 28.4 | 8.6 | 1.6 | 32.2 | 5.4 | 0.27 |
| Example III-50 | III-60 | 1 | 35 | Ac7<br>Ac10<br>E-6400 | 30%<br>30%<br>35% | 12.7<br>12.7<br>2.9 | SMAB7 | 100% | 1.6 | 28.4 | 8.6 | 1.6 | 32.2 | 5.4 | 0.27 |
| Example III-51 | III-61 | 1 | 35 | Ac7<br>Ac10<br>E-6400 | 30%<br>30%<br>35% | 12.7<br>12.7<br>2.9 | SMAB8 | 100% | 1.6 | 28.4 | 8.6 | 1.6 | 32.2 | 5.4 | 0.27 |
| Example III-52 | III-62 | 1 | 35 | Ac7<br>Ac1C<br>E-6400 | 30%<br>30%<br>35% | 12.7<br>12.7<br>2.9 | SMAB9 | 100% | 1.6 | 28.4 | 8.6 | 1.6 | 32.2 | 5.4 | 0.27 |
| Example III-53 | III-63 | 1 | 35 | Ac7<br>Ac10<br>E-6400 | 30%<br>30%<br>35% | 12.7<br>12.7<br>2.9 | SMAB10 | 100% | 1.6 | 28.4 | 8.6 | 1.6 | 32.2 | 5.4 | 0.27 |

TABLE III-6-continued

| Examples/Comparative Examples | Pretreatment Liquid | Pre-pretreatment liquid No. | Pre-pretreatment liquid Amount | Constitution of pretreatment liquid used for evaluation - Aqueous dispersion of resin particles Type | Nv | Amount | Water-soluble resin (aqueous solution thereof) Type | Nv | Amount | Ion-exchanged water Amount | Specifications R (Amount of resin particles) | DW (Amount of water-soluble resin) | C (Amount of calcium ions in millimoles) | R/DW | R/C |
|---|---|---|---|---|---|---|---|---|---|---|---|---|---|---|---|
| Example III-54 | III-64 | 1 | 35 | Ac7 Ac10 E-6400 | 30% 30% 35% | 12.7 12.7 2.9 | SMAB11 | 100% | 1.6 | 28.4 | 8.6 | 1.6 | 32.2 | 5.4 | 0.27 |
| Example III-55 | III-65 | 1 | 35 | Ac7 Ac10 E-6400 | 30% 30% 35% | 12.7 12.7 2.9 | SMAB12 | 100% | 1.6 | 28.4 | 8.6 | 1.6 | 32.2 | 5.4 | 0.27 |
| Example III-56 | III-66 | 1 | 35 | Ac7 Ac10 E-6400 | 30% 30% 35% | 12.7 12.7 2.9 | SMAB13 | 100% | 1.6 | 28.4 | 8.6 | 1.6 | 32.2 | 5.4 | 0.27 |
| Example III-57 | III-67 | 1 | 35 | Ac7 Ac10 E-6400 | 30% 30% 35% | 12.7 12.7 2.9 | SMAB14 | 100% | 1.6 | 28.4 | 8.6 | 1.6 | 32.2 | 5.4 | 0.27 |
| Example III-58 | III-68 | 1 | 35 | Ac7 Ac10 E-6400 | 30% 30% 35% | 12.7 12.7 2.9 | SMAB15 | 100% | 1.6 | 28.4 | 8.6 | 1.6 | 32.2 | 5.4 | 0.27 |
| Comparative Example III-11 | III-69 | 1 | 35 | Ac7 Ac 10 E-6400 | 30% 30% 35% | 12.7 12.7 2.9 | SMAB16 | 100% | 1.6 | 28.4 | 8.6 | 1.6 | 32.2 | 5.4 | 0.27 |
| Comparative Example III-12 | III-70 | 1 | 35 | Ac7 Ac10 E-6400 | 30% 30% 35% | 12.7 12.7 2.9 | SMAB17 | 100% | 1.6 | 28.4 | 8.6 | 1.6 | 32.2 | 5.4 | 0.27 |
| Comparative Example III-13 | III-71 | 1 | 35 | Ac7 Ac10 E-6400 | 30% 30% 35% | 12.7 12.7 2.9 | SMAB18 | 100% | 1.6 | 28.4 | 8.6 | 1.6 | 32.2 | 5.4 | 0.27 |
| Comparative Example III-14 | III-72 | 1 | 35 | Ac7 Ac10 E-6400 | 30% 30% 35% | 12.7 12.7 2.9 | SMAB19 | 100% | 1.6 | 28.4 | 8.6 | 1.6 | 32.2 | 5.4 | 0.27 |
| Example III-59 | III-73 | 1 | 35 | Ac7 Ac10 E-6400 | 30% 30% 35% | 12.7 12.7 2.9 | OMAB1 | 100% | 1.6 | 28.4 | 8.6 | 1.6 | 32.2 | 5.4 | 0.27 |
| Example III-60 | III-74 | 1 | 35 | Ac7 Ac10 E-6400 | 30% 30% 35% | 12.7 12.7 2.9 | OMAB2 | 100% | 1.6 | 28.4 | 8.6 | 1.6 | 32.2 | 5.4 | 0.27 |
| Example III-61 | III-75 | 1 | 35 | Ac7 Ac10 E-6400 | 30% 30% 35% | 12.7 12.7 2.9 | OMAB3 | 100% | 1.6 | 28.4 | 8.6 | 1.6 | 32.2 | 5.4 | 0.27 |
| Example III-62 | III-76 | 1 | 35 | Ac7 Ac10 E-6400 | 30% 30% 35% | 12.7 12.7 2.9 | OMAB4 | 100% | 1.6 | 28.4 | 8.6 | 1.6 | 32.2 | 5.4 | 0.27 |
| Example III-63 | III-77 | 1 | 35 | Ac7 Ac10 E-6400 | 30% 30% 35% | 12.7 12.7 2.9 | OMAB5 | 100% | 1.6 | 28.4 | 8.6 | 1.6 | 32.2 | 5.4 | 0.27 |
| Example III-64 | III-78 | 1 | 35 | Ac7 Ac10 E-6400 | 30% 30% 35% | 12.7 12.7 2.9 | OMAB6 | 100% | 1.6 | 28.4 | 8.6 | 1.6 | 32.2 | 5.4 | 0.27 |

TABLE III-6-continued

| Examples/Comparative Examples | Pretreatment Liquid | Pre-pretreatment liquid No. | Pre-pretreatment liquid Amount | Aqueous dispersion of resin particles Type | Aqueous dispersion of resin particles Nv | Aqueous dispersion of resin particles Amount | Water-soluble resin (aqueous solution thereof) Type | Water-soluble resin (aqueous solution thereof) Nv | Water-soluble resin (aqueous solution thereof) Amount | Ion-exchanged water Amount | R (Amount of resin particles) | DW (Amount of water-soluble resin) | C (Amount of calcium ions in millimoles) | R/DW | R/C |
|---|---|---|---|---|---|---|---|---|---|---|---|---|---|---|---|
| Example III-65 | III-79 | 1 | 35 | Ac7 / Ac10 / E-6400 | 30% / 30% / 35% | 12.7 / 12.7 / 2.9 | OMAB7 | 100% | 1.6 | 28.4 | 8.6 | 1.6 | 32.2 | 5.4 | 0.27 |
| Example III-66 | III-80 | 1 | 35 | Ac7 / Ac10 / E-6400 | 30% / 30% / 35% | 12.7 / 12.7 / 2.9 | OMAB8 | 100% | 1.6 | 28.4 | 8.6 | 1.6 | 32.2 | 5.4 | 0.27 |
| Comparative Example III-15 | III-81 | 1 | 35 | Ac7 / Ac10 / E-6400 | 30% / 30% / 35% | 12.7 / 12.7 / 2.9 | OMAB9 | 100% | 1.6 | 28.4 | 8.6 | 1.6 | 32.2 | 5.4 | 0.27 |
| Comparative Example III-16 | III-82 | 1 | 35 | Ac7 / Ac10 / E-6400 | 30% / 30% / 35% | 12.7 / 12.7 / 2.9 | OMAB10 | 100% | 1.6 | 28.4 | 8.6 | 1.6 | 32.2 | 5.4 | 0.27 |
| Comparative Example III-17 | III-83 | 1 | 35 | Ac7 / Ac10 / E-6400 | 30% / 30% / 35% | 12.7 / 12.7 / 2.9 | OMAB11 | 100% | 1.6 | 28.4 | 8.6 | 1.6 | 32.2 | 5.4 | 0.27 |
| Comparative Example III-18 | III-84 | 1 | 35 | Ac7 / Ac10 / E-6400 | 30% / 30% / 35% | 12.7 / 12.7 / 2.9 | OMAB12 | 100% | 1.6 | 28.4 | 8.6 | 1.6 | 32.2 | 5.4 | 0.27 |
| Example III-67 | III-85 | 1 | 35 | R-600 / E-6400 | 33% / 35% | 23 / 2.9 | BYK-190 | 40% | 4 | 35.1 | 8.6 | 1.6 | 32.2 | 5.4 | 0.27 |
| Example III-68 | III-86 | 1 | 35 | R-9621 / E-6400 | 38% / 35% | 20 / 2.9 | BYK-190 | 40% | 4 | 38.1 | 8.6 | 1.6 | 32.2 | 5.4 | 0.27 |
| Example III-69 | III-87 | 1 | 35 | Ur1 / E-6400 | 30% / 35% | 25 / 2.9 | BYK-190 | 40% | 4 | 33.1 | 8.5 | 1.6 | 32.2 | 5.3 | 0.26 |
| Example III-70 | III-88 | 1 | 35 | Ur2 / E-6400 | 30% / 35% | 25 / 2.9 | BYK-190 | 40% | 4 | 33.1 | 8.5 | 1.6 | 32.2 | 5.3 | 0.26 |
| Example III-71 | III-89 | 1 | 35 | WEM-3000 / E-6400 | 32.5% / 35% | 23 / 2.9 | BYK-190 | 40% | 4 | 35.1 | 8.5 | 1.6 | 32.2 | 5.3 | 0.26 |
| Example III-72 | III-90 | 1 | 35 | Ac2 / R-9621 / E-6400 | 30% / 38% / 35% | 12 / 10 / 2.9 | BYK-190 | 40% | 4 | 36.1 | 8.4 | 1.6 | 32.2 | 5.3 | 0.26 |
| Example III-73 | III-91 | 1 | 35 | XK-190 / R-9621 / E-6400 | 45% / 38% / 35% | 8 / 10 / 2.9 | BYK-190 | 40% | 4 | 40.1 | 8.4 | 1.6 | 32.2 | 5.3 | 0.26 |
| Example III-74 | III-92 | 2 | 35 | Ac7 / Ac10 / E-6400 | 30% / 30% / 35% | 12.7 / 12.7 / 2.9 | BYK-190 | 40% | 4 | 32.7 | 8.6 | 1.6 | 38.4 | 5.4 | 0.22 |
| Example III-75 | III-93 | 3 | 35 | Ac7 / Ac10 / E-6400 | 30% / 30% / 35% | 12.7 / 12.7 / 2.9 | BYK-190 | 40% | 4 | 32.7 | 8.6 | 1.6 | 31.6 | 5.4 | 0.27 |
| Example III-76 | III-94 | 4 | 35 | Ac7 / Ac10 / E-6400 | 30% / 30% / 35% | 12.7 / 12.7 / 2.9 | BYK-190 | 40% | 4 | 32.7 | 8.6 | 1.6 | 26.8 | 5.4 | 0.32 |
| Example III-77 | III-95 | 5 | 35 | Ac7 / Ac10 / E-6400 | 30% / 30% / 35% | 7.5 / 7.5 / 1.7 | BYK-190 | 40% | 2.3 | 46.0 | 5.1 | 0.9 | 15.7 | 5.5 | 0.32 |

TABLE III-6-continued

| Examples/Comparative Examples | Pretreatment Liquid | Pre-pretreatment liquid | | Constitution of pretreatment liquid used for evaluation | | | Water-soluble resin (aqueous solution thereof) | | | Ion-exchanged water | Specifications | | | | |
|---|---|---|---|---|---|---|---|---|---|---|---|---|---|---|---|
| | | No. | Amount | Aqueous dispersion of resin particles | | | | | | | R (Amount of resin particles) | DW (Amount of water-soluble resin) | C (Amount of calcium ions in millimoles) | R/DW | R/C |
| | | | | Type | Nv | Amount | Type | Nv | Amount | Amount | | | | | |
| Example III-78 | III-96 | 6 | 35 | Ac7<br>Ac10<br>E-6400 | 30%<br>30%<br>35% | 10.2<br>10.2<br>2.3 | BYK-190 | 40% | 3.2 | 39.1 | 6.9 | 1.3 | 16.0 | 5.4 | 0.43 |
| Example III-79 | III-97 | 7 | 35 | Ac7<br>Ac10<br>E-6400 | 30%<br>30%<br>35% | 12.7<br>12.7<br>2.9 | BYK-190 | 40% | 4 | 32.7 | 8.6 | 1.6 | 28.1 | 5.4 | 0.31 |
| Example III-80 | III-98 | 8 | 35 | Ac7<br>Ac10<br>E-6400 | 30%<br>30%<br>35% | 12.7<br>12.7<br>2.9 | BYK-190 | 40% | 4 | 32.7 | 8.6 | 1.6 | 25.3 | 5.4 | 0.34 |
| Example III-81 | III-99 | 9 | 35 | Ac7<br>Ac10<br>E-6400 | 30%<br>30%<br>35% | 12.7<br>12.7<br>2.9 | BYK-190 | 40% | 4 | 32.7 | 8.6 | 1.6 | 17.6 | 5.4 | 0.49 |
| Example III-82 | III-100 | 10 | 35 | Ac7<br>Ac10<br>E-6400 | 30%<br>30%<br>35% | 12.7<br>12.7<br>2.9 | BYK-190 | 40% | 4 | 32.7 | 8.6 | 1.6 | 27.3 | 5.4 | 0.32 |
| Example III-83 | III-101 | 11 | 35 | Ac7<br>Ac10<br>E-6400 | 30%<br>30%<br>35% | 12.7<br>12.7<br>2.9 | BYK-190 | 40% | 4 | 32.7 | 8.6 | 1.6 | 35.3 | 5.4 | 0.24 |
| Example III-84 | III-102 | 12 | 35 | Ac7<br>Ac10<br>E-6400 | 30%<br>30%<br>35% | 12.7<br>12.7<br>2.9 | BYK-190 | 40% | 4 | 32.7 | 8.6 | 1.6 | 33.8 | 5.4 | 0.26 |
| Comparative Example III-19 | III-103 | 13 | 35 | Ac7<br>Ac10<br>E-6400 | 30%<br>30%<br>35% | 12.7<br>12.7<br>2.9 | BYK-190 | 40% | 4 | 32.7 | 8.6 | 1.6 | 10.0 | 5.4 | 0.87 |
| Example III-85 | III-104 | 14 | 35 | Ac7<br>Ac10<br>E-6400 | 30%<br>30%<br>35% | 12.7<br>12.7<br>2.9 | BYK-190 | 40% | 4 | 32.7 | 8.6 | 1.6 | 20.0 | 5.4 | 0.43 |
| Example III-86 | III-105 | 15 | 35 | Ac7<br>Ac10<br>E-6400 | 30%<br>30%<br>35% | 12.7<br>12.7<br>2.9 | BYK-190 | 40% | 4 | 32.7 | 8.6 | 1.6 | 36.8 | 5.4 | 0.23 |
| Example III-87 | III-106 | 16 | 35 | Ac7<br>Ac10<br>E-6400 | 30%<br>30%<br>35% | 12.7<br>12.7<br>2.9 | BYK-190 | 40% | 4 | 32.7 | 8.6 | 1.6 | 52.2 | 5.4 | 0.17 |
| Comparative Example III-20 | III-107 | 17 | 35 | Ac7<br>Ac10<br>E-6400 | 30%<br>30%<br>35% | 12.7<br>12.7<br>2.9 | BYK-190 | 40% | 4 | 32.7 | 8.6 | 1.6 | 96.7 | 5.4 | 0.09 |
| Comparative Example III-21 | III-108 | 1 | 35 | Ac7<br>Ac10<br>E-6400 | 30%<br>30%<br>35% | 3.8<br>3.8<br>2.9 | BYK-190 | 40% | 4 | 50.5 | 3.3 | 1.6 | 32.2 | 2.1 | 0.10 |
| Example III-88 | III-109 | 1 | 35 | Ac7<br>Ac10<br>E-6400 | 30%<br>30%<br>35% | 7.5<br>7.5<br>2.9 | BYK-190 | 40% | 4 | 43.1 | 5.5 | 1.6 | 32.2 | 3.4 | 0.17 |
| Example III-89 | III-110 | 1 | 35 | Ac7<br>Ac10<br>E-6400 | 30%<br>30%<br>35% | 18<br>18<br>2.9 | BYK-190 | 40% | 4 | 22.1 | 11.8 | 1.6 | 32.2 | 7.4 | 0.37 |

TABLE III-6-continued

| Examples/Comparative Examples | Pretreatment Liquid | Pre-pretreatment liquid | | Constitution of pretreatment liquid used for evaluation | | | | | | | Specifications | | | |
|---|---|---|---|---|---|---|---|---|---|---|---|---|---|---|
| | | No. | Amount | Aqueous dispersion of resin particles | | | Water-soluble resin (aqueous solution thereof) | | | Ion-exchanged water | R (Amount of resin particles) | DW (Amount of water-soluble resin) | C (Amount of calcium ions in millimoles) | R/DW | R/C |
| | | | | Type | Nv | Amount | Type | Nv | Amount | Amount | | | | | |
| Example III-90 | III-111 | 1 | 35 | Ac7 Ac10 E-6400 | 30% 30% 35% | 22.5 22.5 2.9 | BYK-190 | 40% | 4 | 13.1 | 14.5 | 1.6 | 32.2 | 9.1 | 0.45 |
| Comparative Example III-22 | III-112 | 1 | 35 | Ac7 Ac10 E-6400 | 30% 30% 35% | 28.5 28.5 2.9 | BYK-190 | 40% | 4 | 1.1 | 18.1 | 1.6 | 32.2 | 11.3 | 0.56 |

Details regarding the abbreviations and product names described in Tables III-5 and III-6 are as follows.

IPA: 2-propanol (isopropanol)

SF440: Surfynol 440 (acetylenediol-based surfactant available from Nissin Chemical Co., Ltd.)

Proxel GXL: 1,2-benzisothiazol-3-one (dipropylene glycol solution) available from Arch Chemicals, Inc.

E-6400: HYTEC E-6400 (non-chlorinated polyolefin resin particles available from Toho Chemical Industry Co., Ltd.)

XK-188: Neocryl XK-188 ((meth)acrylic resin particles available from DSM Coating Resins Ltd., solid content: 44.5%)

XK-190: Neocryl XK-190 ((meth)acrylic resin particles available from DSM Coating Resins Ltd., solid content 45%)

R-600: Neo Rez R-600 (urethane (urea) resin particles available from DSM Coating Resins Ltd., solid content: 33%)

R-9621: Neo Rez R-9621 (urethane (urea) resin particles available from DSM Coating Resins Ltd., solid content: 38%)

WEM-3000: urethane (urea)-(meth)acrylic resin particles available from Taisei Fine Chemical Co., Ltd., solid content: 32.5%

BYK-190: water-soluble styrene-maleic acid (anhydride) resin solution available from BYK-Chemie GmbH, solid content: 40%, containing an EO structure and a PO structure, acid value: 10 mgKOH/g BYK-2015: water-soluble styrene-maleic acid (anhydride) resin solution available from BYK-Chemie GmbH, solid content: 40%, containing an EO structure and a PO structure, acid value: 10 mgKOH/g TEGO Dispers 750W: water-soluble styrene-maleic acid (anhydride) resin solution available from Evonik Industries AG, solid content: 40%, containing an EO structure, acid value: 10 mgKOH/g UrB1: water-soluble urethane (urea) resin solution of Synthesis Example 8 produced by the method described in the examples of JP 2019-94377 A, solid content: 25%, containing an EO structure, acid value: 29 mgKOH/g <4> Production of Water-Based Inkjet Ink <4-1> Production of Pigment Dispersion Production Example of Pigment Dispersion Resin 1

A reaction vessel equipped with a gas inlet tube, a thermometer, a condenser, and a stirrer was charged with 95 parts of butanol and purged with nitrogen gas. The inside of the reaction vessel was heated to 110° C., after which a mixture of 45 parts of styrene, 30 parts of acrylic acid, and 25 parts of lauryl methacrylate, as polymerizable monomers, and 6 parts of V-601 (available from Fujifilm Wako Pure Chemical Industries, Ltd.) as a polymerization initiator was added dropwise over 2 hours, and a polymerization reaction was carried out. After completion of the dropwise addition, the reaction was continued at 110° C. for 3 hours, after which 0.6 parts of V-601 were added, and the reaction was further continued at 110° C. for 1 hour. Subsequently, the inside of the reaction vessel was cooled to room temperature, after which dimethylaminoethanol was added thereto to fully neutralize the acid groups of the product, and then 100 parts of water were added thereto to make the product aqueous. The inside of the reaction vessel was then heated to 100° C. or higher, butanol was distilled off by azeotropic distillation of the butanol with water, and the solid content was adjusted to 30%, and thereby an aqueous solution of a pigment dispersion resin 1 (solid content: 30%) was obtained. The acid value of the pigment dispersion resin 1 was 233.6 mgKOH/g.

Production of Black Pigment Dispersion

A mixing vessel equipped with a stirrer was charged with 15 parts of carbon black ("PrinteX85" available from Orion Engineered Carbons LLC), 10 parts of an aqueous solution of the pigment dispersion resin 1 (solid content of 30%), and 75 parts of water, after which the components were premixed for 1 hour. Subsequently, the mixture was circulated and dispersed using a Dyno Mill (available from Shinmaru Enterprises Corporation, volume: 0.6 L) filled with 1800 g of zirconia beads having a diameter of 0.5 mm, and thereby a black pigment dispersion was produced.

Production of Cyan Pigment Dispersion, Magenta Pigment Dispersion, and Yellow Pigment Dispersion A cyan pigment dispersion, a magenta pigment dispersion, and a yellow pigment dispersion were obtained in the same manner as in the case of the black pigment dispersion with the exception that the following pigments were used as the pigments.

Cyan: LIONOL BLUE 7358G (C.I. Pigment Blue 15:3) available from Toyo Color Co., Ltd.

Magenta: FASTOGEN SUPER MAGENTA RG (C.I. Pigment Red 122) available from DIC Corporation Yellow: LIONOL YELLOW TT1405G (C.I. Pigment Yellow 14) available from Toyo Color Co., Ltd.

<4-2> Production of Ink

Production of Black Ink 1 (K1)

A mixing vessel was sequentially charged with 33.3 parts of the black pigment dispersion, 13.4 parts of an aqueous solution of a binder resin 28 (solid content of 30%) produced by the method described in the examples of JP 2020-180178 A, 20 parts of 1,2-propanediol, 4 parts of propylene glycol monomethyl ether, 1.5 parts of TEGO Wet 280 (polyether-modified siloxane-based surfactant available from Evonik Industries AG), and 1 part of Surfynol 465 (acetylenediol-based surfactant available from Nissin Chemical Co., Ltd.), after which water was added thereto such that the total amount of addition was 100 parts, and the components were thoroughly stirred with a stirrer until the mixture was homogeneous. Subsequently, the mixture was filtered through a membrane filter having a pore diameter of 1 μm to remove coarse particles causing clogging of the head, and thereby a black ink 1 (K1) was prepared.

Production of Cyan Ink 1 (C1), Magenta Ink 1 (M1), and Yellow Ink 1 (Y1)

A cyan ink 1 (C1), a magenta ink 1 (M1), and a yellow ink 1 (Y1) were obtained in the same manner as the black ink 1 with the exception that the cyan pigment dispersion, the magenta pigment dispersion, and the yellow pigment dispersion were respectively used as the pigment dispersion.

Four types of water-based inkjet inks, namely K1, C1, M1 and Y1 produced as described above were used as a water-based inkjet ink set 1 in the evaluations described below.

<5> Preparation Example of OPP Film to Which Pretreatment Liquid Was Applied

The pretreatment liquid prepared above was applied to a biaxially stretched polypropylene film "OPU-1" (thickness: 20 μm, hereinafter also simply referred to as an "OPP film")

available from Mitsui Chemicals Tohcello, Inc. using the non-wire bar coater 250-OSP-02 available from OSG System Products Co., Ltd. such that the wet film thickness of the applied pretreatment liquid was 2.0±0.2 μm, after which the coated OPP film was placed in an air oven at 70° C. and dried for 2 minutes, and thereby an OPP film substrate to which the pretreatment liquid was applied was prepared.

<6> Production of Printed Matter

Four "KJ4B-1200" inkjet heads (design resolution of 1200 dpi, nozzle diameter of 20 μm) available from Kyocera Corporation were installed above a conveyor capable of conveying a substrate, and the inkjet heads were filled with the water-based inkjet ink set 1 produced above, in the order of K1, C1, M1, and Y1 from the inkjet head on the upstream side in the conveyance direction of the substrate. Next, the prepared OPP film substrate to which the pretreatment liquid was applied was fixed on the conveyor, and then the conveyor was driven at a constant speed. Then, when the OPP film substrate passed through the portion where the inkjet heads were installed, the water-based inkjet ink was discharged from each inkjet head at a drop volume of 2 μL to thereby print an image, after which the printed matter was immediately placed in an air oven at 70° C. and dried for 3 minutes, and thereby a printed matter was prepared.

Two types of printed images were prepared including an image in which 5 cm×10 cm solid patches with a coverage rate of 100% were adjacent in the order of CMYK (hereinafter, referred to as a "solid patch image") and a four color (CMYK) image in which the total coverage rate (the sum of the coverage rates of the respective colors) was continuously changed from 40% to 320% (hereinafter referred to as a "gradation image"; note that the coverage rates of the respective colors with regard to each total coverage rate were the same), and printed matters of each type of printed image were prepared.

Examples III-1 to III-90 and Comparative Examples III-1 to III-22

Each of the pretreatment liquids III-1 to III-112 produced as described above was combined with the water-based inkjet ink set 1 to prepare a printed matter. The following evaluations were carried out using this printed matter or the OPP film substrate itself to which the pretreatment liquid was applied. The evaluation results are as shown in Table III-7.

TABLE III-7

| Example/Comparative Example No. | Storage stability | Mixed color bleeding | Solid filling | Adhesion | Blocking resistance | Lamination strength |
|---|---|---|---|---|---|---|
| Example III-1 | ○ | ◎ | ◎ | △ | ◎ | ◎ |
| Example III-2 | ◎ | ◎ | ◎ | ◎ | ◎ | ◎ |
| Example III-3 | ○ | ◎ | ◎ | ○ | ◎ | ◎ |
| Example III-4 | △ | ○ | ◎ | △ | ○ | ◎ |
| Example III-5 | ◎ | ◎ | ◎ | ◎ | ◎ | ◎ |
| Example III-6 | ◎ | ◎ | ◎ | ◎ | △ | ○ |
| Example III-7 | ◎ | ◎ | ◎ | ◎ | △ | ○ |
| Example III-8 | ◎ | ◎ | ◎ | ◎ | ○ | ◎ |
| Example III-9 | ◎ | ◎ | ◎ | ◎ | ◎ | ◎ |
| Example III-10 | ○ | ◎ | ◎ | △ | ○ | ○ |
| Example III-11 | ◎ | ◎ | ◎ | ◎ | ◎ | ◎ |
| Example III-12 | ◎ | ◎ | ◎ | ◎ | ◎ | ◎ |
| Example III-13 | ◎ | ◎ | ◎ | ◎ | ○ | ○ |
| Example III-14 | ◎ | ◎ | ◎ | ◎ | ◎ | ◎ |
| Comparative Example III-1 | X | ○ | ◎ | △ | X | △ |
| Comparative Example III-2 | X | △ | ○ | ○ | X | X |
| Example III-15 | △ | ○ | ○ | ○ | △ | △ |
| Example III-16 | ○ | ○ | ◎ | ○ | ○ | ○ |
| Example III-17 | ◎ | ◎ | ◎ | ○ | ○ | ○ |
| Comparative Example III-3 | ◎ | ◎ | ◎ | X | X | X |
| Example III-18 | ◎ | ◎ | ◎ | ◎ | ◎ | ◎ |
| Example III-19 | ○ | ◎ | ◎ | ◎ | ○ | ◎ |
| Example III-20 | △ | ◎ | ◎ | ◎ | ○ | ◎ |
| Example III-21 | ◎ | ◎ | ◎ | ◎ | ◎ | ◎ |
| Example III-22 | ◎ | ◎ | ◎ | ◎ | ◎ | ◎ |
| Example III-23 | ◎ | ◎ | ◎ | ◎ | ◎ | ◎ |
| Example III-24 | ○ | ◎ | ◎ | ◎ | ○ | ◎ |
| Example III-25 | ◎ | ◎ | ◎ | ◎ | ◎ | ◎ |
| Example III-26 | ◎ | ◎ | ◎ | ◎ | ◎ | ◎ |
| Example III-27 | ◎ | ◎ | ◎ | ◎ | ◎ | ◎ |
| Example III-28 | ◎ | ◎ | ◎ | ◎ | ◎ | ◎ |
| Example III-29 | △ | ○ | ◎ | ○ | ○ | ○ |
| Example III-30 | ○ | ◎ | ◎ | ◎ | ○ | ◎ |
| Example III-31 | ◎ | ◎ | ◎ | ◎ | ◎ | ◎ |
| Example III-32 | ◎ | ◎ | ◎ | ◎ | ◎ | ◎ |
| Example III-33 | ◎ | ◎ | ◎ | ◎ | ◎ | ◎ |
| Example III-34 | ○ | ◎ | ◎ | ◎ | ◎ | ◎ |
| Example III-35 | ○ | ◎ | ◎ | ◎ | ◎ | ◎ |
| Example III-36 | ◎ | ◎ | ◎ | ◎ | ◎ | ◎ |
| Example III-37 | ○ | ◎ | ◎ | ◎ | ◎ | ◎ |

TABLE III-7-continued

| | Evaluation Results | | | | | |
|---|---|---|---|---|---|---|
| Example/ Comparative Example No. | Storage stability | Mixed color bleeding | Solid filling | Adhesion | Blocking resistance | Lamination strength |
| Example III-38 | ○ | ○ | ◎ | ○ | ○ | ◎ |
| Example III-39 | Δ | ○ | ◎ | ○ | Δ | ○ |
| Example III-40 | ○ | ◎ | ◎ | ◎ | ○ | ◎ |
| Example III-41 | ◎ | ◎ | ◎ | ○ | ○ | ◎ |
| Example III-42 | Δ | ◎ | ◎ | ○ | ○ | ○ |
| Example III-43 | ○ | ◎ | ◎ | ○ | ○ | ◎ |
| Comparative Example III-4 | X | Δ | ○ | ○ | X | Δ |
| Comparative Example III-5 | X | ○ | ◎ | ◎ | Δ | ○ |
| Comparative Example III-6 | X | ○ | ○ | X | Δ | Δ |
| Comparative Example III-7 | X | ○ | ○ | Δ | ○ | ○ |
| Comparative Example III-8 | X | ○ | ○ | Δ | ○ | ○ |
| Comparative Example III-9 | X | Δ | ◎ | ◎ | X | Δ |
| Comparative Example III-10 | X | ○ | ◎ | ◎ | Δ | ○ |
| Example III-44 | ○ | ◎ | ◎ | ◎ | ◎ | ◎ |
| Example III-45 | ○ | ◎ | ◎ | ◎ | ◎ | ◎ |
| Example III-46 | ◎ | ◎ | ◎ | ◎ | ◎ | ◎ |
| Example III-47 | ◎ | ◎ | ◎ | ◎ | ◎ | ◎ |
| Example III-48 | ◎ | ◎ | ◎ | ◎ | ◎ | ◎ |
| Example III-49 | ◎ | ◎ | ◎ | ◎ | ◎ | ◎ |
| Example III-50 | ◎ | ◎ | ◎ | ◎ | ◎ | ◎ |
| Example III-51 | ○ | ◎ | ◎ | ◎ | ◎ | ◎ |
| Example III-52 | ◎ | ◎ | ◎ | ◎ | ◎ | ◎ |
| Example III-53 | Δ | ○ | ◎ | ○ | ○ | ◎ |
| Example III-54 | ◎ | ◎ | ◎ | ◎ | ◎ | ◎ |
| Example III-55 | ◎ | ◎ | ◎ | ◎ | ◎ | ◎ |
| Example III-56 | ○ | ◎ | ◎ | ◎ | ◎ | ◎ |
| Example III-57 | ○ | ◎ | ◎ | ◎ | ◎ | ◎ |
| Example III-58 | ○ | ◎ | ◎ | ◎ | ◎ | ◎ |
| Comparative Example III-11 | X | ○ | ◎ | ◎ | Δ | ○ |
| Comparative Example III-12 | X | ○ | ◎ | ◎ | Δ | ○ |
| Comparative Example III-13 | X | ○ | ○ | Δ | ○ | ○ |
| Comparative Example III-14 | X | ○ | ○ | Δ | ○ | ○ |
| Example III-59 | Δ | ◎ | ◎ | ○ | ○ | ◎ |
| Example III-60 | Δ | ◎ | ◎ | ○ | ○ | ◎ |
| Example III-61 | Δ | ◎ | ◎ | ○ | ○ | ◎ |
| Example III-62 | ○ | ◎ | ◎ | ◎ | ○ | ◎ |
| Example III-63 | ○ | ◎ | ◎ | ◎ | ○ | ◎ |
| Example III-64 | ○ | ◎ | ◎ | ◎ | ○ | ◎ |
| Example III-65 | ○ | ◎ | ◎ | ◎ | ○ | ◎ |
| Example III-66 | Δ | ◎ | ◎ | ○ | ○ | ◎ |
| Comparative Example III-15 | X | ○ | ◎ | ○ | X | ○ |
| Comparative Example III-16 | X | ○ | ◎ | ○ | X | ○ |
| Comparative Example III-17 | X | ○ | ○ | Δ | Δ | ○ |
| Comparative Example III-18 | X | ○ | ○ | Δ | Δ | ○ |
| Example III-67 | ◎ | ◎ | ◎ | ◎ | ◎ | ◎ |
| Example III-68 | ◎ | ◎ | ◎ | ◎ | ◎ | ◎ |
| Example III-69 | ◎ | ◎ | ◎ | ◎ | ◎ | ◎ |
| Example III-70 | ◎ | ◎ | ◎ | ◎ | ◎ | ◎ |
| Example III-71 | ◎ | ◎ | ◎ | ◎ | ◎ | ◎ |
| Example III-72 | ◎ | ◎ | ◎ | ◎ | ◎ | ◎ |
| Example III-73 | ◎ | ◎ | ◎ | ◎ | ◎ | ◎ |
| Example III-74 | ◎ | ◎ | Δ | ◎ | Δ | ○ |
| Example III-75 | ◎ | ◎ | Δ | ◎ | ◎ | ○ |
| Example III-76 | ◎ | ◎ | Δ | ◎ | ◎ | ○ |
| Example III-77 | ◎ | ○ | ◎ | ○ | ○ | ◎ |
| Example III-78 | ◎ | ○ | ◎ | ○ | ○ | ◎ |
| Example III-79 | ◎ | ◎ | ◎ | ◎ | ◎ | ◎ |
| Example III-80 | ◎ | ◎ | ◎ | ◎ | ◎ | ◎ |
| Example III-81 | ◎ | ◎ | ◎ | ◎ | ◎ | ◎ |

TABLE III-7-continued

| Example/ Comparative Example No. | Storage stability | Mixed color bleeding | Solid filling | Adhesion | Blocking resistance | Lamination strength |
|---|---|---|---|---|---|---|
| Example III-82 | ◎ | ◎ | ◎ | ◎ | ◎ | ○ |
| Example III-83 | ◎ | ◎ | ◎ | ◎ | ◎ | ◎ |
| Example III-84 | ◎ | ◎ | ○ | ◎ | Δ | ○ |
| Comparative Example III-19 | ◎ | X | ○ | Δ | X | ○ |
| Example III-85 | ◎ | ○ | ◎ | ○ | ○ | ◎ |
| Example III-86 | ◎ | ◎ | ◎ | ◎ | ◎ | ◎ |
| Example III-87 | ◎ | ◎ | Δ | ○ | ◎ | ○ |
| Comparative Example III-20 | ○ | ◎ | X | X | ○ | X |
| Comparative Example III-21 | ○ | ◎ | Δ | X | X | X |
| Example III-88 | ◎ | ◎ | ○ | ○ | ○ | ○ |
| Example III-89 | ◎ | ◎ | ◎ | ◎ | ◎ | ◎ |
| Example III-90 | ◎ | ○ | ○ | ◎ | Δ | ○ |
| Comparative Example III-22 | ○ | X | Δ | ○ | X | ○ |

Evaluation 1: Evaluation of Storage Stability

The 50% diameter of the pretreatment liquid produced above was measured using the Nanotrac UPA-EX150 available from MicrotracBEL Corp., after which the pretreatment liquid was sealed in an airtight container, which was then stored in a stationary manner in a constant temperature device set at 70° C. After the startup of storing the airtight container in a stationary manner, the airtight container was removed once every week, and the 50% diameter after stationary storage was measured with the same device and under the same conditions as those at the startup of evaluation, and the 50% diameter change rate between before and after storage was calculated to thereby evaluate the storage stability of the pretreatment liquid. The evaluation criteria were as follows, and evaluations of ◎, ○, and Δ were determined to be usable on a practical level.

Evaluation Criteria

◎: The 50% diameter change rate after storage for four weeks was less than ±10%.

○: The 50% diameter change rate after storage for three weeks was less than ±10%, but the 50% diameter change rate after storage for four weeks was ±10% or more.

Δ: The 50% diameter change rate after storage for two weeks was less than ±10%, but the 50% diameter change rate after storage for three weeks was ±10% or more.

x: The 50% diameter change rate after storage for two weeks was ±10% or more.

Evaluation 2: Evaluation of Mixed Color Bleeding and Color Unevenness

Based on the above-described method of producing a printed matter, printed matters were prepared at three different conveyor driving speeds of 25 m/min, 50 m/min, and 75 m/min. Among the obtained printed matters, a gradation image printed matter was used, and of the gradation image printed matter, the dot shape of a portion having a total coverage rate of 240% was observed using an optical microscope at a magnification of 200 times to evaluate the image quality (mixed color bleeding). The evaluation criteria were as follows, and evaluations of ◎, ○, and Δ were determined to be usable on a practical level.

Evaluation Criteria

◎: Coalescence of dots and non-uniformity in the dot shape were not observed in the printed matter printed at 75 m/min.

○: Coalescence of dots and non-uniformity in the dot shape were observed in the printed matter printed at 75 m/min, but mixed color bleeding and color unevenness were not observed in the printed matter printed at 50 m/min.

Δ: Coalescence of dots and non-uniformity in the dot shape were observed in the printed matter printed at 50 m/min, but mixed color bleeding and color unevenness were not observed in the printed matter printed at 25 m/min.

x: Coalescence of dots and non-uniformity in the dot shape were observed in the printed matter printed at 25 m/min.

Evaluation 3: Evaluation of Solid Filling

Based on the above-described method of producing a printed matter, printed matters were prepared at conveyor driving speeds of 25 m/min, 50 m/min, or 75 m/min. White backing paper was then affixed to the non-printed surface of the solid patch image printed matter among the obtained printed matters, after which the degree of white spots was visually observed to evaluate solid filling. The evaluation criteria were as follows, and evaluations of ◎, ○, and Δ were determined to be usable on a practical level.

Evaluation Criteria

◎: White spots were not observed in the printed matter printed at 75 m/min.

○: White spots were observed in the printed matter printed at 75 m/min, but no white spots were observed in the printed matter printed at 50 m/min.

Δ: White spots were observed in the printed matter printed at 50 m/min, but no white spots were observed in the printed matter printed at 25 m/min.

x: White spots were observed in the printed matter printed at 25 m/min.

Evaluation 4: Evaluation of Adhesion

Cellophane tape (18 mm wide) available from Nichiban Co., Ltd. was firmly affixed on the printed surface of the solid patch image printed matter produced at a conveyor driving speed of 50 m/min based on the above-described method of producing a printed matter. The edge of the cellophane tape was then held and peeled off while maintaining an angle of 60 degrees, and the surface of the printed matter after the cellophane tape was peeled off and the adhesiveness of the cellophane tape were visually confirmed to thereby evaluate the adhesion. The evaluation criteria were as follows, and evaluations of ◎, ○, and Δ were determined to be usable on a practical level. The evaluation results described in Table 7 pertain to the color having the worst evaluation among the four evaluated colors.

Evaluation Criteria

⊚: The peeled surface area with respect to the surface area of the portion to which the cellophane tape was affixed was less than 5%.

○: The peeled surface area with respect to the surface area of the portion to which the cellophane tape was affixed was from 5% to less than 10%.

Δ: The peeled surface area with respect to the surface area of the portion to which the cellophane tape was affixed was from 10% to less than 20%.

x: The peeled surface area with respect to the surface area of the portion to which the cellophane tape was affixed was 20% or greater.

Evaluation 5: Evaluation of Blocking Resistance

A black ink 1 printed portion was cut into a 4 cm×4 cm square from the solid patch image printed matter produced at a conveyor driving speed of 50 m/min based on the above-described method of producing a printed matter. Subsequently, the printed surface of the black ink 1 printed portion that was cut out and a non-printed surface (film back surface) of the same OPP film as that used for printing were superposed on each other to prepare a test piece, and the test piece was subjected to a blocking test using a constant load permanent strain tester (available from Tester Sangyo Co., Ltd.). The environmental conditions of the blocking test included a load of 10 kg/cm$^2$, a temperature of 40° C., a relative humidity of 80% RH, and a standing time of 24 hours. After 24 hours had passed, the superposed OPP film was instantaneously peeled off while maintaining an angle of 90°, and the printed surface after peeling was visually confirmed to evaluate the blocking resistance. The evaluation criteria were as follows, and evaluations of ⊚, ○, and Δ were determined to be usable on a practical level.

Evaluation Criteria

⊚: There was absolutely no removal of the printed surface with respect to the subsequently superposed OPP film, and there was no peeling resistance.

○: There was absolutely no removal of the printed surface with respect to the subsequently superposed OPP film, but there was slight resistance during peeling.

Δ: Removal of the printed surface with respect to the subsequently superposed OPP film was 30% or less of the total superposed surface area.

x: Removal of the printed surface with respect to the subsequently superposed OPP film exceeded 30% of the total superposed surface area.

Evaluation 6: Evaluation of Lamination Strength (Adhesive Force)

The printed surface of the solid patch image printed matter produced at a conveyor driving speed of 50 m/min based on the above-described method of producing a printed matter was coated with a solventless laminating adhesive ("EA-N373A/B" available from Toyo-Morton, Ltd.) using a solventless test coater under conditions including a temperature of 60° C. and a coating speed of 50 m/min (coating amount: 2 g/m$^2$). Subsequently, a corona-treated surface of a cast polypropylene (CPP) film ("FHK2" (thickness of 25 μm) available from Futamura Chemical Co., Ltd.) was superposed on the surface coated with the laminating adhesive, and then aged for one day in an environment at a temperature of 40° C. and a relative humidity of 80% RH to cure the abovementioned solventless laminating adhesive composition, and a laminated product was thereby prepared. Then, a black ink 1 portion of the obtained laminated product was cut to a length of 100 mm and a width of 15 mm to obtain a test piece, and this test piece was set in an Instron type tensile tester and then pulled at a peeling rate of 300 mm/min in 25° C. environment to measure the T-type peeling strength (N). This test was carried out five times, and the average value thereof was calculated as the adhesive force (lamination strength) to thereby evaluate the lamination strength. The evaluation criteria were as follows, and evaluations of ⊚, ○, and Δ were determined to be usable on a practical level.

Evaluation Criteria

⊚: The lamination strength was 1.5 N or greater.

○: The lamination strength was from 1.0 N to less than 1.5 N.

Δ: The lamination strength was from 0.5 N to less than 1.0 N.

x: The lamination strength was less than 0.5 N.

Examples III-1 to III-90 contained the water-soluble resin (B-1) having a polyoxyethylene structure and an acid value in a specific range, calcium ions, and carboxylate ions, the above-described ratios relating to the amount of the resin particles (A), the amount of the water-soluble resin (D), and the amount of calcium ions in millimoles were all within the specific ranges, and good results were obtained in all evaluations.

The invention claimed is:

1. A pretreatment liquid that is used together with a water-based inkjet ink comprising a pigment, a water-soluble organic solvent, and water, wherein
the pretreatment liquid comprise resin particles (A), calcium ions, plural types of carboxylate ions, and water,
the resin particles (A) include resin particles (A1), wherein the resin particles (A1) being selected from the group consisting of (meth)acrylic resin particles, urethane (urea) resin particles, and urethane-(meth)acrylic resin particles and having a solubility parameter (SP) value of from 9.0 to 13.5 (cal/cm$^3$)$^{1/2}$,
one or more of the plural types of carboxylate ions are hydroxycarboxylate ions, and
a ratio (R/C) of R to C is from 0.11 to 0.50, where R (g) is an amount of the resin particles (A) contained in 100 g of the pretreatment liquid, and C (mmol) is an amount of the calcium ions in millimoles contained in 100 g of the pretreatment liquid.

2. The pretreatment liquid according to claim 1, wherein an acid value of the resin particles (A1) is from 1 to 50 mgKOH/g.

3. The pretreatment liquid according to claim 1, wherein the R (g) is from 3.5 to 15.0.

4. The pretreatment liquid according to claim 1, wherein the resin particles (A1) comprise (meth)acrylic resin particles having a glass transition temperature (Tg) of −20° C. to 60° C.

5. The pretreatment liquid according to claim 1, wherein the resin particles (A1) include at least one selected from the group consisting of ester-based urethane urea resin particles and carbonate-based urethane urea resin particles.

6. The pretreatment liquid according to claim 1, wherein a value represented by C×2/A is from 0.8 to 1.1, where A (millimolar equivalents) is a total sum of millimolar equivalents of the plural types of carboxylate ions contained in 100 g of the pretreatment liquid.

7. The pretreatment liquid according to claim 1, wherein the pretreatment liquid contains two or more types of resin particles (A).

8. An ink set comprising: the pretreatment liquid according to claim 1; and a water-based inkjet ink comprising a pigment, a water-soluble organic solvent, and water.

9. A printed matter produced by printing a water-based inkjet ink comprising a pigment, a water-soluble organic solvent, and water onto a recording medium to which the pretreatment liquid according to claim 1 has been applied.

* * * * *